United States Patent [19]
Bellinger et al.

[11] Patent Number: 6,023,705
[45] Date of Patent: Feb. 8, 2000

[54] MULTIPLE CD INDEX AND LOADING SYSTEM AND METHOD

[75] Inventors: David T. Bellinger, Atlanta, Ga.; Andrew J. Garner, IV, Charlotte, N.C.

[73] Assignee: Wachovia Corporation, Winston-Salem, N.C.

[21] Appl. No.: 08/696,682

[22] Filed: Aug. 14, 1996

Related U.S. Application Data

[63] Continuation-in-part of application No. 08/514,162, Aug. 11, 1995.

[51] Int. Cl.$^7$ .................................................. G06F 17/80
[52] U.S. Cl. .............................. 707/200; 707/1; 369/34; 711/100
[58] Field of Search ............................ 707/200, 1, 3; 369/34; 711/100

[56] References Cited

U.S. PATENT DOCUMENTS

| | | | |
|---|---|---|---|
| 4,205,780 | 6/1980 | Burns et al. | 235/454 |
| 4,264,808 | 4/1981 | Owens et al. | 235/379 |
| 4,352,100 | 9/1982 | O'Connell | 340/723 |
| 4,510,619 | 4/1985 | LeBrun et al. | 382/57 |
| 4,888,812 | 12/1989 | Dinan et al. | 382/7 |
| 5,132,900 | 7/1992 | Gilchrist et al. | 364/419 |
| 5,151,948 | 9/1992 | Lyke et al. | 382/7 |
| 5,159,548 | 10/1992 | Caslavka | 364/408 |
| 5,170,466 | 12/1992 | Rogan et al. | 395/145 |
| 5,187,750 | 2/1993 | Behera | 382/7 |
| 5,210,734 | 5/1993 | Sakuri | 369/49 |
| 5,225,978 | 7/1993 | Petersen et al. | 364/408 |
| 5,235,680 | 8/1993 | Bijnagte | 395/164 |
| 5,237,158 | 8/1993 | Kern et al. | 235/379 |
| 5,287,497 | 2/1994 | Behera | 395/600 |
| 5,301,286 | 4/1994 | Rajani | 395/400 |
| 5,301,350 | 4/1994 | Rogan et al. | 395/800 |
| 5,321,816 | 6/1994 | Rogan et al. | 395/200 |
| 5,325,290 | 6/1994 | Cauffman et al. | 364/401 |
| 5,349,170 | 9/1994 | Kern | 235/379 |
| 5,408,630 | 4/1995 | Moss | 395/425 |
| 5,473,772 | 12/1995 | Halliwel et al. | 395/650 |
| 5,579,516 | 11/1996 | Van Maren et al. | 395/601 |
| 5,579,517 | 11/1996 | Reynolds et al. | 395/616 |
| 5,586,322 | 12/1996 | Beck et al. | 395/616 |
| 5,602,936 | 2/1997 | Green et al. | 382/140 |
| 5,604,901 | 2/1997 | Kelley et al. | 395/603 |
| 5,608,905 | 3/1997 | Weinstein | 395/621 |
| 5,611,066 | 3/1997 | Keele et al. | 395/427 |
| 5,659,730 | 8/1997 | Kelley et al. | 395/603 |

OTHER PUBLICATIONS

NCR Corporation, "The Advantages of Image Statements", 1991, cover page through p. 9, and appendix.

Cincinnati Bell Information Systems, Inc., "Hometown–Bank, ImageBanc$^{SM}$ Installation, Project Master Plan", Oct. 15, 1991.

(List continued on next page.)

*Primary Examiner*—Thomas G. Black
*Assistant Examiner*—Michael J. Wallace, Jr.
*Attorney, Agent, or Firm*—Rhodes, Coats & Bennett, L.L.P.

[57] ABSTRACT

A method for updating detecting and loading CD volume indexes from a multiple-CD set to a cumulative volume table contained in a computer memory. The method employs an volume index file on each intermediate CD of the set along with a dual index file feature on the last CD of the set. The second index file on the last CD is a cumulative file of all the index files contained on all the CDs of the set. The cumulative index file on the last CD is compared to the cumulative volume table to generate a list of missing volumes which have not already been loaded into computer memory. The method permits determining whether a given CD is a single CD or a CD that is one of a multiple-CD set by detecting the presence of a second volume index file on the CD.

1 Claim, 53 Drawing Sheets

FIG. 32A

OTHER PUBLICATIONS

Wachovia Corporation, *Wachovia News*, "Wachovia Invests In New Cash Management Technology," May 1994, p. 1.

Wachovia Corporation, *Wachovia* Magazine, "Corporate Commentary: Wachovia Announes Major Cash Management Technology Investment", Jul. 1994.

Wachovia Corporation, *Wachovia* Magazine, Jul. 1994, "Wachovia Connection Image Workstation," p. 20.

Wachovia Corporation, Quaterly Report to Shareholders for period ending Mar. 31, 1994, "News Developments", p. 2, Apr. 1994.

*American Banker*, article entitled "Wachovia Launches Check Imaging for Corporate, " p. 1, Apr. 19, 1994.

"Why Digitization Means Dollars: The Corporate Stake In Bank Imaging", by Bev Wells, Aug. 1994.

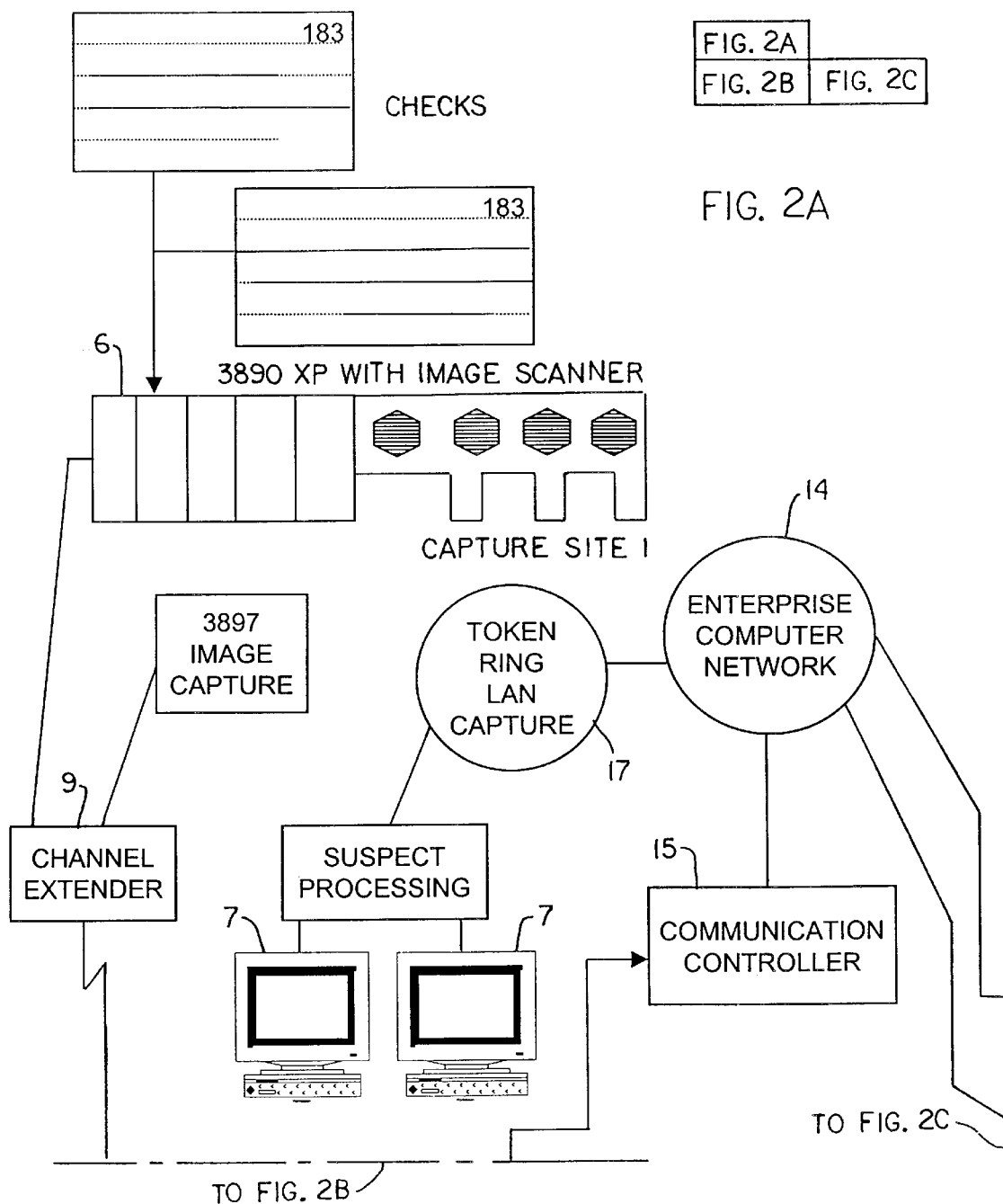

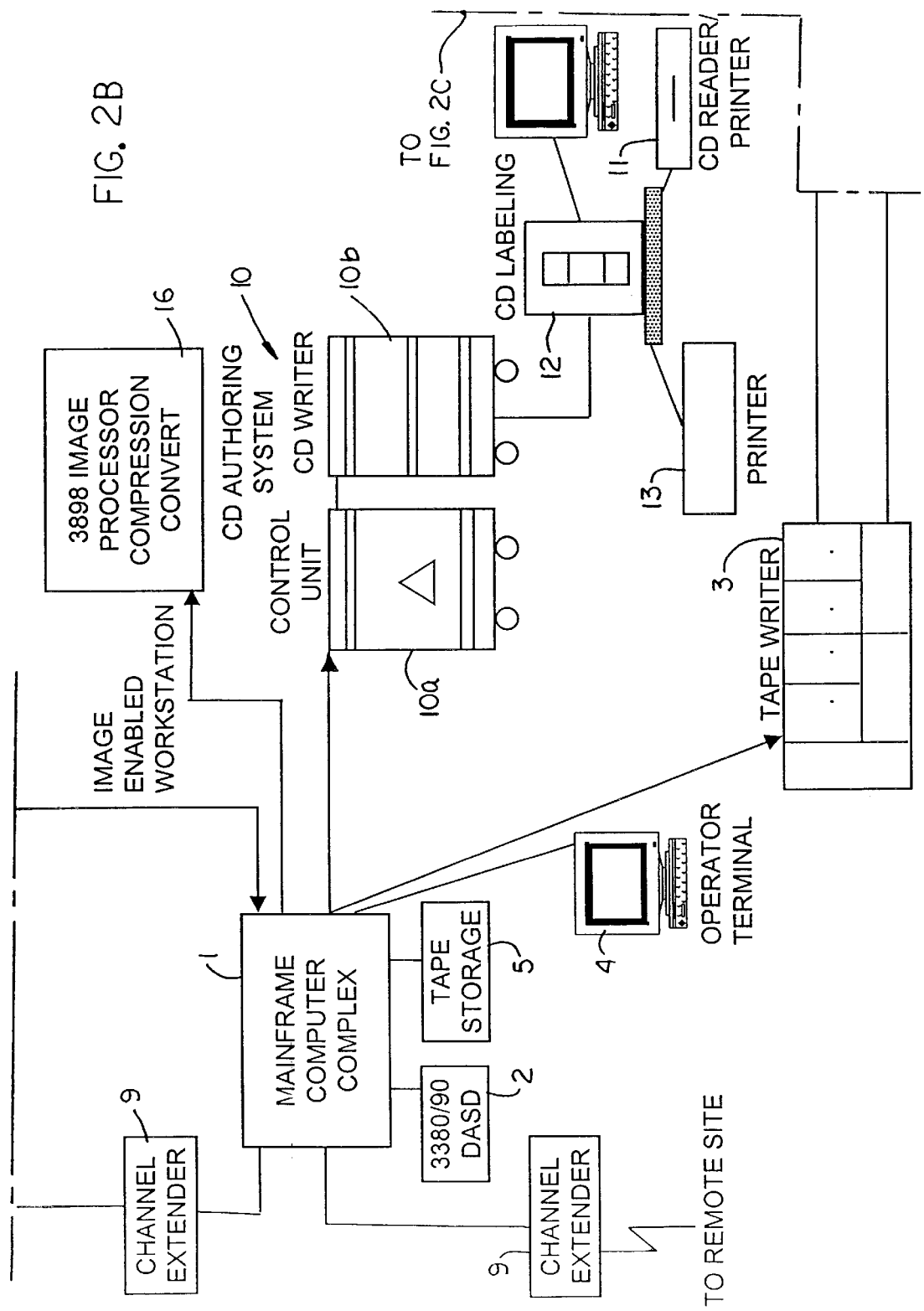

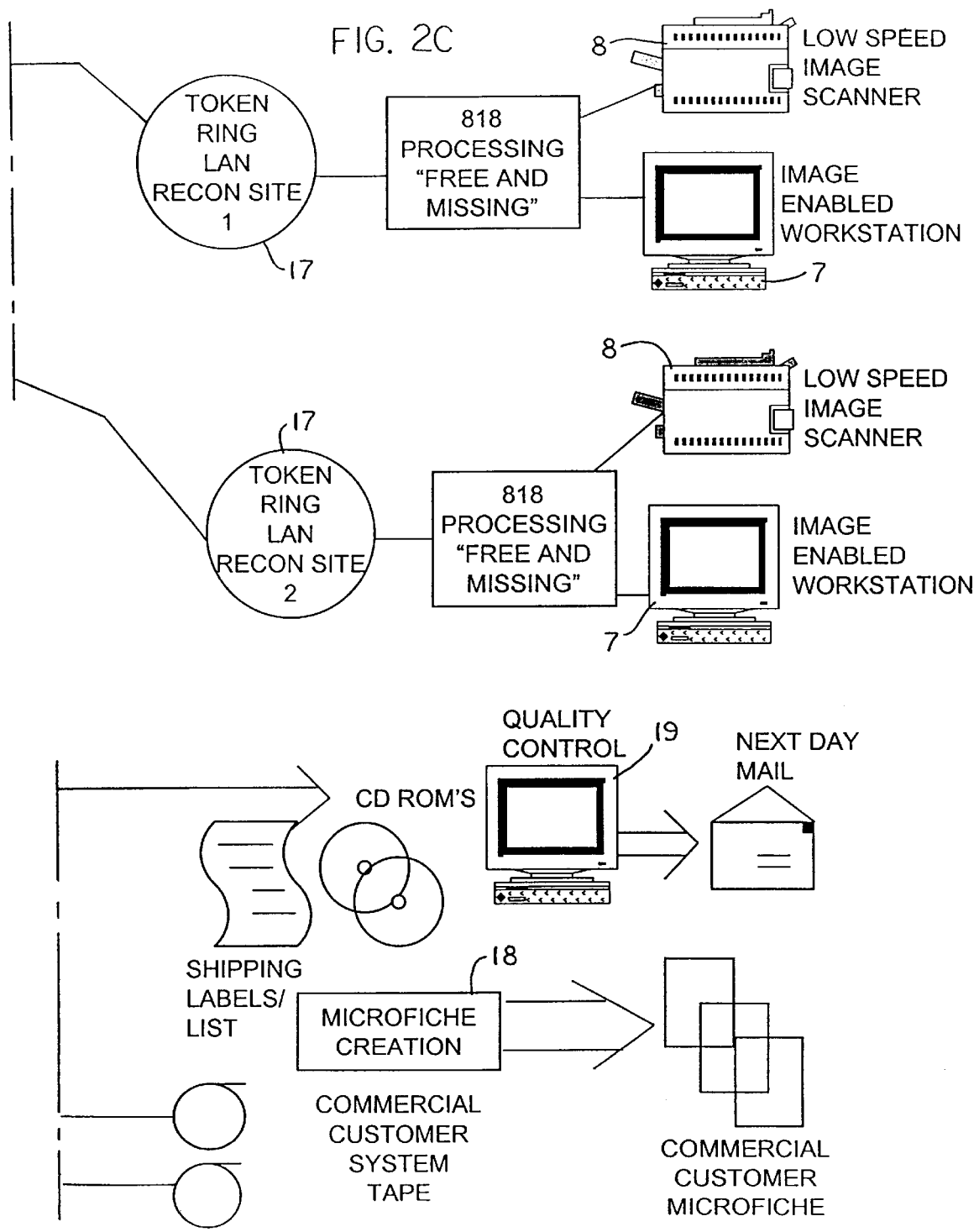

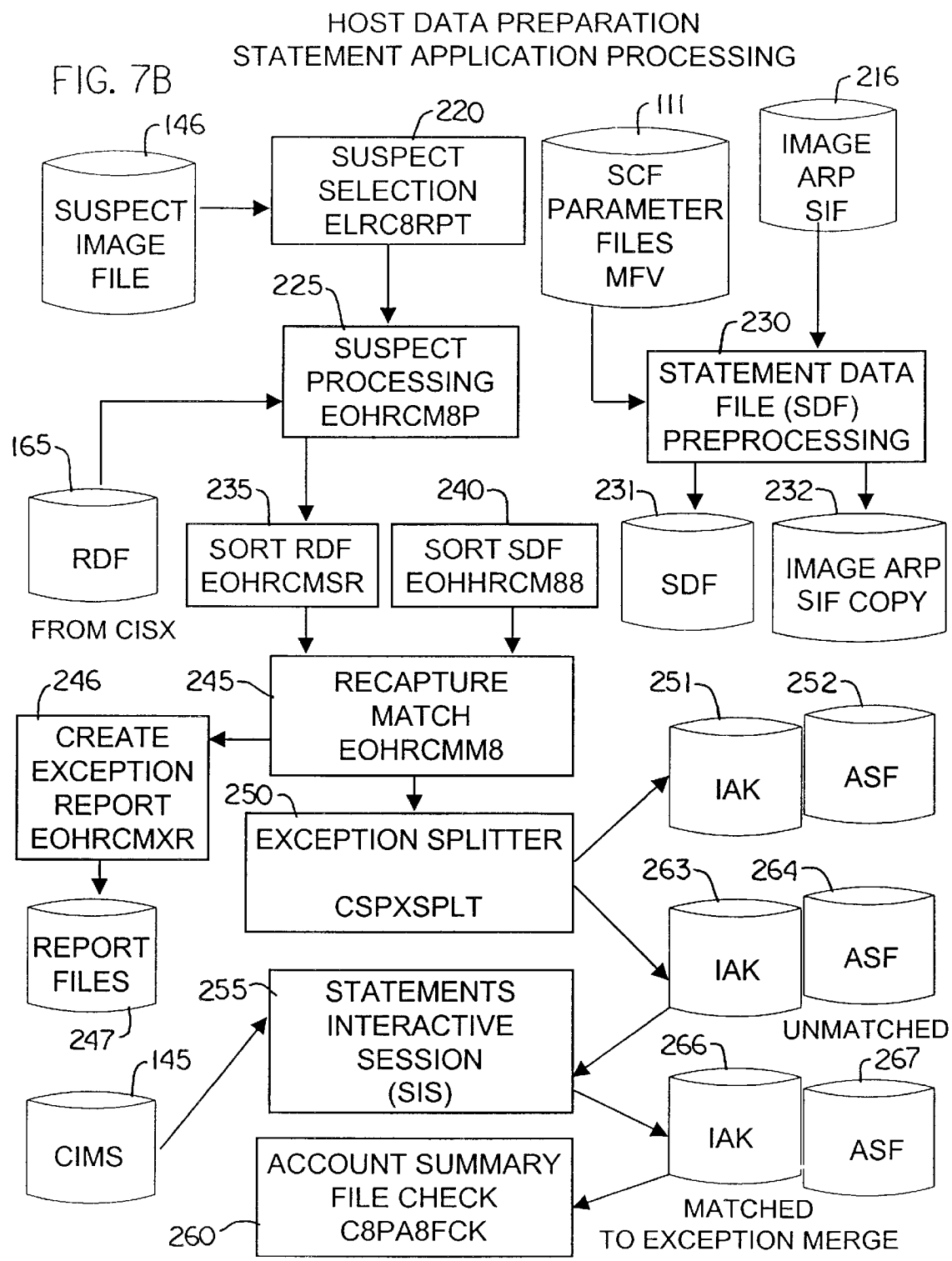

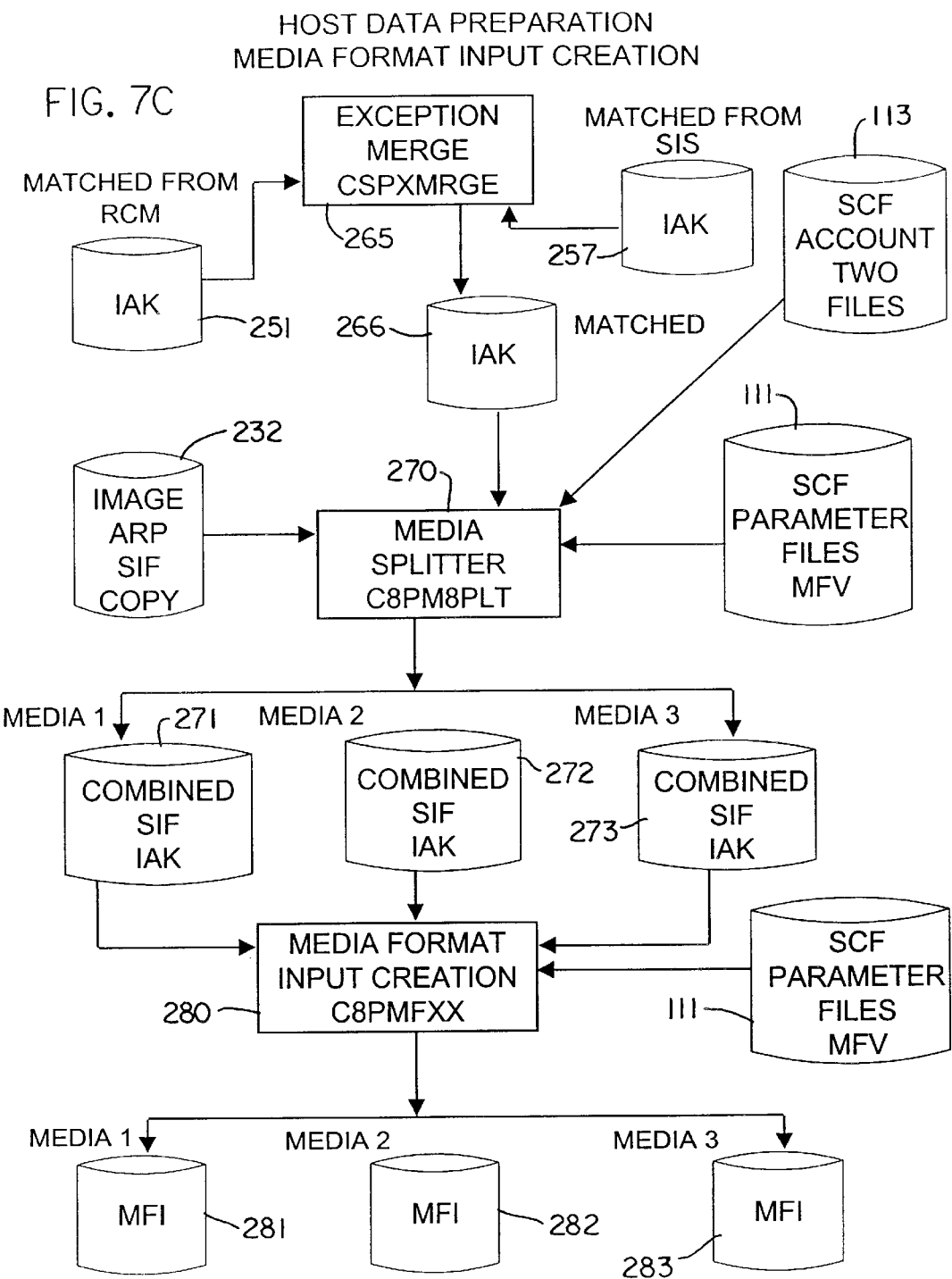

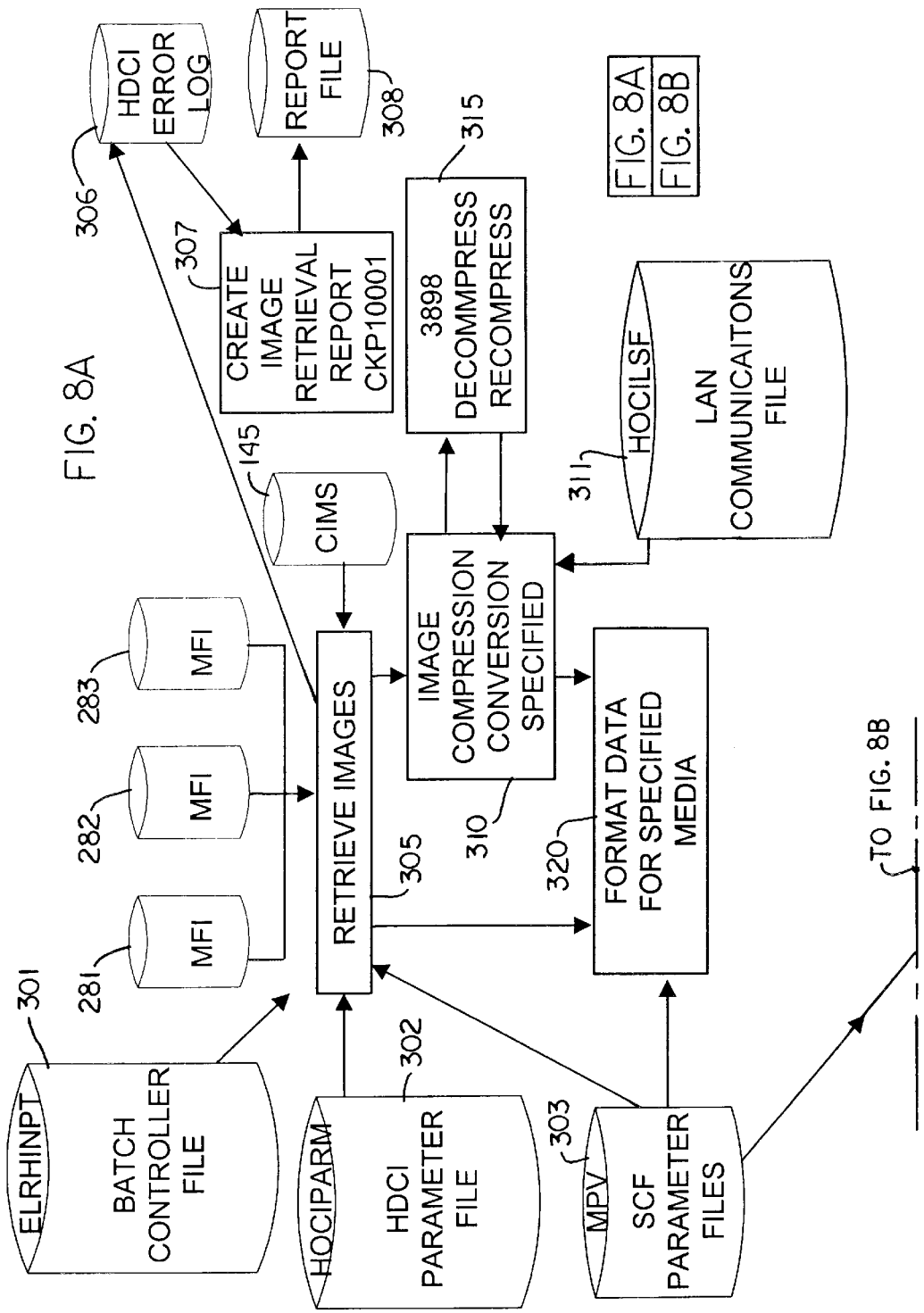

FIG. 12 MICROFICHE CREATION/DISTRIBUTION/CUSTOMER INTERFACE

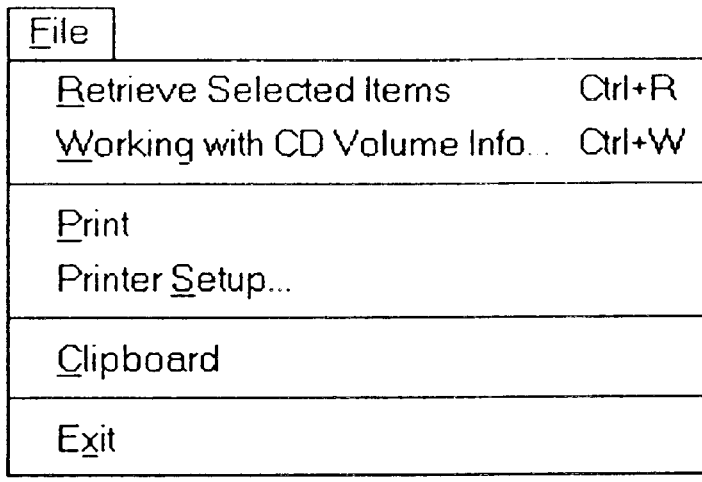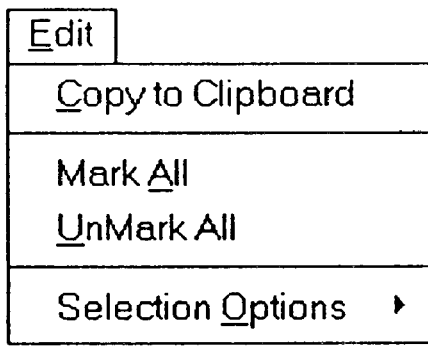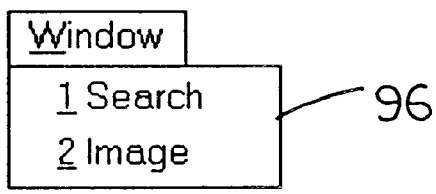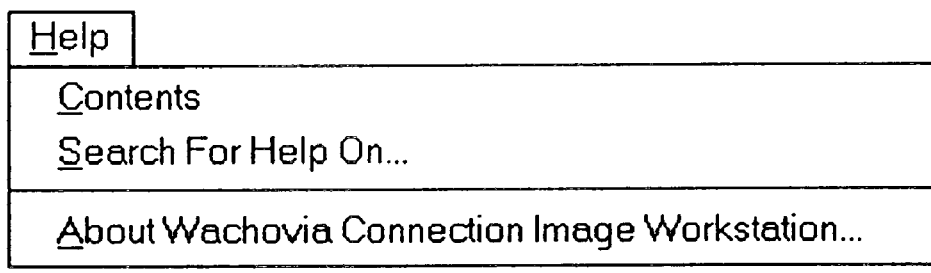
FIG. 16B

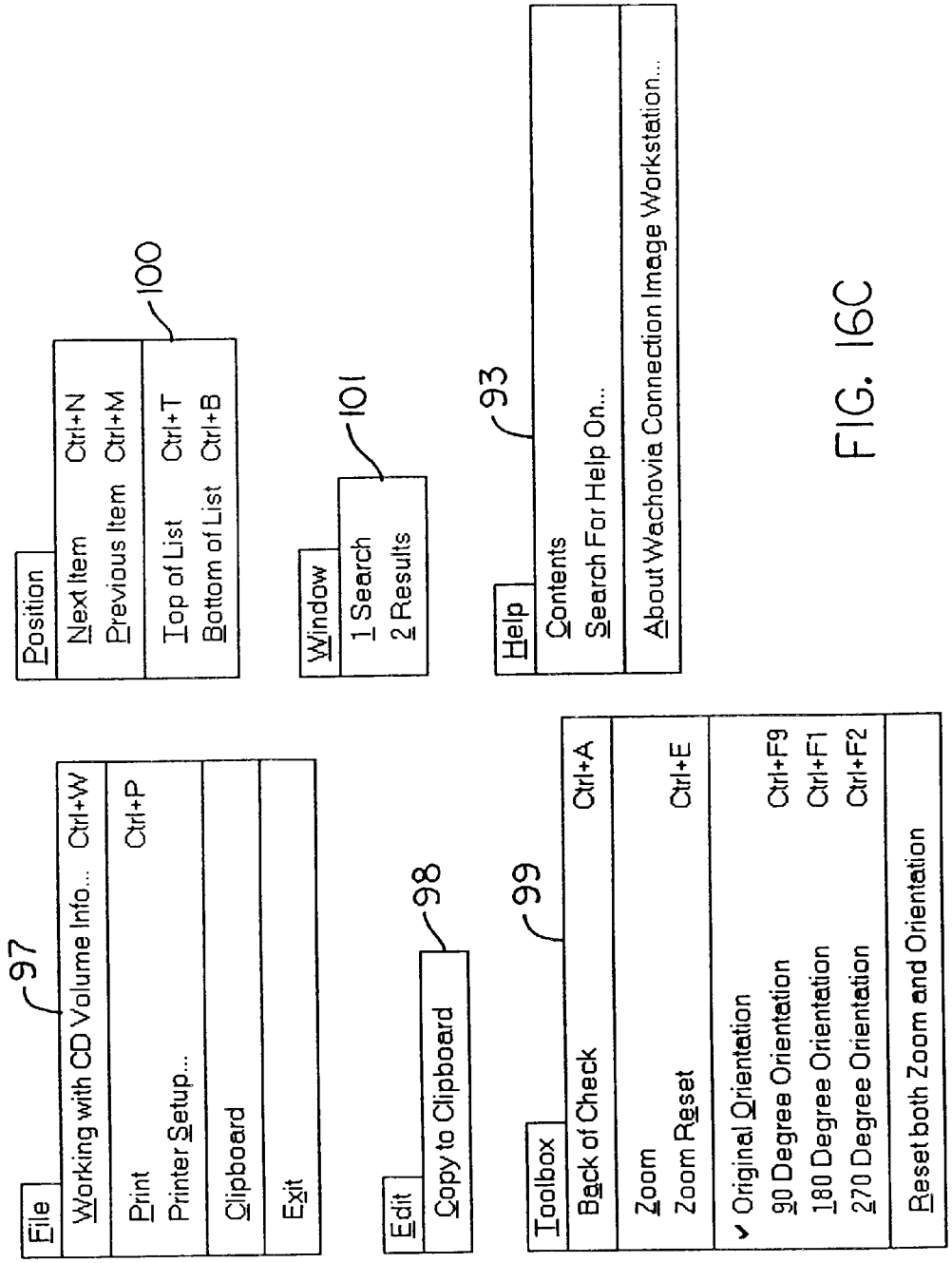

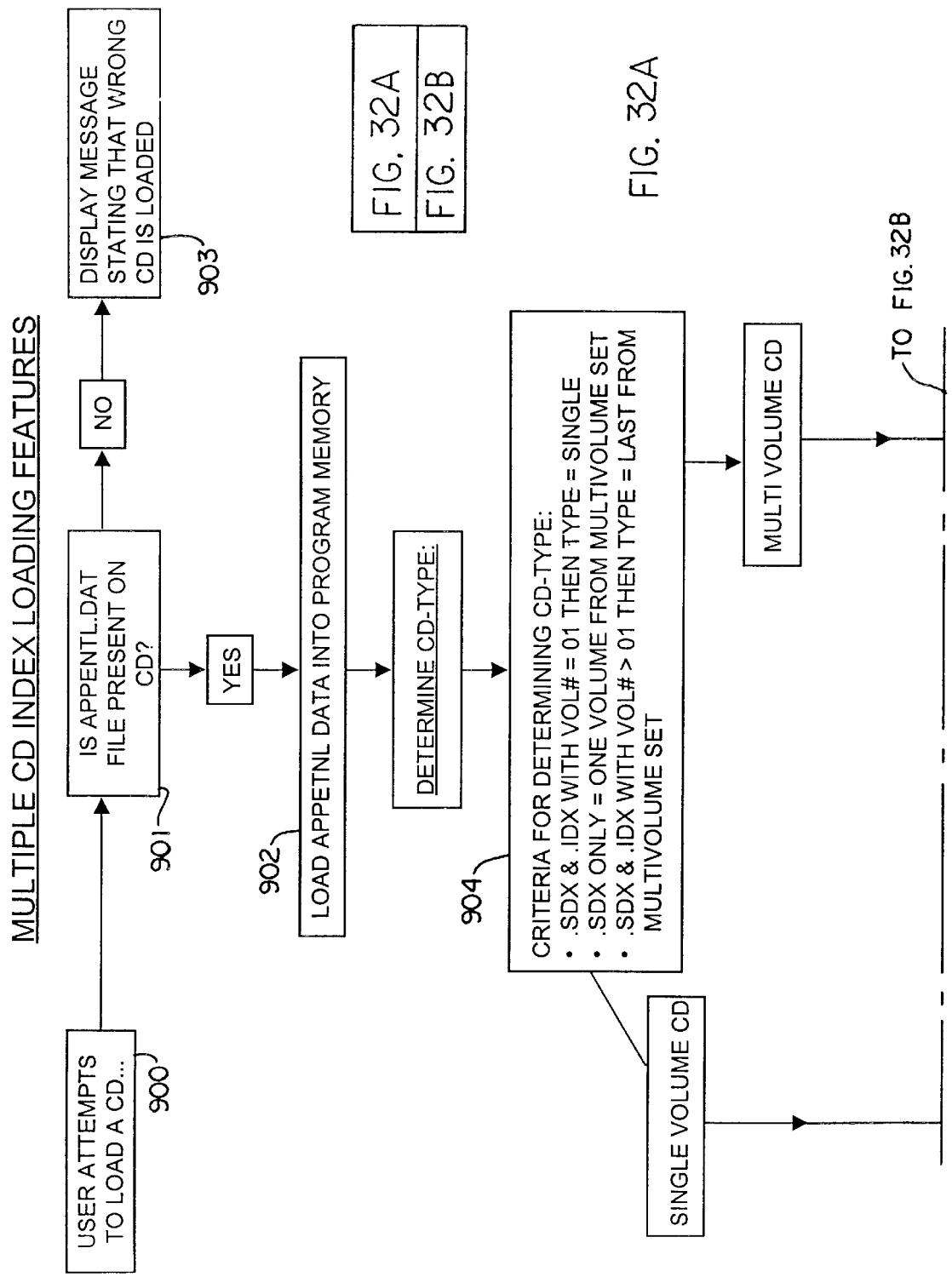

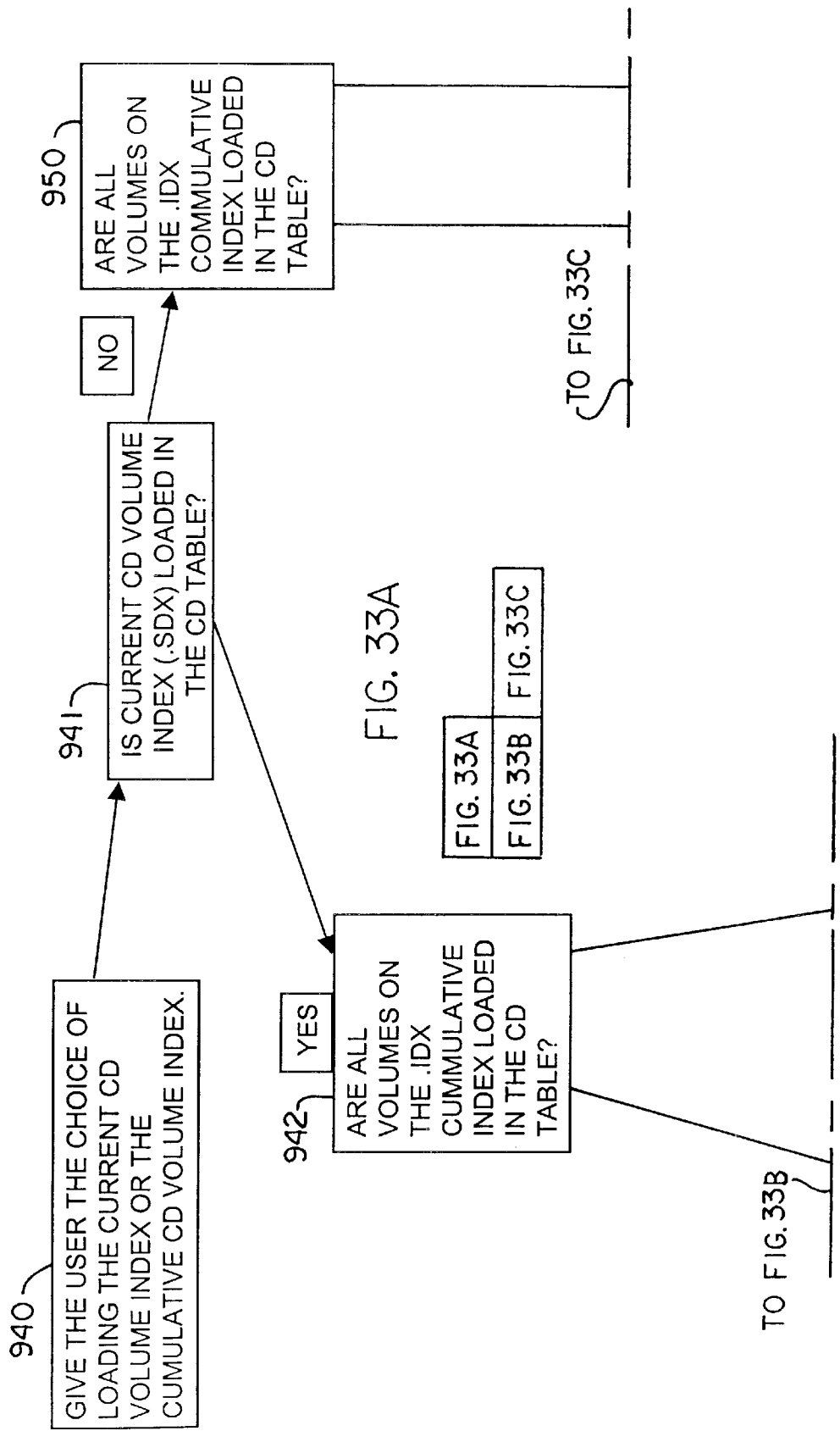

MULTIPLE CD INDEX AND LOADING SYSTEM AND METHOD

RELATED APPLICATIONS

This application is a continuation-in-part of a co-pending application Ser. No. 08/514,162, filed on Aug. 11, 1995, the contents of which are hereby incorporated by reference in its entirety.

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to a system and method for detecting and loading volume index information from a multiple CD set to a computer memory.

BACKGROUND OF THE INVENTION
CHECK CLEARING SYSTEM GENERALLY

Individuals, businesses, government agencies, and other institutions of all types issue checks and initiate other electronic transactions to make payments in the United States and internationally. For many years, checks were used almost exclusively in the United States for making payments and today still account for the vast majority of payments (over 95% of payment items). There is a well-defined and well-known process within the banking system of the United States that supports checks as a payment mechanism, commonly known as the check clearing process or check clearing system.

In FIG. 1, Step 1, this process begins when the Payor A1 (individual, company or institution making the payment) prepares and delivers a check to the Payee (individual, company or institution intended to receive the payment). In Step 2, The Payee receives and, where the Payee is a company or institution, processes the check. This typically includes making two accounting entries: entering the amount on the Payee's cash ledger and crediting the ledger account for the Payor. The Payee, Step 3, then deposits the check in its Demand Depository Account ("DDA") at Bank B, also called the Bank of First Deposit.

A Demand Deposit Account ("DDA"), is where a demand instrument (a check) is negotiated (deposited) and settled (check eventually is presented to and accepted for payment by the Payor's bank).

For a large dollar check, the Payee may instruct the Payor to mail the check directly to Bank B to accelerate and safeguard the receipt and deposit of the check, Steps $2^1$ and $3^1$. This process is called "lockbox" and Bank B in this case would be the lockbox bank.

Bank B processes the check and forwards, Step 4, it to a clearing agent or directly to the Payor's bank, Bank A. The clearing agent or Payor's Depository Institution then gives value to Bank B in the amount of the check, Step 5. The types of check clearing agents are Federal Reserve Banks, correspondent banks (any other bank with which a bank has an ongoing relationship), and local clearinghouses (an arrangement whereby a group of banks located in the same geographic area agree to exchange each others checks for presentment at specified times during each business day).

The clearing agent physically presents the check, Step 6, to Bank A, the Payor's Depository Institution, and subtracts value, Step $6^1$, from Bank A for the amount of the check. Before the amount of the check is deducted from the Payor's account, the amount, account number, and other important information must be extracted from the check. The highly automated form of this extraction process performed by banks is commonly known as the check capture process, which is performed differently depending on whether a check is presented by a clearing agent, where the check would be commonly known as an inclearing item, or directly to a branch of Bank A, which is commonly known as a Proof of Deposit ("POD") item.

Highly specialized equipment is needed for capturing inclearing items and POD items. Inclearing items can be captured by high-speed equipment because it can be designed for handling checks only, which are highly standardized in terms of size, shape, paper quality, etc., and because the information will be used solely for debiting DDA accounts. Equipment for handling POD items, on the other hand, must not only have the ability to capture information from checks, but also from deposit slips and other, similar, documents. In addition, other processes must be performed for POD items that require additional specialized capture equipment.

The check capture process, Step 7, performed by the Payor's Depository Institution has two main steps, regardless of whether the checks come from POD or inclearings. First, there is the prime pass capture of information from the Magnetic Image Character Readable ("MICR") line. The first time a check is passed through a bank's capture equipment, it is referred to as the prime pass capture. The MICR line consists of specially designed numerals (E-13B Font) that are printed on the bottom of a check using magnetic ink. As checks pass through a reader/sorter equipment for capture, the magnetic ink is recognized and converted to information that can be used by computers and software for sorting the checks.

A reader/sorter, or sorter, is a machine that magnetically recognizes the MICR line on checks to capture the information encoded there, and also uses the information to sort the checks into pre-specified temporary storage slots. This sorting results in a meaningful grouping of the checks that can be used for further processing. Reader/sorters in use at banks today are highly automated capture devices that can capture up to 100,000 checks per hour. At many banks, these machines have been augmented with cameras to allow for the creation of photographic and digital reproductions of checks as they pass through the sorter.

In the second step in the capture process, MICR line information is used to electronically post (record) a debit against the Payor's DDA. This causes a deduction of the amount of the check from whatever balance exists in the Payor's DDA, just as the Payee's balance in its DDA increased. A special computer system is maintained at Bank A to account for all of these DDA posting transactions and resulting account balances for the Payor's account. When this posting process is completed, the deduction of the amount of the check also is completed, Step 8.

To meet legal and regulatory guidelines, Bank A typically has one day (24 hours or until midnight of the day following presentment) to review the check before approving it for settlement. The check may be returned (not approved) for reasons such as insufficient funds in the account, improper endorsement, stop payment, unauthorized by the Payor, or if the check is fraudulent. Once the check has been properly negotiated, settled and not returned within the one-day legal and regulatory guideline, only one step must be completed in order to complete the check clearing process.

The banks, Step 9, provide a statement of debits and credits to the Payor and the Payee to use for accounting and reconciliation. For the Payor specifically, physical checks, or an acceptable substitute, are returned to the Payor and additional reports for accounting and account reconciliation purposes are delivered to the Payor as well. Account reconciliation is the process of balancing the DDA account to ensure the checks and other items that post against the DDA account match the entries made against the Payor's ledger accounts and that resulting balances match as well. Many banks refer to services designed to support the account reconciliation process as Account Reconciliation Plan ("ARP") services. There is a recurring need for ARP services, so these services are typically provided according to various cycles, which may be a daily, weekly, monthly or some other cycle that best matches a Payor's accounting period.

Electronic and international payments are cleared through other clearing systems, but they all essentially follow the same major clearing steps of negotiation, presentment, settlement, and accounting and reconciliation.

MAINTENANCE OF SETTLED CHECKS

Once checks and other payments have been settled, all Payors have a common need to store, maintain and utilize or research records associated with each completed payment. In the case of paid checks, Payors also have a need to store, maintain and utilize or retrieve the physical check or a reasonable facsimile of the check.

Records of paid checks and other payments are needed for several purposes, including proof of payment, accounting, account reconciliation, and dispute resolution. These Payor needs are felt especially strongly by businesses, state governments, and other institutions ("commercial customers") that originate a relatively large (250 up to millions of checks per month) number of payments.

In the mid to late 1970's, check volumes were increasing rapidly and the banking industry recognized the need to improve the storage, maintenance and retrieval process for the millions of checks issued each month by commercial customers. A process developed at many different financial institutions, which had different names, but the basic process that created an acceptable substitute for the return of physical checks to commercial customers was called "Film and Index."

This Film and Index process consists of a separate capture pass (recapture pass), which is done sometime after the prime capture pass, most often on a monthly cycle, through which the reader/sorters would photograph (film) the items, assign a new sequence number (a number used for internal bank reference purposes), and associate the check serial number with the new sequence number. The photographs are used to create reproductions of the checks on rolls of microfilm. The sequence numbers and check serial numbers are cross-referenced on a paper report (or microfiche). With this index report, anyone can locate a check on the microfilm independently of the physical checks.

This Film and Index service was a success. It was superior to the more manual process of filing checks and then physically sorting through all the checks to pull the desired items when they were needed. Commercial customers value this process because it is easier and less expensive to retrieve checks, even though it is an imperfect process.

The design of the Film and Index process is straightforward, but many quality control problems are experienced on a regular basis due to the complexity of bank account processing in general. Specifically, the Film and Index process must be performed for multiple customers, which can range up to several hundred commercial customers at a single bank and each customer may have different volumes of paid checks, from only a few hundred per month to several million paid checks per month. Each customer's checks must be stored separately and each customer may have as many as a few dozen bank accounts in which checks must be segregated. Finally, accounts may have different instructions (e.g. because of special industry or regulatory requirements) that require them to be sorted differently or stored in different locations.

When producing ARP services, commercial customer's checks are recaptured by the bank at the end of each cycle, which is usually a monthly accounting cycle. As a result, there are often missing or extra checks (from previous periods, from other companies by mistake, etc.). These two problems exist because checks and related information need to be accessed throughout the accounting cycle by bank clerks for commercial customers and because there is no systematic way to track and control the physical checks. Human error inevitably has occurred despite the best efforts of skilled managers, and until the technology exists and can be effectively applied to ensure better quality control, these problems will not easily be solved.

The quality of photographic images appearing on microfilm presents another quality control issue. Across the industry, commercial customers frequently complain about an inability to read details on checks from the microfilm itself, and printouts of checks from the microfilm are often not very good. These problems often necessitate the need to rerun checks through the process in an attempt to improve the quality. In no case does the clarity of the check copy approach that of the actual check.

Another type of problem with Film and Index is one of timing. Microfilm must be developed like any other film, so there is a certain delay between the end of an accounting period and the time that the microfilm is available for use. There also can be delays in printing the reports. Even after both the microfilm and the index reports are available, there are still problems related to obtaining checks over different or multiple accounting periods. For instance, multiple reports must be searched to locate an item that has paid, sometime, more than a month in the past. This problem only gets worse the further you need to go back in time.

Once the desired item is located on the report, a clerk must find the right roll of film (which might be in use by another clerk), load the film roll, search the roll to locate the item, line up the item for printing, and then print the item. A few print attempts typically are needed to get the contrast settings just right for a better check copy. Once an acceptable check copy has been printed, it must then be prepared for mailing to the person requesting the check copy.

Because this process takes so long, especially after you take into consideration the time the check copy is taking while traveling through the mail system, the requester may get frustrated and unhappy. Though it happens infrequently, if this requester is a vendor of a commercial customer, the vendor may decide to delay shipment of critical supplies. If the requestor is a client of the bank's commercial customer, the person might decide to stop using the commercial customer's service because of poor service. Of course, the excessive time incurred by the commercial customer's own employees as they search for a check on microfilm, and then respond to an inquiry, causes inefficiencies and lost productivity as well.

One other serious shortcoming of the Film and Index process is that commercial customers could only use the check serial number to identify items on the report that they want to see. Since the serial number can be damaged or misread during the capture process, some items can be "lost". Also, by forcing commercial customers to use only the check serial number for locating and retrieving items, they have found it necessary to build other systems and databases to cross-reference the information on the film and index report with other index keys, and to build even more of the same indexing features for electronic payment items as well. They take these actions because index keys that are more relevant to each commercial customer's business are highly preferable to ones assigned by the bank.

Three examples illustrate this limitation. First, in a commercial customer's accounts payable application, their vendors routinely call the commercial customer to ask for information that is not included with the check, which typically is deposited by the vendor's lockbox bank. (See Steps $2^1$ and $3^1$ of FIG. 1.) Without the check serial number from the check, or other information such as an invoice number or shipping order number, responding to the vendor's inquiry is usually a tedious, time-consuming, and costly process for the commercial customer. Unfortunately, the only way this process could be improved is to link the vendor information with the bank's ARP and other services, which has not been previously possible to do in a reliable, secure, and cost-effective manner.

As a second example, consider a commercial customer that is an insurance company, who will process thousands or even millions of claim requests in a single month. The shear volume of checks necessitates an efficient storage and retrieval system that is easy and as inexpensive as possible to maintain, especially in an era of soaring health costs. To retrieve a claim check, insurance companies want to use a data field that is relevant to the insurance company and their clients, typically the claim number, beneficiary name, or social security number. While microfilm saves on the cost of storing physical checks, microfilm does not provide the desired indexing flexibility.

The third example arises with a commercial customer's payroll processing. Employees contact their employer and request copies of checks for income tax reporting reasons, proof that a check was cashed by them (or another person), and a whole host of other reasons. Requests for check copies and related information may come into the employer from the day after payday through several years after the paid date. Usually, an employee ID or social security number must be used, which is not available with the Film and Index system.

All of the above problems with the Film and Index service are compounded by the fact that usually only one person can perform a search at any one time, unless duplicate sets of reports, film, and the already expensive, specialized equipment needed to view the film are provided. Duplication is not typically a cost-effective course of action, so service and productivity usually suffer.

In the early 1990's, banks began to implement new cameras on their reader/sorters for capturing digital images of checks. New software and related equipment also was developed to make use of the new images. However, the focus of these implementations was on improving internal processes at the bank for Proof of Deposit ("POD") items, and to cut costs of delivering checks and bank statements to individual retail bank customers. For these two applications, only the front side of the check was needed. There was no effort to enhance the process of high-speed check capture for inclearings, nor was there a significant effort to provide images on any media other than for printing on plain paper.

In spite of the development of specialized reader/sorters and new digital image cameras, the need of commercial customers were not being met. For example, to create a viable alternative to replacement of physical checks or film and index, commercial customers must have the backs of checks in addition to the front images. This requirement exists because the endorsement on the back of the check is usually a critical piece of information needed to respond to requests from vendors, employees, etc. Also, commercial customers, with their high volumes of checks, need their check images delivered on something other than paper to derive any value from check images.

Digitally captured images of checks have been used by some banks for limited purposes for commercial customers. In such enhanced check copy systems, the bank passes the checks through check imaging equipment, which stores the check image as well as the sequence number and check serial number, just like the Film and Index service. As with Film and Index, customers request check copies by using a check serial number, only with the new services the image is requested and delivered electronically into a personal computer. While this service eliminated some of the problems associated with Film and Index, it left many of the other problems unsolved.

One reason why these problems cannot be solved by an enhanced check copy system alone is because of the cost of storage of digital images. Storing image items for short periods of time, weeks or months, could be cost-effectively supported, but commercial customers need access to images of checks for up to seven years or more. In addition, to improve upon the standard Film and Index process would require storing information in an index database for seven or more years. Given the tremendous amounts of data that would need to be stored, along with the tremendous computer processing that would be needed to update the index database each day, this process is technically problematic and very costly as compared to the traditional Film and Index process. And as more customers would be added to the bank's database, the problems would only increase in complexity.

One of the most cost-effective media for storing, indexing and retrieving data and images is the compact disk (CD). This media also is quite appropriate for banking purposes because the CD ROM (Read Only Memory) format prevents the alteration of a check, thereby aiding in the use of the image as an accurate reproduction of the check for proof of payment.

The problem with CD ROM's in the early 1990's, however, was that creating or mastering unique CD ROM's for each commercial customer's accounts could only be performed using personal computer-based technology. This technology was too slow to accommodate production of CD ROM's for large numbers of commercial customers in the required time frames. In other words, while technology was available to capture and store (though costly) high volumes of checks, the actual creation of customer-specific CD ROM production was a limitation preventing the widespread usage of CD ROM technology for banking applications.

Commercial customers in the early 1990's were looking into the possibility of creating internal systems for storing and retrieving all of their paper documents, mainly in conjunction with re-engineering efforts that were starting to catch on widely. Even if a company could cost-justify such a system for other reasons, commercial customers still needed a way to include their checks in a manner that was cost-effective and easily maintained. Banks also would need some way to deliver images to these companies. Since it would take hours to transmit even a relatively small number of checks over a regular (telephone) transmission line, that was not a realistic option for all but a handful of companies that could cost-justify high speed transmission lines. As telecommunication costs decrease, as expected over the next few years, transmission of large numbers of images will become more widespread, but only if companies have cost-effective storage and retrieval systems.

Companies also are now interested in finding ways to better control check fraud, mainly because of the rapid rise in check fraud experienced in the late 1980's and early 1990's. Banks for many years have offered services aimed at controlling fraud, such as "positive pay" and "payable thru" (defined below), which provide a way for commercial customers to view the check or check-related information within one day of presentment to the bank. By accelerating the availability of these checks, fraudulent checks can be identified sooner to help prevent many losses from occurring.

"Positive pay" is a service where a file of MICR information from the bank is electronically matched against a file of issued item information from the commercial customer. The resulting mismatches are called "exception" or "suspect" items. Exception items are mismatched items that are different for an easily identifiable reason, like the amounts are different due to a bank MICR dollar amount encoding error. Suspect items are mismatches that result from not having an issue record from the commercial customer, which could mean the company made a mistake or that fraudulent items may have been presented to the bank. In either case, the commercial customer needs to review the actual check or check image (front and back).

"Payable thru" is a service performed with paper drafts or checks that are sorted out from the prime pass capture on the day of presentment (the day the check is presented to the Payor's Bank) and picked up by a customer that is near the bank check processing center. Commercial customers review each presented item, including endorsement verification, before making a decision to direct the bank to pay or return each item.

Both the positive pay and payable thru services have a short time window in which to make a pay or return decision. With both positive pay and payable thru processing, a decision to return an item (for fraudulent or other reasons) must be made within 24 hours of presentment to the bank in order to meet many legal and regulatory guidelines.

Problems exist with both positive pay and payable thru processing, mainly because of the short time window for returning items. Commercial customers using positive pay often ask the bank to manually fax photocopies of presented checks, because the MICR line information is not enough on which to make a pay or return decision. This can be a time-consuming, cumbersome, and costly process for the bank. For payable thru, only local customers can take advantage of the service, so the force of competition does not exist in many areas to keep bank prices down and service quality up. Consequently, payable thru service is rarely used today.

As previously discussed, banks also offer Account Reconciliation Plans ("ARP") or account reconciliation services. Banks offer several ARP plans, based on how much of the reconciliation process the customer wants the bank to perform, but the primary service is the full reconciliation service.

Full reconciliation automates the reconcilement of accounts by accounting for and balancing all paid items, all outstanding items, and any mismatches or exception items using a sophisticated computer software system. Outstanding items are reported based on the check issue records received from the commercial customer. Mismatches or exception items are categorized into separate reports in order to better identify the types of exceptions and the follow up action that might be needed to rectify the exceptions. Items include paid checks and electronic items such as wire transfers. Banks perform this service for commercial customers because the systems, expertise, and support needed can usually be performed better by the bank than the commercial customer alone can do.

While an ARP service is a useful process for commercial customers, up to ten business days or more are needed in order for the bank to complete reconciliations for all commercial customers. Commercial customers need to have their accounts reconciled in order to close out their general ledger and to complete their accounting cycle, so any delays, while necessary today, foster a less productive environment than if the customer had a quicker, more efficient way to reconcile their accounts.

Full reconciliation also has traditionally been dependent upon the customer's ability to identify and report specific fields of information in the check issue record. For a relatively small, but still significant, percentage of commercial customers, making investments and performing all the steps necessary to deliver issue records to the bank is not cost-effective or easy to accomplish. Therefore, all the benefits achievable from a full reconciliation are not available to these customers.

Technology exists to potentially capture information directly from checks to create relevant fields of information for indexing, e.g. MICR capture, optical character recognition (using a font such as OCR-A) capture, and digital image extraction, which could eliminate the need for many companies to send issue records to the bank. However, there is no known method in existence to use all of these technologies together. This situation has come about due to the way each capture technology has progressed, similar to the divergence seen with the development of equipment for POD item capture instead of inclearings, and because each technology has focused on problems that have little to do with reconciliation for commercial customers.

SUMMARY OF THE INVENTION

This invention represents a solution to the difficult task of processing the large volumes of checks (15 to 20 million per month) provided by commercial customers, and providing check data to the customer in a useful and manipulative format. Check data needs to be processed and provided in a useful and cost efficient manner, even though there may be a large number of commercial customers (3000 to 4000) being processed with most customers averaging three to five individual accounts.

With respect to these problems, an object of this invention is to provide commercial customers easy access to large numbers of check images, capture data and issue data on the media of choice in formats compatible to each customers needs which can be maintained for long periods.

Use is made of multiple host applications to combine the high speed capture of electronic check code line MICR data, check images (both front and back sides), reconciled corporate customer data, and media formatting and grouping host software to produce high volumes of selectable media types. The incorporation of an additional customer data field represents a significant advantage over the prior art. Commercial customers find quite useful the ability to search for checks according to specific customer data. Examples of such data include invoice number, shipping order number, claim number, beneficiary name, social security number, employee ID, etc.

One significant media type supported is CD ROM optical media. This media has several advantages, such as reliability and the fact that check images contained thereon cannot be altered.

Another object of this invention is to utilize "matching" techniques that allows recapture of the check images at anytime after the original high speed code line capture (prime capture), performed for the "posting" of the check to a specific customer account in the Demand Deposit Account ("DDA") system. This recapture process allows the check image to be electronically matched to the data processed from the check when it was presented to the bank for payment and consequently updated on the commercial customers account record. Item images that are not matched electronically can be viewed on an electronic display and manually matched by a bank reconcilement clerk with the appropriated original posting data. This recapture process provides significant flexibility for handling commercial customer item images.

Commercial customers typically have multiple accounts. Some of these accounts are very sensitive such as payroll, moreover, different accounts may need to be reviewed by different people. It is a further objective of the invention to allow the customer to specify which accounts should be grouped on a particular media and how many copies should be provided along with specific shipping information. A customer could also request multiple types of formats such as CD ROM, microfiche, 3480 system tape, electronic transmission, or "floppy diskette." This invention also includes a personal computer image display application for use by commercial customers to maintain cumulative transaction item data in their company location with indexing to the check images. The transaction item data can be loaded into the archival data base on the client's own work station from the electronic media of choice (CD ROM, file transmission over dial lines, magnetic floppy disks, magnetic tape, etc.). The check images can be left on the media such as CD ROM's or transfused to magnetic disk hard drives on a storage server or work station hard drive.

The display application provides a tightly coupled trilogy of search screens: item search, search results review and selected image display. This trilogy also incorporates fast switching between search parameters, results listings and selected images for display while at the same time maintaining the previous data result or screen settings.

These and other aspects of the present invention will become apparent to those skilled in the art after a reading of the following description of the preferred embodiments when considered with the drawings.

BRIEF DESCRIPTION OF THE DRAWINGS

FIGS. 2A–2C and 3A–3B depict the general system overview.

FIG. 7B is a block diagram showing the data flow matching the SIF file to the Recapture Data File and subsequent processing flows.

FIG. 7C is a flow diagram illustrating the data flow and processing for the Host Data Preparation Media Format Input Creation process.

FIGS. 8A–8B illustrate the Host Data Conversion Process and the associated files being processed.

FIGS. 16A, 16B, 16C present the series of pull-down menus available through the trilogy screens of the Image Workstation: Search, Search Results, and Image Display.

FIGS. 32A–32B and FIGS. 33A, 33B, 33C are functional flowcharts illustrating the multiple CD Index Loading feature of the present invention.

DESCRIPTION OF THE PREFERRED EMBODIMENTS

GENERAL OVERVIEW

Figure 1:
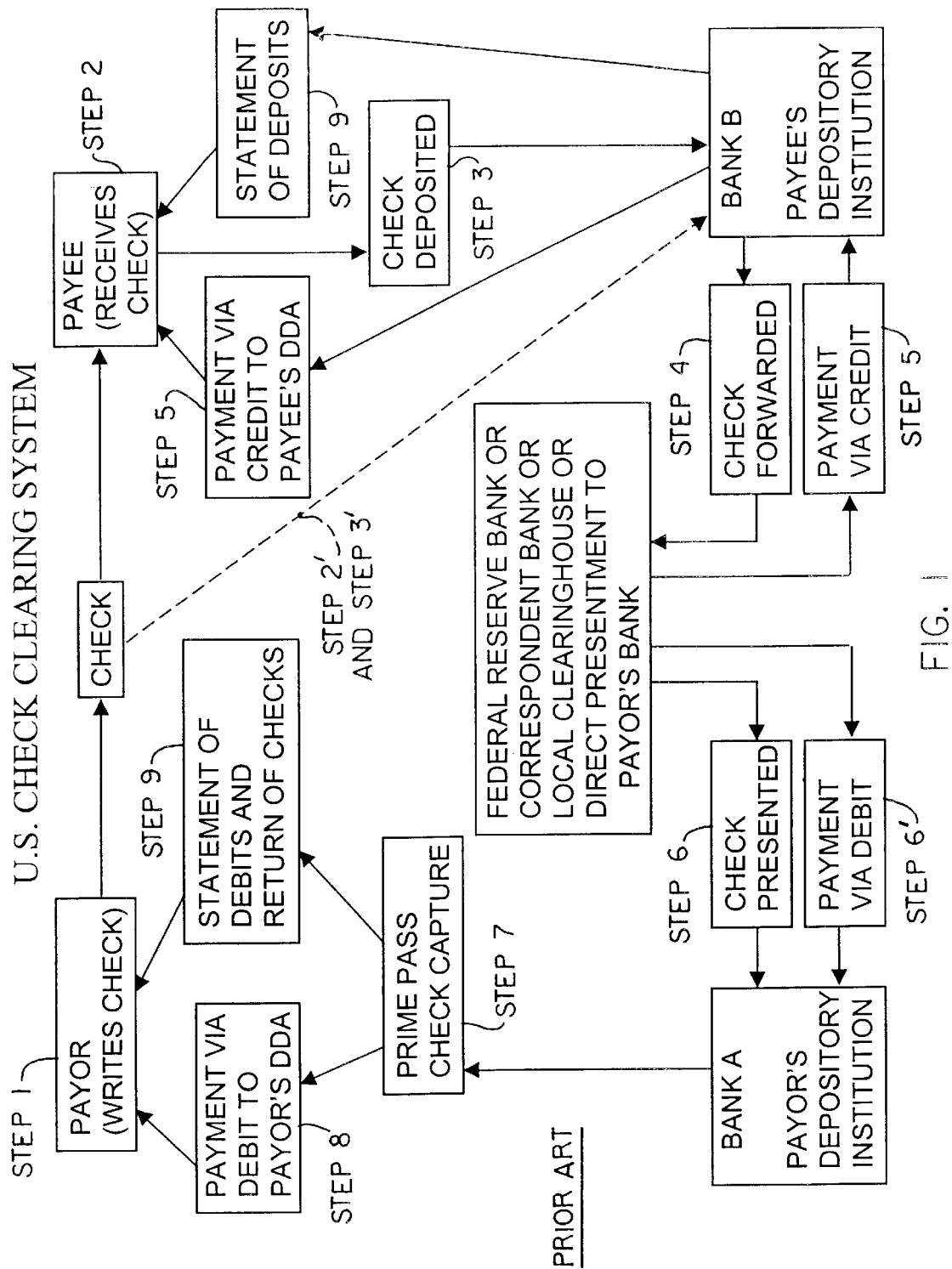
FIG. 1 illustrates the typical U.S. Check Clearing System.
Figure 3A:
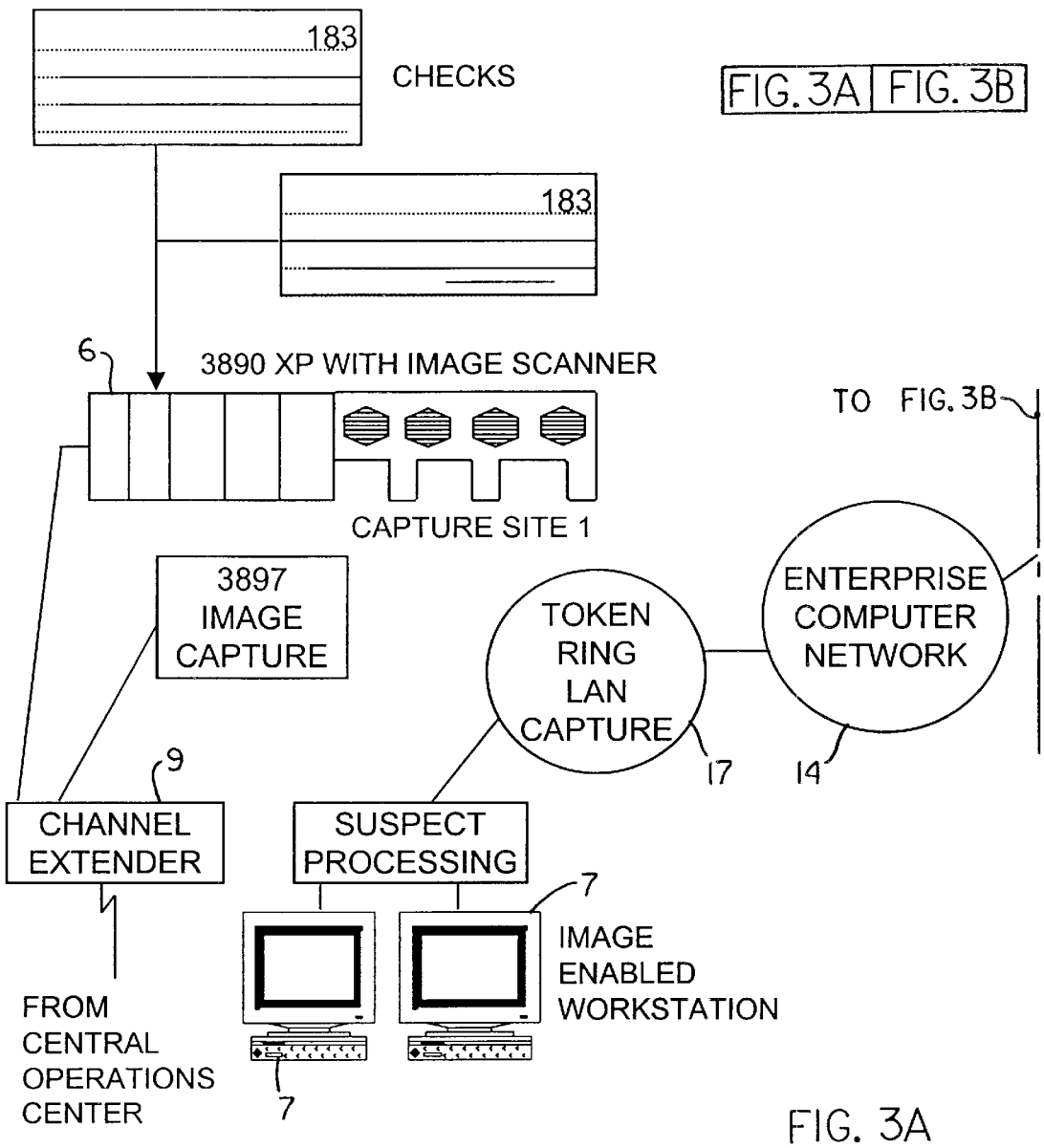
Figure 3B:
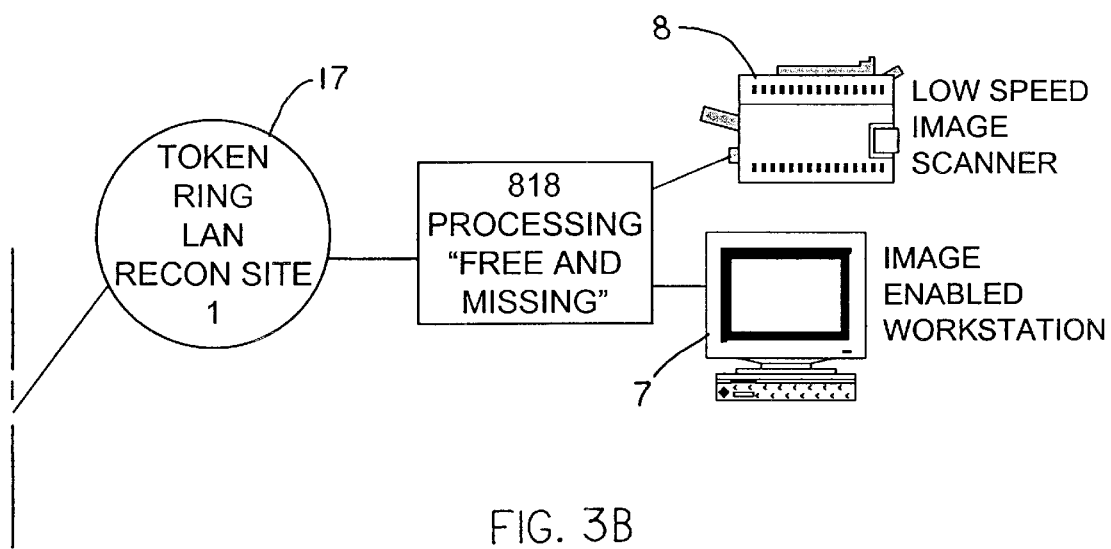

Most of a bank's commercial customers are set up on a month end statement cutoff date, typically known as a month end cycle. At this time, the bank provides a banking statement which reflects the activity for the month and gives current balance information. Instead of simply providing the commercial customer with actual checks or copies of their checks on microfilm, these customers are now given the option of receiving digitized check images in one or more types of media. In addition, the check image is coupled with useful data, making searching and retrieval of checks more efficient and useful. With regard to the variable media feature of this invention, if the customer chooses CD-ROM, all transactions for that accounts' accounting cycle will be written to the CD-ROM as an index file. The check images will also be written to the CD-ROM so that the image can be referenced back to an image item on the index. The customer also has the option to put their paid or check transactions on microfiche along with the associated check images.

Check images are acquired or captured by way of an end of cycle image recapture process. This recapture pass typically is performed in the bank's account reconcilement processing area. Commercial customers of a bank that have elected to participate or subscribe to this system, whether they are internal bank departments, such at Trust Services, or external bank customers, have their physical checks stored in account number order by date on a daily basis. At the end of the account statement cycle, which could be daily, weekly or monthly, an ARP reconcilement process is initiated whereby the paid and miscellaneous transactions are the compared to the debits posted to the customer's Demand Deposit Account ("DDA") resulting in the prime capture pass. A paid transaction is a check that has successfully been cleared by a bank. A miscellaneous transaction is a paper or electronic transaction that affects the balance of the account. At the same time the account is reconciled, the ARP clerk will send the physical checks for that cycle period to a check image recapture site. The image recapture process is performed in a batch processing environment. A customer's account is defined by a check processing batching entry number, which is used in a check processing operations department to track groups of work. This entry number follows the checks through their image life cycle and becomes a key field for identifying and retrieving groups of check images.

The drawings are for the purpose of providing background for, or describing a, preferred embodiment of the invention and are not intended to limit the present invention.

The general system overview and system flow are shown in FIGS. 2A–2C, 3A–3B, and 4. The central system component is a mainframe host processor complex 1 which may typically be a System/370 processor manufactured by International Business Machines Corporation (IBM), Armonk, N.Y. 10504, including associated IBM 3380/3390 Direct Access Storage Devices (DASD) 2 and IBM 3480/3490 Tape Writers 3 and associated operator display terminals 4. The host complex may include tape storage devices, such as automated tape libraries, silos and drives 5 manufactured by Storage Technology Corporation, 2270 South 88th Street, Louisville, Colo. 80028, for long term archival of transaction item data and item images. The DASD 2 contains the Magnetic Ink Character Recognition (MICR) data which are on each check document and identifies the bank routing/transit numbers, the check number, the account number and the amount of the check. Included with MICR data would be system capture data such as capture sequence number, sorter number, capture date, entry number and cycle number. This data is typically contained in the IBM Check Processing Control System (CPCS) Mass Data Set (MDS). The compressed check images are also stored initially on system DASD 2 in the IBM Check Image Management System (CIMS) data base. The check images will be maintained on system DASD until access needs and volumes allow the images to be migrated to a more effective storage medium such as magnetic helical tape.

Attached to the host processor complex 1 are other devices such as the high speed document processors with image scanner 6 and the image enabled work stations 7 including low speed scanners 8. The high speed image capture unit 6 could be the IBM 3890 XP reader sorter with an IBM 3897 Image Scanner. These capture devices can be directly connected to the host computer in a direct channel attached mode, or remotely attached via channel extenuation over high speed dedicated telecommunications lines using equipment such as HYPERchannel provided from Network Systems Corporation (NSC), Suite 212, 1011 East Main Street, Richmond, Va. 23219, with special switching converters 9 known as channel extenders. Moving the MICR information can be done over a high speed T-1 telecommunications line, but the T-1 does not have enough bandwidth to move the image data fast enough to keep up with the sorters, which can capture up to 2400 items a minute. When the bandwidth is too small, the reader sorter must stop and wait until there is enough bandwidth to continue capturing. A higher speed T-3 telecommunications line typically is required because it has enough bandwidth to transmit the images fast enough so the sorter will not have to stop. The T-3 can transmit 44 Megabytes per second. Up to three IBM image sorters can capture images and transmit the data over the T-3 to the centralized CIMS database. A T-1 is still used to transmit the MICR data to the MDS. This allows capture to be done at remote locations within a central complex or in other cities using a single central processor at the central complex.

The image enabled workstation 7 consists of Personal Computers running OS/2 and application software such as IBM's Image Statement Application and Application Library Services (ALS). The workstation also includes graphic display adapters and video displays. Low speed scanners 8 such as model Copiscan II Model 3238 from Bell & Howell, 6800 McCormick Road, Chicago, Ill. 60645, can be attached to an image workstation for capturing images that could not be captured correctly on the high speed capture units. The image enabled workstations can be located in a distributed work group in different cities utilizing typical computer network switching and local area networks 14. This allows the reconcilement clerks most familiar with a specific commercial customer account to work the balancing of the transaction account data with images captured at multiple capture sites.

The DASD 2 and tape writers 3 attached to the central processor 1 can also be utilized to supply the customer data and images formatted for the specific customer system requirements. The check data and images can be stored in files on DASD for subsequent transmission to a commercial customer or they can be placed on a System Tape 3 for physical transportation and transfer to the customer's host system. The System Tape can also be formatted for processing by microfiche and microfilm third party processors.

Another device attached to the central processor 1 could be a CD-ROM authoring system such as the Enterprise Authoring System (EAS) from Data/Ware Development, Inc., 9449 Carroll Park Drive, San Diego, Calif. 92121. This system contains host Image Build software applications, a DW 34850 Control Unit and up to four CD writers 10. The system also includes a CD label printer 11 Model DW 39602 available from Data/Ware Development, Inc., controlled by a Personal Computer 12 running Data/Ware Development, Inc. application software for label printing. This system provides a high capacity CD production system for placing document images and transaction item data for individual commercial customers on Compact Disc-Writable (CD-W) technology. This authoring system combines host data preparation, a bus and tag channel attached CD writer system and a PC Windows based label printing system that allows the creation of many unique CD's during a single night for distribution to users the next business day. The CD-W media used in this process could be Kodak's Writable CD with Infoguard™, available from Eastman Kodak Company, 343 State Street, Rochester, N.Y. 14650.

Functionally, documents such as checks are passed through document processors 6. The checks for commercial accounts are selected, and broken out on the prime pass and later sorted by the individual account for storage and for end of the month image recapture. Optionally all accounts requiring electronic images can be selected and broken out as a large group for image recapture each day. This would eliminate the need for sorting and storing the checks by account. The documents selected for imaging are then passed through a high speed document processor with an image scanner 6 in order to capture the digital image of the document. The MICR data and document images are stored on system DASD 2. Data extract programs such as CISX™ or CASH™ from Check Solutions, 8375 Tournament Dr., Suite 300, Memphis, Tenn. 38125, are then utilized to create a complete file listing of all documents processed for the selected corporate accounts on a given day. Also programs such as the Wachovia developed ARP extract programs (SIF Creation FIG. 7A), which extracts and analyzes the appropriate data needed for subsequent processing, can be used to create a file listing of all documents processed for a specific account over a desired time period. These files are then formatted for compatibility with IBM's Image Statement Recapture Match program. This Recapture Match (RCM) program matches the MICR data and associates the image capture identification key with the original MICR capture data used in "posting" the check to the customer account. Items that do not match become either "missing" or "free". Reconcilement clerks using the Image Enabled Workstations 7 running IBM's Statement Interactive Session Application (SIS) can select "free" items, view the images and match the image with the appropriate "missing" MICR data. After free items are matched, true missing items can be located and manually scanned into the system using the low speed scanner 8. When the matching process is complete all images are in the CIMS data base and the recapture image identification keys are associated with the original prime pass MICR check data. This data can be stored for later processing or used by Check Solution's media formation program to create data files for media creation.

Each commercial customer account is set up on a personal computer using a relational database, such as Check Solutions' System Control Facility (SCF) application. This application utilizes a relational data base to maintain a list of all accounts and unique processing parameters for that account, such as media type, number of copies, accounts associated with a customer number and suffix, customer names and addresses. This data is maintained on a personal computer and transferred to host files for processing by the Check Solutions Media Formatting Input application (MFI). The MFI application will process the listing of all "matched" items and associate all check data records including the image identification key for each account and will organize the data in groups by media format type. Thus all checks for each account to be included on a media for a particular commercial customer will be organized together and all commercial customers data for a specific media will be organized on the same MFI file.

The MFI file is then used by a conversion and formatting application such as the Host Data Conversion Interface (HDCI) application from IBM Image Services, 1001 Harris Blvd., Charlotte, N.C. 28262. This application determines if an image file should be included with the electronic data record and the desired compression format of that image. There are two common compression formats, the IBM ABIC proprietary compression format or the Consultative Committee for International Telephone and Telegraphy (CCITT) Group IV (G4) MMR standard. The application also builds the required output format desired such as for CD ROM creation, microfiche creation or file transmission. The HDCI Media Format Output files (MFO) are then used to create the actual media or files for transfer to the commercial customer.

The customer Image Display workstation then utilizes the electronic data from file transmission, floppy diskettes or CD-ROM's to create a cumulative transaction item record data base with the image identification key and volume numbers containing the desired image. Once the indicated volume containing the image files is addressed and linked (drive and path) the software application on the image workstation can access the specified image file, decompress the named image and display the image of the check or document on the workstation display. The workstation application can be used to request a specific image using serial number or bank capture sequence number along with the posting date. Also other record data can be searched for a listing of all possible items matching the specific search request. The ability to search on commercial customer supplied data contained in the additional data field such as Payee name, social security number, employee number, claim number, invoice number, adds significant productivity savings for the commercial customer. The selected images can be transferred to the MS Windows clipboard or printed using the MS Windows Print Manager. Images from the clipboard can be inserted into word processing applications and print files from the Print Manager can be sent to fax processing applications or printed on attached printers.

In the overall summary, original check documents are processed on high speed image capture processors 6 such that digital images of the front and back of the check are stored on DASD 2. An image identifier key is associated with the MICR data in the IBM Check Processing Control System (CPCS). All financial transaction activity relating to a commercial banking account is collected in an account reconcilement plan system, such as the ARP System available from Servantis Systems, Inc. (formerly DISC, Inc.), 25 Crossroads Drive Suite 300, Owings Mills, Md. 21117-5450. The Wachovia ARP extract programs (SIF Creation, FIG. 7A), which retrieves appropriate data from the account reconcilement system master files, provides a means for the reconcilement clerk to specify the customer number ready for media creation and the date range of desired transaction data. The extract program determines all records associated with each account to be included on the customer media. The program also identifies which items have images and which items are just electronic transactions. The extract program also includes customer supplied data and the status of each item. This data is also formatted to be compatible with IBM's Statement Data File. The ARP extracted posted MICR data is then matched with the recaptured MICR data and associated with the captured digital images so that each item identified as having an image has the image identification key associated with the full transaction record data. Reconcilement clerks using an Image Enabled Workstation 7 locate and scan any missing images so that they are also associated with the proper transaction record data. The matched images and commercial customer transaction record data is then processed by Check Solutions' Media Formatting Input application to organize all customer accounts for a particular media format in the correct file structure with the processing parameters required by the IBM Host Data Conversion Interface applications. The Host Data Conversion Interface application then retrieves each digital image (front and back) for each record containing an image identification key and formats the image in the desired compression scheme. This data is then placed in a host file for transfer to the desired media. One media type could be compact disc (CD) writable media which could be used in conjunction with a CD authoring system such as the Data/Ware Development, Inc. Enterprise Authoring System which would produce CD ROM's that would contain a complete transaction item record index along with the digital images of the front and back of each check or document. The transaction item index would contain the posted MICR capture data, customer supplied issue data and the unique CD volume and image file location on the CD for each check image. A personal computer utilizing MS DOS/Windows and a display application such as the Wachovia Connection Image Workstation Application could then be used to update a cumulative transaction item record data base on the workstation with the new transaction item records from the current period CD. The cumulative index data base can then be searched by a variety of indexed fields to locate desired check images. The indicated CD volume can be loaded into an attached CD drive and the requested images displayed on the commercial customer workstation. Also the cumulative transaction item data base can be used for research and to assist with settlement of the current period data.

HIGH SPEED DOCUMENT IMAGE MEDIA CREATION SYSTEM

Figure 4:
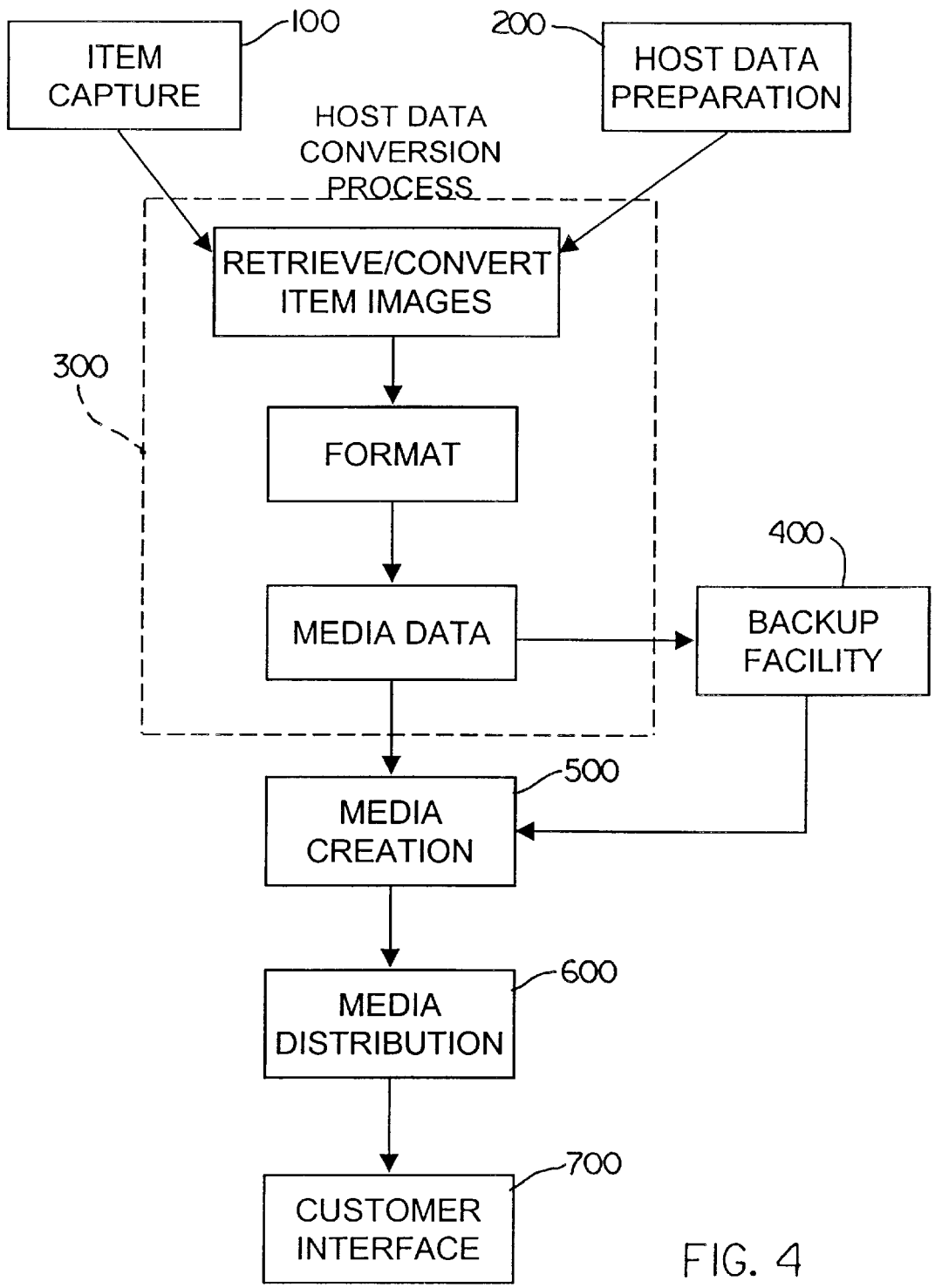
FIG. 4 is a block diagram depicting the system functional overview.

The overall system configuration and associated devices are shown in FIGS. 2A–2C and 3A–3B. The overall functional flow of the High Volume Financial Image Media Creation and Display System is shown in FIG. 4. The process contains the following major functional elements: item capture 100, host data preparation 200, host data conversion 300, backup/recovery 400, media creation 500, media distribution 600, customer interface 700.

ITEM CAPTURE (100)

Figure 5:
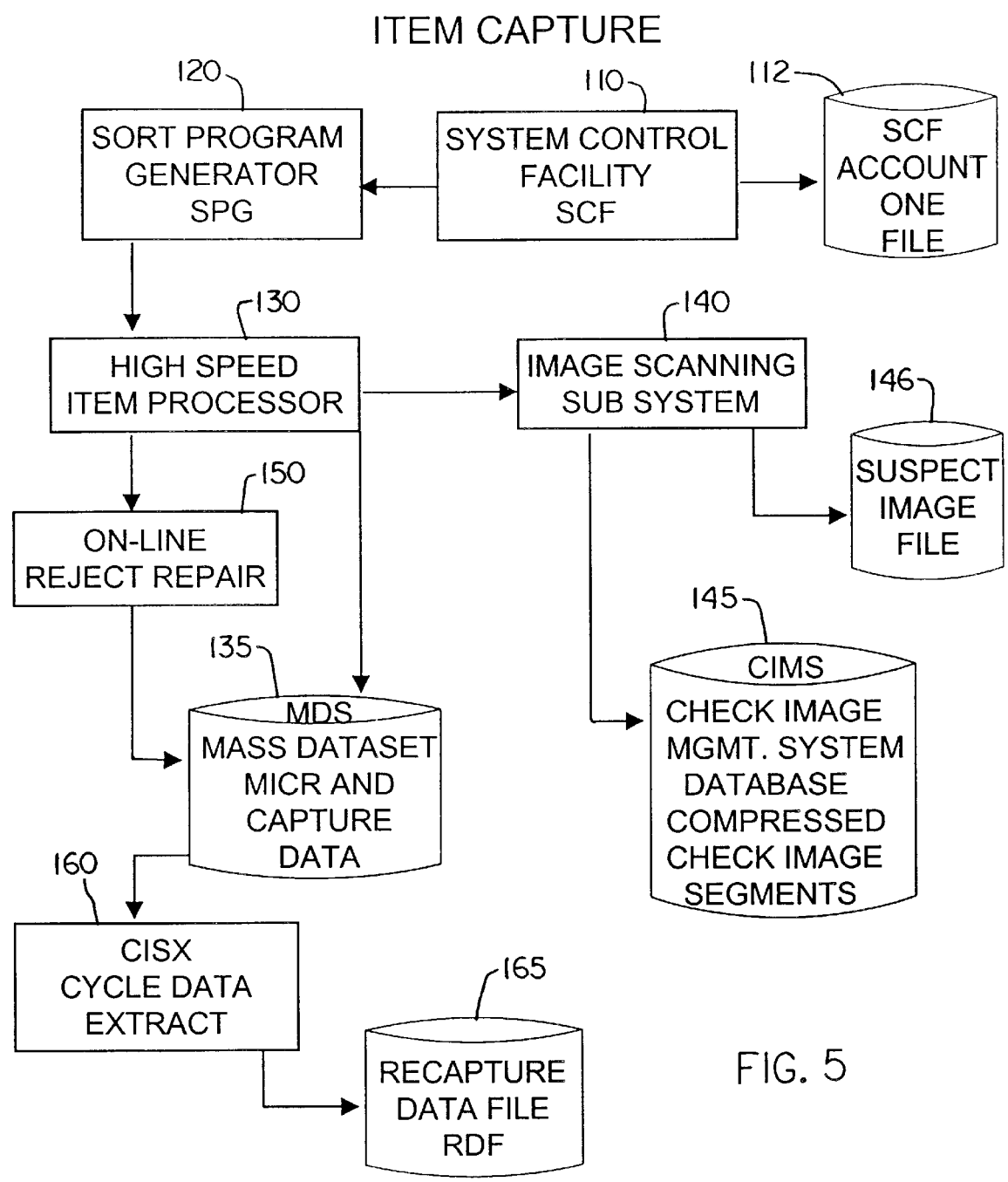
FIG. 5 is a flow diagram illustrating the process for Item Capture.
Figure 6:
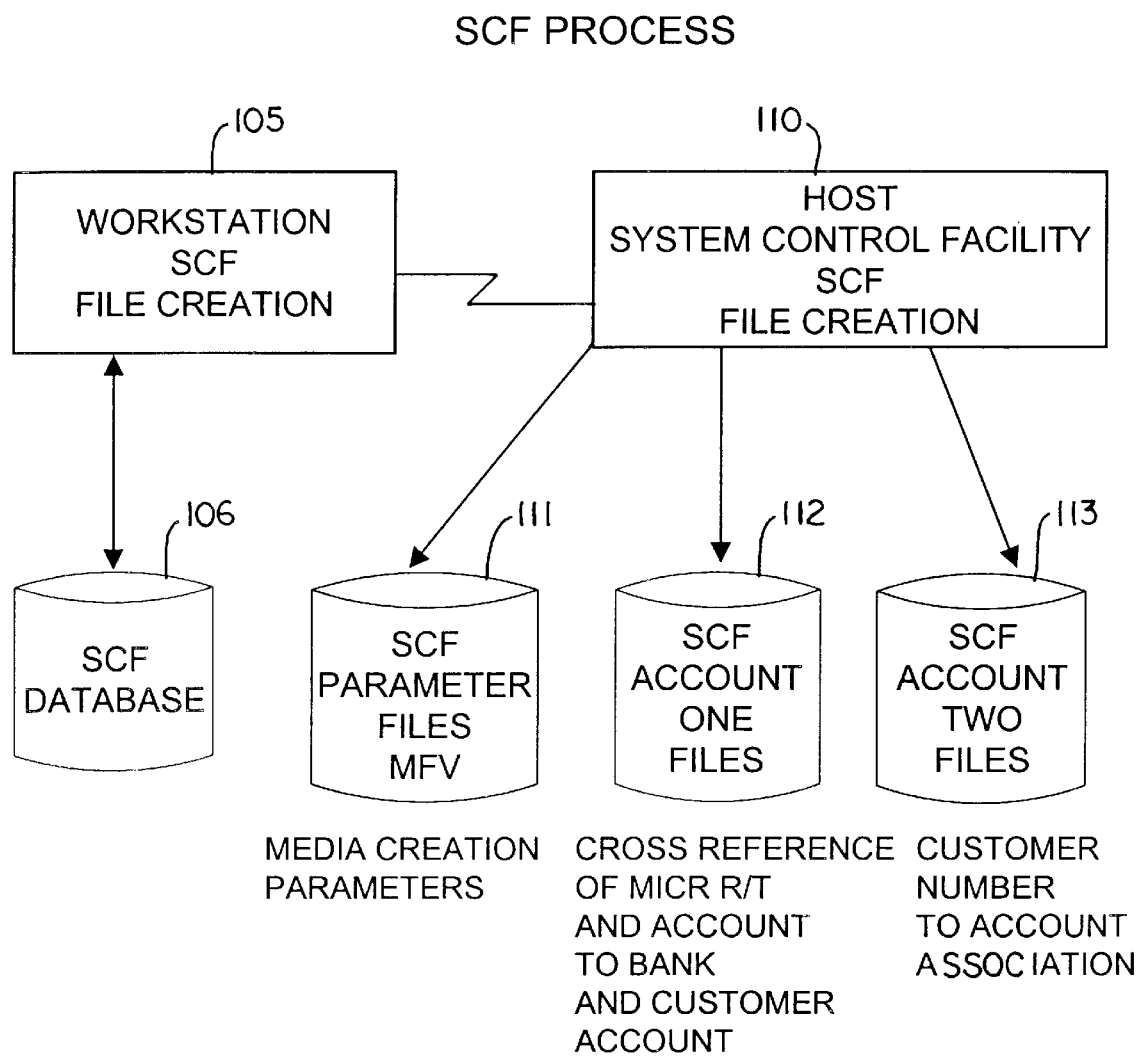
FIG. 6 is a flow diagram showing the Sort Control File (SCF) Process of how one updates the control file for controlling overall system parameters and flow.

The system flow for item capture 100 is shown in FIG. 5 at 110, 112, 120, 130, 135, 140, 145, 146, 150, 160, 165. The System Control Facility 110 such as the SCF application available from Check Solutions creates tables with customer specific processing information for each valid MICR account number. These parameters could include the master customer number and all associated account numbers to be grouped on a single media, the media type, number of copies, customer name, address, and item number. The (SCF) 110 also contains processing parameters that are constant for a given media such as the CD creation parameters for the CD authoring system or the microfiche processing parameters. The parameters could contain CD media size, number of images per directory, number of images per file, file naming, tape label names, data set names, index type, CD volume naming microfiche index sort order. The System Control Facility (SCF) 110 also contains the sort type to be used by the check processing control system such as the CPCS 1.11 application available from IBM. The SCF file 110 is maintained on a personal computer running a data base application such as the DB/2 database available from IBM. The functional flow for the SCF process is shown in FIG. 6 at 105, 106, 110, 111, 112, 113. Reconcilement clerks familiar with each commercial customer's account and media requirements updates the SCF data base with the data parameters discussed above. The SCF data base 106 on the personal computer workstation 105 is periodically uploaded to the host mainframe computer 1 running the host component of the SCF application 110. This application creates and maintains three main files:

SCF Parameters File 111 contains processing parameters that defines the unique aspects for creating different media formats.

SCF Account One File 112 is a cross reference of the routing and transit field and account field contained on the check magnetic character code line (MICR) related to the specific internal bank numbers and DDA commercial customer account numbers. These numbers can be different due to mergers and acquisitions where the customer DDA number on their checks are not changed or re-issued by the acquiring bank.

SCF Account Two File 113 is a table file of each commercial customer number used by a particular commercial customer using the image media output. A single commercial customer may have multiple commercial customer numbers differentiated by a suffix identifier discussed later in this section. Each customer number will have one or more DDA account numbers associated with the customer number for the purpose of grouping accounts on a given media output.

The SCF 110 uses the SCF Account Two file and sort type to indicate to the Sort Program Generator 120, such as Check Solutions' SPG 3.1 application, the specific account numbers that should have the check image scanned by the high speed image capture device such as the 3890 XP with 3897 image scanner available from IBM. As each item is processed, the magnetic coded MICR data on the code line of each item is processed and stored in the Mass Data Set 135. All code line data that passes the edits of the Sort Program Generator 120 will have the digital images of the front and back of each item stored in an image data base such as the Check Image Management System (CIMS) Data Base which is created by the CPCS 1.11 and ALS 2.0 host applications available from IBM.

Items that have no MICR data passing the edit will be directed to the system reject pocket. These items must be corrected and recaptured using a low speed reject repair system such as the Rejects Application available from BANCTEC SYSTEMS, INC. a division of BancTec USA, Inc., 10 Inverness Center Pkwy., Suite 400, Birmingham, Ala. 35244. These items must then be added to the image data base using the missing item process and low speed scanners discussed later. Items that have partial code line information recognized such as account number or routing and transit or amount or serial number fields will be temporarily rejected by the check processing system, however the image will be stored on the image data base. This code line data can then be corrected by keying the correct code line data using the on line reject repair (OLRR) application 150 within the Check Processing Application. After all rejected code lines are correct the system will have all MICR code line data placed in the MDS 135 and images associated with that code line data will be contained in the image data base CIMS 145. The mass data set also contains the unique image identifiers that are used to access all images segments (front and back with black/white or gray scale image compression) for a specific item MICR record on the MDS 135.

The Image Scanning subsystem 140 contains internal quality detection that identifies suspect images based on various combinations of parameters flagged by the capture hardware. Any image flagged as a suspect is listed in a Suspect Image file 146.

HOST DATA PREPARATION (200)

Figure 7A:
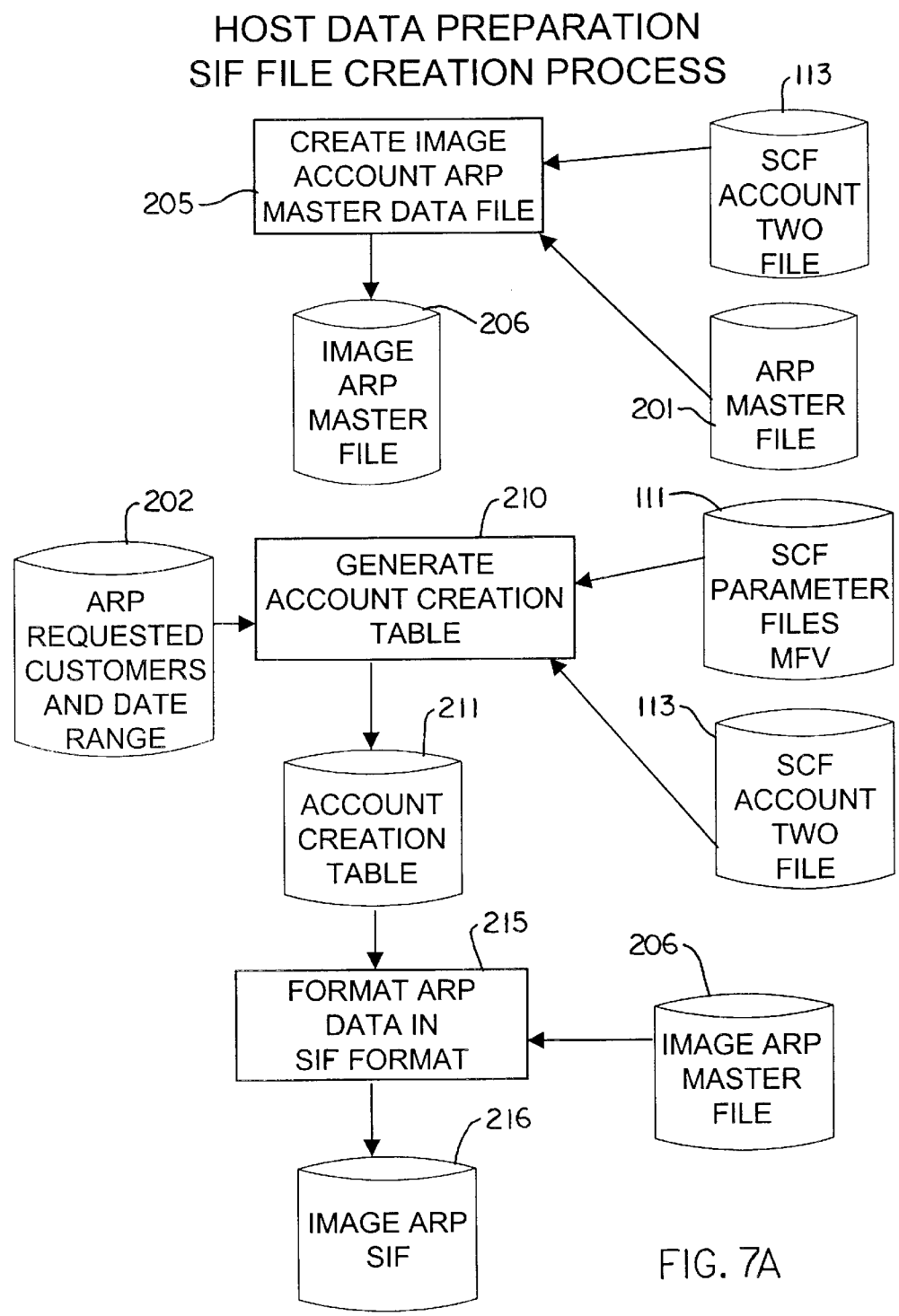
FIG. 7A is a block diagram showing the creation of the image ARP SIF file from the ARP Master Data File.

The system flow for Host Data Preparation 200 is shown in FIGS. 7A, 7B and 7C. FIG. 7A shows the functional flow of the Wachovia ARP extract program that generates the Statement Interface File (SIF). The account reconcilement plan system (ARP), such as the ARP System available from Servantis Systems Inc. (SSI), accumulates data from commercial customers typically called issue data. This data could contain the account number, serial number, amount, and check issue data. Also, this data can contain an additional data field of up to 50 bytes or more. This field could contain any customer defined data such as payer information, vendor numbers, purchase order numbers or employee serial numbers. As electronic transactions (credits, debits) or checks are posted to the commercial customer account, the SSI ARP System accumulates this data and matches it to the customer issue data. Any differences are resolved by a reconcilement clerk and/or the actual commercial customer. Any needed corrections are made to the data contained in the ARP System ARP Master File 201. The ARP Master File 201 contains all transactions posted to the commercial accounts. These transactions include paid items, cancels, stops, issues, electronic debits and credits, and paper miscellaneous debits and credits. The fields for these transactions are:

Paid Item—account number, serial number, sequence number, bank number, paid date, amount and additional data.

Issue Item—account number, serial number, issue date, bank number and additional data.

Cancel—account number, serial number, cancel date, bank number, and additional data.

Stops—Account number, serial number, bank number, stop date, and additional data.

Electronic and paper debits—account number, serial number, paid dates, bank number, paid date, and additional data.

Electronic and paper credits—account number, serial number, issue dates, bank number, and additional data.

All paids, issues, stops and cancel records could have additional data. Electronic items always have additional data.

An Image ARP Master File 206 is created from the ARP Master File 201 each day. The create Image Account Master File Application 205 uses the SCF Account Two File to determine the current image customer accounts and strips the data associated with those accounts from the ARP Master File 201.

To request an SIF file, the reconcilement clerk enters a date range and a customer number made up of, for example, the six digit Dun & Bradstreet company number with a three digit suffix. (Other company identification numbers or sequences could be used as well.) The suffix is used to separate different customer accounts for a given media or to allow the same accounts to appear on two different media types or media sets. This will then initiate the Generate Account Creation Table Application 210. This application uses the requested customer number(s), and date range 202 for the requested cycle, the SCF Parameters File MFV 111 and the SCF Account Two File 113 to determine the account numbers and media type for each customer. The resulting Account Creation Table 211 is then used by the Format ARP Data Application 215. The requests are grouped by cycle numbers in order to control how work is submitted to the Recapture Match (RCM) process 245, 246, 247.

The Format ARP Data application 215 analyzes the specific transaction record types and data to determine if a physical document has been captured by the check processing system or if it is an electronic entry. The application assigns the proper image indicator and item status code (paid, stop, cancel, etc.) to the transaction data. These fields are used by the Wachovia Connection Image Workstation application for search and display functions.

The Image ARP SIF file 216 created by, the Format ARP Data application 215 contains the data in the specific format compatible with the image statement application such as the HPTS Statement Application available from IBM. The creation of the SIF file drives the media creation process. This process can be used by non-ARP applications provided they have a way of putting their item application data in the defined SIF record format. The resulting SIF file can then be used to initiate processing of this non-ARP item data.

The functional flow of the image in the HPTS Statement Application is shown in FIG. 7B. An extract application such as the CISX application 160 available from Check Solutions would be used to take all captured items in the Mass Data Set 135 and the CIMS Image Data Base 145 and places them in the Recapture Data File (RDF) 165 arranged and formatted to be compatible with the Statement Application (See FIG. 5). Once the SIF file is created for a cycle, the ARP area notifies the check operations area of the of the cycle number and the entry number. The check operations operator logs onto image CPCS and brings up CISX for the CPCS cycle the recapture items were captured under. An option to create a RDF (Recapture Data File) is requested bringing up options for the available cycles. The operator chooses the cycle the ARP area identified and then enters the entry number(s) for that cycle. CISX will start a task to retrieve the MICR code line and item sequence information for that entry on the MDS and loads it into a RDF file. The PMF (Profile Management Facility) available from IBM, is used to identify the correct input and output files by cycle. The RCM job for that cycle will be triggered once the RDF file is created. The Check Solutions developed Statement Data File Preprocessing application 230 would also be executed on the Image ARP SIF 216 file. This application would truncate and save all carry along data (customer issue data and ARP system data) and then format the remaining check posting data in the Statement Data File (SDF) 231 formats used by the HPTS Statement Application.

The HPTS Statement Application Suspect Selection 220 and Suspect Processing 225 programs process the Suspect Image File 146 created during image recapture and changes the MICR record data so that all suspect items match with the posted MICR data. Various data fields are changed to all 9's in the modified and sorted RDF file 235. The HPTS Statement Recapture Match Application (RCM) 245 matches all checks captured on the image processor and listed in the RDF file to the Statement Data File (SDF) 240 that was constructed from all items marked as Image items from the items posted to the customer account for the period of time requested by the reconcilement clerk. The matching process uses the routing and transit number, the account number, the serial number and if desired, the amount from the MICR data. All records in the RDF 235 that match the SDF 240 will be passed to a Check Solutions developed Exception Split Application 250 via two files, the Account Summary File (ASF) 252 and the Image Access Key (IAK) 251. Items that do not match the SDF will be listed as "free" items 263, 264 and items that are not included in the RDF will be listed as "missing" items. The IBM HPTS Statement Interactive Session (SIS) 255 application allows an operator to view "free" images on the Image Enabled Workstation 7 and match up the image with the "missing" MICR record data. Once all free items are matched, the remaining missing items can be located and scanned using the low speed scanner 8. All suspects that were forced as missing can also be physically located among the recaptured items using the recapture sequence number printed on the back of the physical item and then manually scanned into the system using the low speed scanner 8. After the missing and free items are matched these records are also passed to the Check Solutions developed Exception Merge Program 265 via the IAK files. The main purpose of using this Recapture Match (RCM) 245 process is to link the posted MICR code line data captured when the item originally was posted to each customer's account, to the Image Access Key (IAK) 266, 267 for the recaptured image of the item that was assigned during the high speed image capture. This image recapture can occur any time after the original code line was captured and posted via prime pass item processing.

The recapture process can be made the most efficient by performing the image recapture daily immediately following the prime pass item capture. This enhancement to the process can be made by building and updating a cross reference file. This file would associate prime captured and posted MICR code line data with the image identification key. This cross reference index would be used during the media creation at the end of the cycle to build the MFI files, 281–283 (FIG. 7C). During the end of the cycle recapture process, the MFI files are built at the time of the recapture match processing. By moving the quality suspect review and the missing and free processing to a point immediately following the original capture, the number of mis-matched items needing re-scanning is greatly reduced. The end of cycle or daily recapture processing allows the high speed image scanning processors to be centrally located to maximize equipment utilization and reduce the total number of item processors that might be required if an image capture device was located at all processing locations.

The main purpose of the Exception Merge 265 is to keep track of accounts that have exceptions and manage the processing of good accounts and unmatched accounts that need to be passed to SIS 255. The Exception Merge program also manages the updating of the IAK file to ensure all items have good matches with an image key. The Exception Merge application 265 gets updates from SIS 255 and in turn updates the IAK file 251 passed from RCM 245 system data and the image identification key 257 (from the IAK file) associated with the original posted MICR data for each item for each account in the original SIF file. This data, in the form of an SIF file and IAK file, is then passed to the Check Solutions developed Media Splitter application. The data can have account specific processing parameters set in the SCF parameter tables if desired.

The Media Split Application 270 combines or merges the Image ARP SIF 232 data with the updated IAK 266 coming from the Exception Merge Application 265. This ensures all ARP system data, customer issue data and additional data fields are kept associated with the posted MICR capture data and the image identification key such as the Image Access Key (IAK) assigned by CPCS.

The Media Split Application 270 also uses the media type identification parameter maintained in the SCF Parameter Files MFV 111 for each account. This application breaks the Combined SIF and IAK file 271–273 data for each account into multiple files. One set of combined SIK and IAK files is created for each media type defined for the accounts contained in the SIF file. By grouping all accounts with the same media format requirement, the pre-process formatting steps can be more efficient and timely.

The combined SIF and IAK files 271–273 organized by media type are then processed by the Media Format input (MFI) application 280. Program execution parameters are maintained in the SCF Parameter Files MFV III tables for each specific media type. The output files will have the data arranged in the specified formats with optimum file sizes for the Host Data Conversion Processing. For example for microfiche creation, the file will have all accounts to be processed on a given day. For CD creation one file will be created for each CD volume set for a specific customer number.

The Media Formatting Input application 280 builds the MFI files 281–283 for each defined media type. The generated MFI file 281–283 contains customer identification, media specific control information, media labeling information, shipping information, specific files to be included (such as special programs), carry along data (customer issue data and ARP system information), the specific SDF item data, and account identification records. Each of these records has a predefined format that is recognized by the Host Data Conversion Application such as the HDCI application provided by IBM.

HOST DATA CONVERSION PROCESS (300)

Figure 8B:
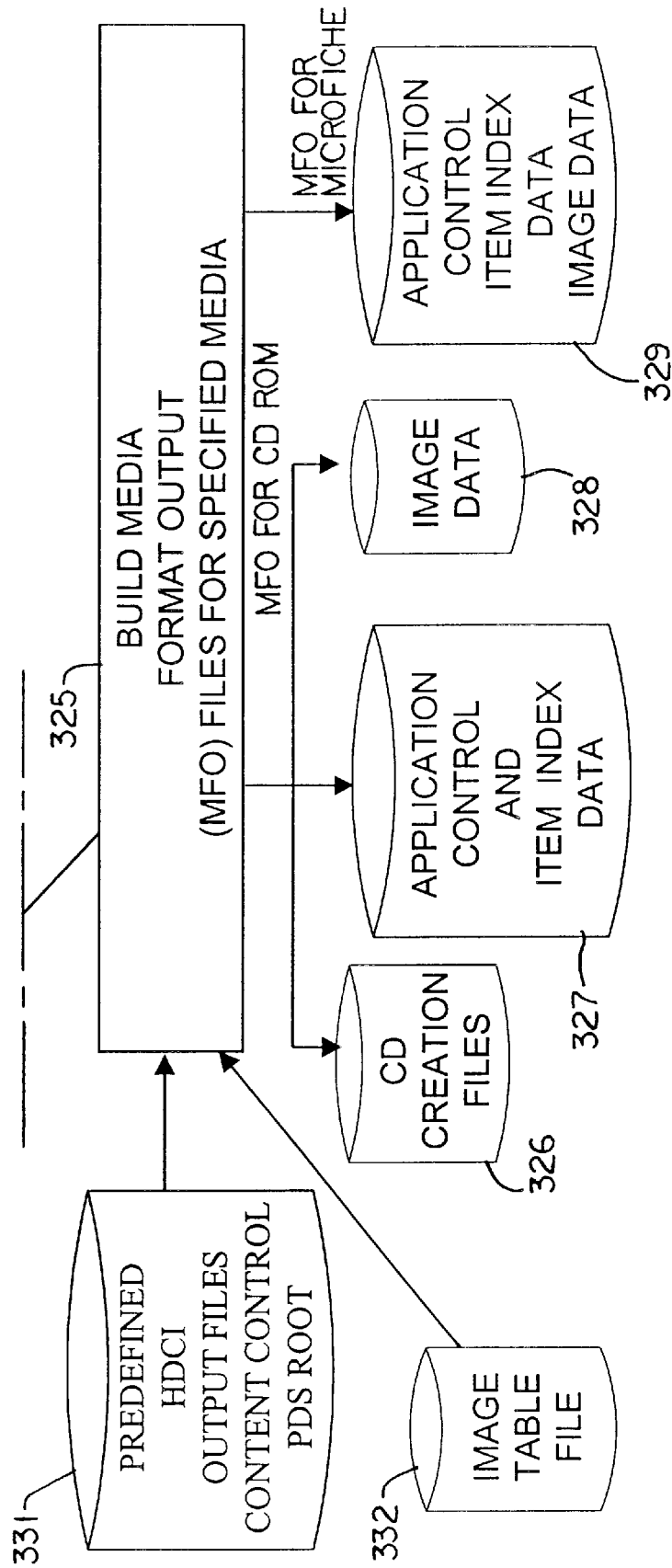

The Host Data Conversion Functional Flow is shown in FIGS. 8A–8B at 305, 306, 307, 308, 311, 315, 320, 325, 326, 327, 328, 331, 332. The Host Data Conversion Interface (HDCI) Application 300, shown in dotted lines in FIG. 4, has Retrieve Image, Image Compression Conversion, Format Data and Build Media Format Output functions. The Retrieve Image Function 305, shown in FIGS. 8A–8B, uses data in the MFI file 281–283, SCF Parameter files 303, HDCI Parameter File 302, Batch Controller File 301, and CIMS 145 to retrieve the front and back item images along with the full transaction item data. The Image Compression Conversion program 310 will also pass compressed images to the IBM 3898 16 if the image needs to be decompressed and compressed in a different format. This conversion step is controlled by the media type and parameter file settings. This conversion is particularly useful for a general purpose media creation facility that can support multiple compression schemes. Microfiche vendors already have software that decompresses CCITT TIFF G4 images in order to transfer the digital image to microfiche. Therefore by converting images contained on the CIMS data base 145 from the IBM compression scheme of IOCA ABIC to the TIFF G4 compression, the microfiche processing does not have to perform a lengthy conversion process. Likewise this is useful when providing images to a commercial customer who wants to use conventional TIFF G4 display applications for viewing the images within their own internal applications.

The Host Data Conversion Interface (HDCI) Application 300 is programmed for specific media to create the appropriate output file or files. In the case of commercial customer tape output or microfiche, IBM 3480 or IBM 3490 system tapes are generated with accounts for a specific commercial customer or with multiple commercial customer accounts to be processed by the microfiche vendor. A sample file definition and layout for commercial customer tape output is set forth in a separate section below.

The CD creation process requires multiple files. The HDCI program 300 is set up to create all files required by the Data/Ware host Image Build application. The HDCI program creates a Build Control file, Build Content File, Image Files, Index File, Application Control File, Abstract File, Copyright File, Bibliographic File, Data Preparer File, Publisher File, Application Identifier, Boot Record, CD Label (WHATCD.TXT), CD Volume (WHATVOL.TXT), CD Copy (WHATCOPY.TXT), and Shipping (WHERECD.TXT). Some of the above files are in host EBCDIC data format. However a number of the files have to be in ASCII format as it would appear on the CD ROM. The file naming on the CD ROM also must be consistent with DOS file naming conventions. The HDCI application 300 maps the host file names to conventional DOS file names and performs file format conversion where ASCII format is required. Another feature of the HDCI program 300 for CD media is to keep track of the file size as it builds records and images and determines when a new CD volume must be allocated. The HDCI program can define the CD size and generate multi-volume sets. It can also place an index on each CD for the item records on that CD and can also include a cumulative index on the last CD volume with all items records for the full volume set. The index file is generated as the records are processed and images are retrieved from CIMS. HDCI Parameters establish how many images to place in an image file and how many image files to place in a directory so that conventional DOS Directory naming conventions can be maintained when a single CD may contain 20,000 to 30,000 image files. This transaction record index built by HDCI contains the posted MICR data, check processing data, commercial customer issue data, ARP system data, the volume name of the CD containing the image, and the Item name indicating the file and location within the file for the front and back image segments. This transaction record index file can later be used by an image workstation application to locate and retrieve the specific check or document images from the CD ROM's.

In summary the Host Data Conversion process 300 takes the MFI 281–283 data for a given media and retrieves the digital images of the items from CIMS 145, converts the compression format if required, and places the posted MICR and check processing control data, customer issue data, and ARP system data in the output file with each compressed image for any item defined as having an image. The records can be in the MFI input order or rearranged in a specified order based on amounts or serial numbers. For CD media creation the HDCI program builds an index file that identifies which CD volume the image is located on, and the location of the image segment (front image and/or back image segment) on the CD volume. The application can fill each CD volume to a specified size and dynamically allocate additional CD volumes as needed to process all images and transaction item record data for a specific commercial customer.

From the earlier discussion it can be seen that the host application for data conversion is a very flexible component of the overall process and can be easily modified and reprogrammed to handle a variety of different media formats. Several specific media will be described below. However, any future format could be handled with redefinition of the output format and inclusion of specific programming logic to generate the media specific data. The potential media types and creation process described will demonstrate a broad range of potential applications that could use the various media types.

BACKUP FACILITY (400)

Figure 13:
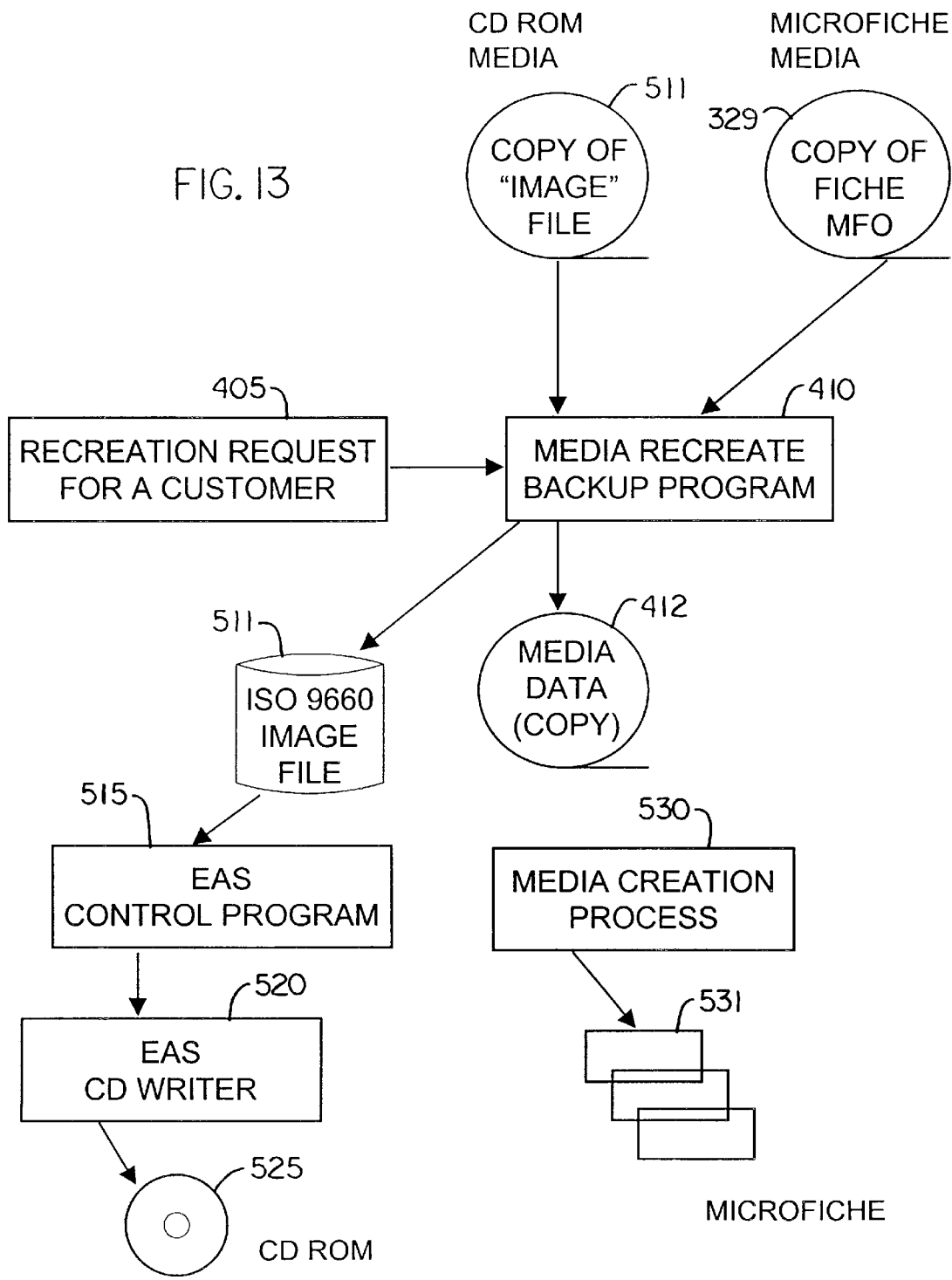
FIG. 13 is a data flow diagram showing the Media Recreation process for microfiche and CD-ROM.

The media recreation functional flow is shown in FIG. 13. During CD-ROM media creation 405, 410, 511, 515, 520, the output file from Data/Ware Development, Inc.'s Image Build Program 510 is copied to tape. This tape copy of the ISO 9660 Image File 511 can be archived for later re-creation of a CD.

The Media Recreate Backup Program 410 available from Check Solutions keeps track of the location of the files copied to a specific tape volume. This information is associated with the commercial customer number and the cutoff date the account was reconciled. If a CD for a given commercial customer and cutoff date is desired, this data can be requested on a host computer attached operator terminal and the application will selectively restore the file, or files, for the requested commercial customer and cutoff date from tape to DASD. The restored files can then be used by the Data/Ware Development, Inc. EAS Control Program 515 to create a CD-ROM via the normal media creation process that occurs after the Image File 511 is created.

The process for creating backup of microfiche and other media is very similar to the above CD-ROM backup process except that the MFO file 329 or future MFO file formats for media added in the future, are copied to tape 412. The restore of this tape to DASD for a specific commercial customer would then be sent to the third party microfiche processor 530 for the actual microfiche re-creation 530, 531. MFOs for delivery directly to commercial customers can also be re-created on DASD and copied directly to the specified magnetic media or file transmission device for delivery to a commercial customer.

MEDIA CREATION (500)/MEDIA DISTRIBUTION (600)

The system tape output which would have the item record data and images arranged in a specified order could be generated on a variety of writers to match the specific tape device required by a customer (i.e. IBM 3480, 3490 or 3490E). The customer can write their own extract application that would store the images from the tape in specific files on their host system. An alternate method could be for the bank to transfer only the item record data with no image files. This would allow the customer to extract specific capture data such as posting date, item sequence number, additional data fields, or the actual Image Identification key used by the bank to store the image. The commercial customer could then use this information to request the image directly from the Bank system. The transfer of the electronic data could be on system tapes or electronic host-to-host file transfers.

Figure 12:
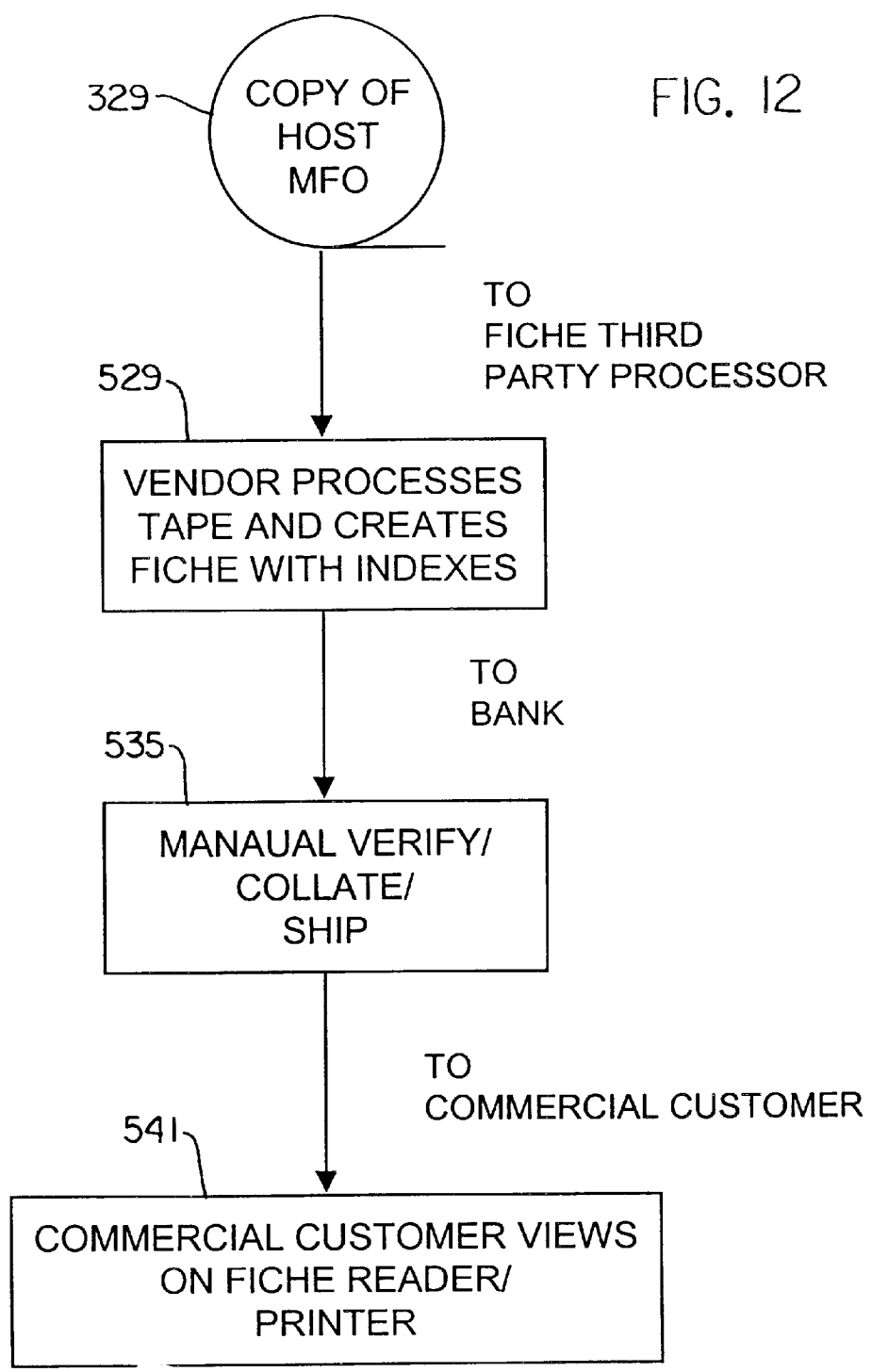
FIG. 12 is an illustration of the Microfiche Creation/Distribution/Customer Interface.

The tape output could also contain a number of commercial customers with multiple accounts each. This data could be used to create a special media such as microfiche by an outside third party processor. The functional flow of the microfiche creation and distribution process is shown in FIG. 12 at 329, 529, 535, 541. The microfiche processing vendor would write specific extract programs to pull each record for an account and build an index containing the specific posted MICR data and/or commercial customer issue data and ARP System data for each item record for an account. The specific record data can be extracted from the provided system tape along with each front and back image of the checks which can also be processed by the microfiche production software to place the digital images and associated data on microfiche. The microfiche production software can update the account item record database as to the microfiche page and grid location assigned to each item during the microfiche page layout processing. This would enable an index to be printed and placed on an index fiche. The index could be produced in serial number sequence and an additional index could be done in amount sequence. The image would be placed on Image microfiche pages. The transaction item index and image microfiche would be produced for each customer account using this form of media.

Figure 9:
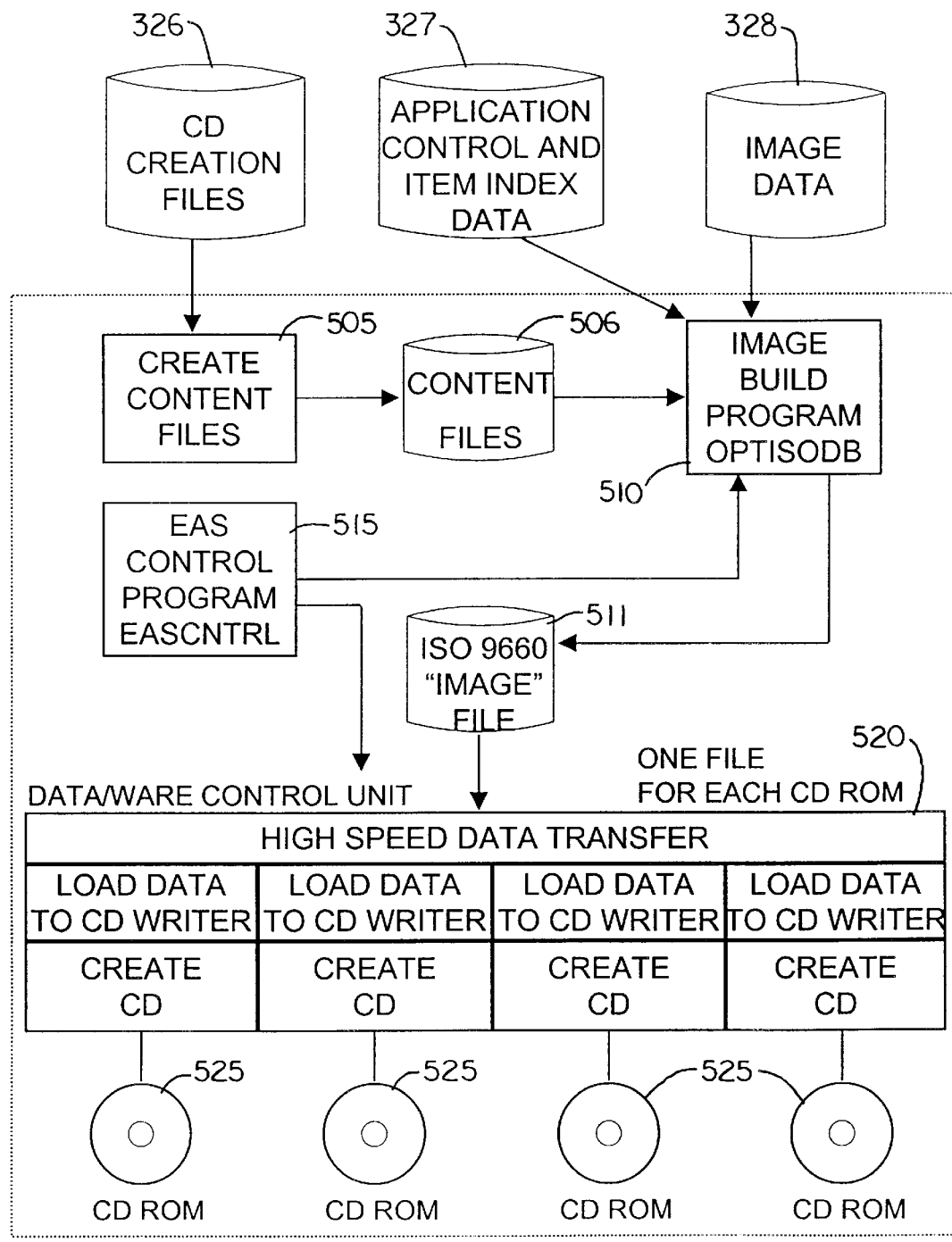
FIG. 9 is a data flow diagram showing the CD-ROM Media Creation process.
Figure 10:
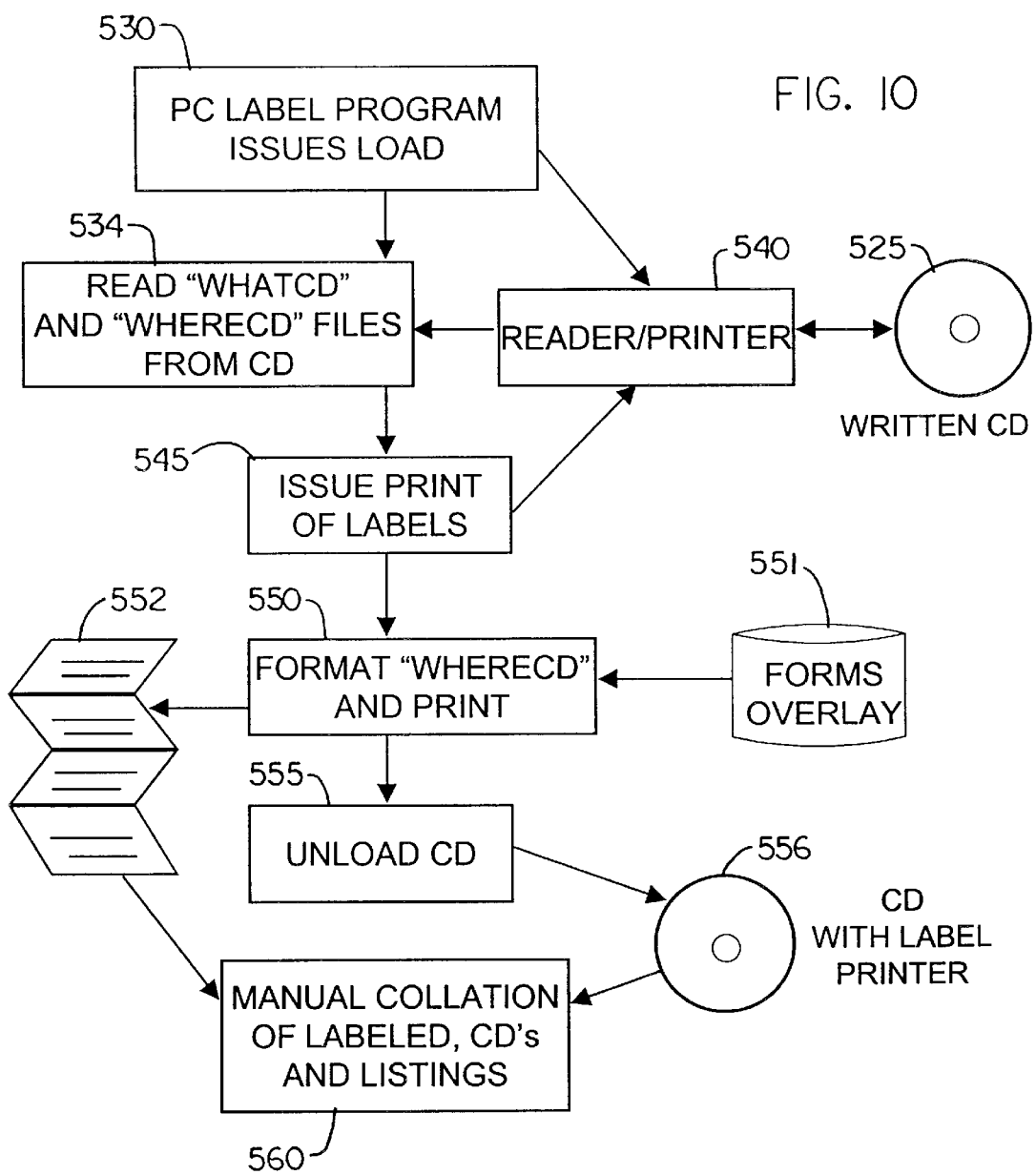
FIG. 10 is a data flow diagram depicting the CD-ROM Labeling and Report Process.

Another form of media is writable CD ROM, such as Kodak's Writable CD with Infoguard™. The functional flow of the CD-ROM creation process is shown in FIG. 9 at 505, 506, 510, 511, 515, 520. CD Authoring Software, such as Data/Ware Development Inc.'s Image Build host software 510, can be used to create the actual files in the ISO 9660 format required by any PC running MSCDEX drives and a CD ROM reader. The ISO 9660 CD format is universally recognized and used. This is an ideal media because CD ROM conforming to the ISO 9660 format can be played in a CD ROM drive in virtually any PC. The Writable CD technology also provides a cost effective way to provide individual "one offs" of a CD-ROM to large numbers of users without incurring high set-up and production cost associated with typical CD ROM technology previously used. In the industry, it is typical for one master CD to created, then numerous copies of that master made from it, such as to distribute technical manuals to a plurality of locations. In this innovation, it is typical for a unique original CD to be created for each individual commercial customer since each one's check images are always different, one from the other. A CD-W can hold 550 to 600 megabytes of data. Commercial Checks (front and back) average approximately 25,000 bytes of data for the IBM ABIC compressed black and white images. The transaction item index record contains approximately 250 bytes of data for each item record. This yields a capacity of approximately 22,000 to 24,000 checks per CD ROM.

The Data/Ware Development Inc. authoring software is a collection of IBM MVS software applications which prepares all the data files created by the HDCI application 300 for transfer to the CD writing equipment. The EAS Image Build software 510 is a mastering application which builds an ISO 9660 CD-ROM "image" by arranging the files in the required standard formats. This "image" is the digital data in the final form as it will be transferred to the CD-ROM. This "image" includes all standard files required by ISO 9660 along with the commercial customer specific data (index records and check images). Once the prepared CD "image" is created, it is copied to the EAS Creation Hardware 10 by means of standard IBM utilities such as the IEBGENER program. The EAS creation hardware 10 is a hardware subsystem which attaches by means of a channel interface to a host mainframe. The creation hardware emulates a standard IBM 3480 cartridge tape subsystem. Data created by the Image Build software 510 is output to the creation hardware as if it were a write to tape. The data is transferred to the Data/Ware Development, Inc. Control Unit 10 which captures the data initially onto a Winchester disk drive which is attached. Once the entire CD "image" is written to the disk drive, then the actual writing of data to the CD can be initiated.

The EAS Control Unit 10 contains one to four CD writer modules 10b. These modules allow expansion for capacity growth. Also, additional Control Units can be Bus and Tag connected to IBM channels from the mainframe. This control unit employs multiple processors to achieve high data transfers at the channel transfer rate of 4.5 megabytes/second. Each CD writer module 10b is connected through a dedicated SCSI interface capable of sustaining a 1 megabyte/second data transfer rate per CD writer module 10b. Internal cache memory allows buffering between the channel and each SCSI interface. The Control Unit 10a also contains a CRT monitor and keyboard to allow operator control of the unit as if it were an IBM 3480 tape writer.

Figure 11:
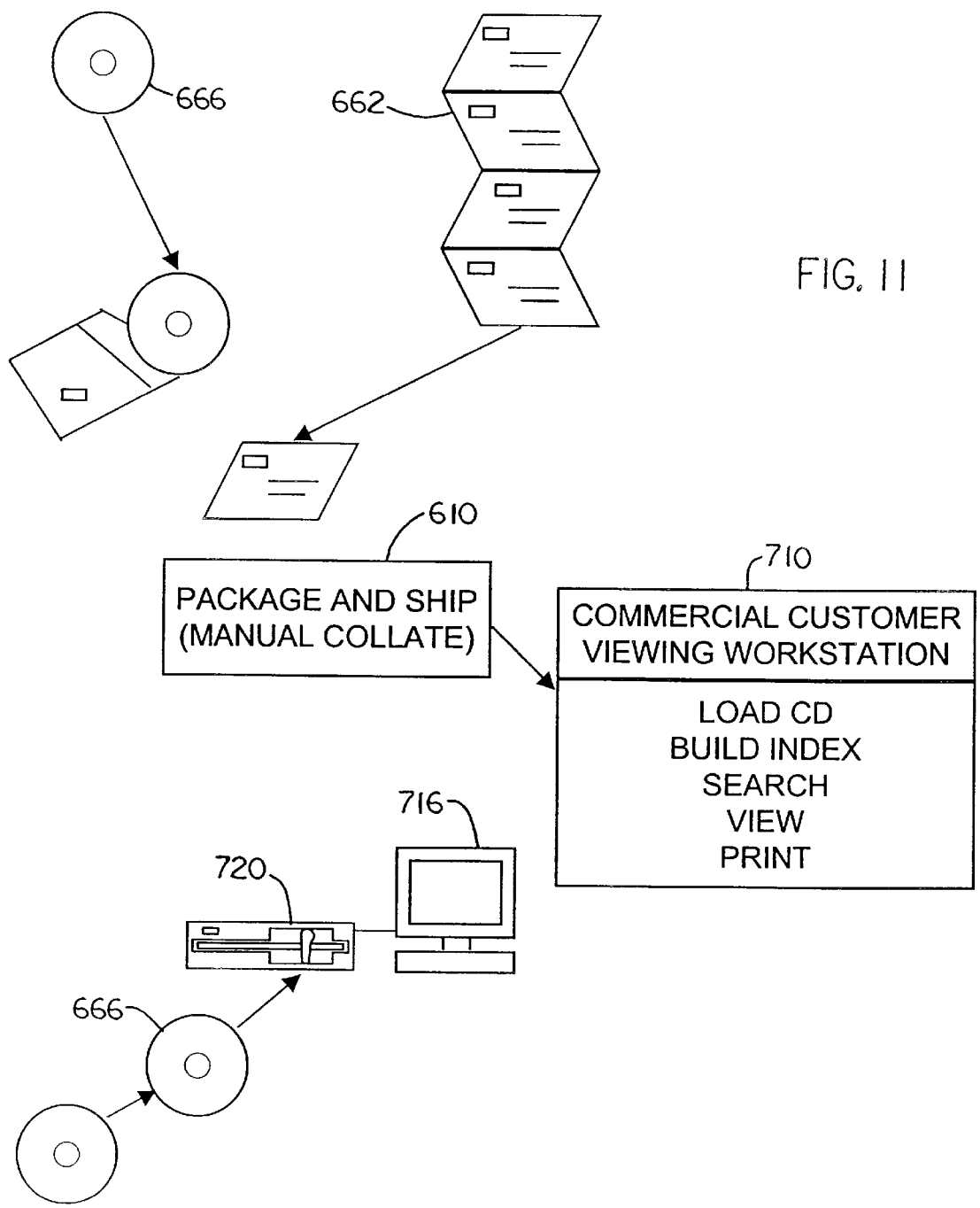
FIG. 11 is an illustration of the CD-ROM Distribution and Customer Interface process.

The CD writer module 10b is a self-contained unit which includes a CD writer such as Kodak's PCD Writer 200 and a Winchester disk drive connected on the SCSI bus. After the CD's are written, they are taken to a labeling system. The functional flow of the CD-ROM labeling and report process is shown in FIGS. 2A–2C and 10 at 525, 530, 534, 540, 545, 550, 551, 552, 555, 556, 560. This labeling system uses a MS DOS/Windows based PC 12 with a CD reader running a labeling application that reads the unique label file from the CD and stores the files data into memory. The CD is then placed in a printer 11 specially designed to print labels on CD's such as the DW39602 CD Labeling System available from Data/Ware Development Inc. The contents of this file are then printed on a self-adhesive label placed on the CD or directly on the CD surface such as Kodak's printable coating. The label printing can be automated using an auto loading label printer such as the Automated Direct Color Printer which is available from Data/Ware Development, Inc. This unit uses the same 100 CD spindles as the auto loader CD writer modules. The spindle is transferred to the label system which uses an auto loaded writer module to read the label 1 print file and store all label files in the stack order on the spindle. This same spindle is then used in the auto loader for the label printer. At the same time, the label file is read. The shipping label file can also be read. Another MS DOS/Windows application can take the shipping file and print self-adhesive labels on a laser or dot matrix printer 13 attached to the labeling system. The functional flow of the CD-ROM distribution and customer interface is shown in FIG. 11 at 610, 662, 666, 710, 716, 720. These labels can be placed on the mailers containing the CD 666 going to each commercial customer. A multipurpose print form could be designed to print packing list information on a continuous form 662 associated with each commercial customer. Associated with the pack list could be a peel-off label for the mailer. Also, data from that label file could be used to print a self-adhesive end label for the plastic jewel case that protects the CD. This end label could be included with the CD and the jewel case when they are placed in the mailer. As all labels are verified and the items are placed in or on the mailer, they can be checked off on the packing list. If desired, an additional quality step can be used to actually scan index data and display randomly selected images using the Wachovia Connection Image Workstation application which could be running on the label printing PC or a separate MS DOS/Windows based PC 19 used specifically for quality control prior to placement of the CD in the mailer.

CD writers have a characteristic that once the writing process is started, it cannot be interrupted. If the write is interrupted due to a data transfer delay from the mainframe computer, the CD will be unusable. For this reason, the data for a full CD is first staged on the Winchester disk. This assures the write can take place under control of the local control unit without typical system interruptions. This also allows multiple copies to be made without tying up the Bus and Tag channel from the host mainframe to the control unit.

The CD writer can be either a 2× or 6× speed unit with current technology. At normal CD reader speeds (1×), it can take approximately 60 minutes to write or read a full CD. A 2× writer can do this in half the time or 30 minutes and a 6× writer can write a full CD in 10 minutes. Auto loaders can be attached to each CD module which allows a writer to produce 100 CD's unattended.

The channel attached control units 10, as shown in FIGS. 2A–2C, with 2× or 6× writers make it feasible to produce larger quantities of customer unique data on a CD in high volumes. Each IBM 3890 XP with image scanner 6 can realistically capture and digitize the front and back of 80,000 to 90,000 documents per hour. In a typical two shift operation, this would yield 1.2 to 1.4 million checks. If the total two shift output of checks were placed on CD's, the CD authoring system 10 would have to approximately 50 to 64 full CD's. A Control Unit 10 with two 2× CD writers and an autoloader can produce 64 CD's in the same two shifts. The combination of this mainframe attached CD authoring system with the high speed document image capture processors provides an efficient high volume process for delivering large volumes of digital check images and other associated electronic data to customers on a media that is easily transported and can also serve as a long term archive of the data. Previous methods of storage and delivery have prevented the transfer of large volumes of digital check images to large numbers of customers in a timely fashion.

The combination of CD media, a CD authoring system and the image workstation also provide a higher level of security and quality. The Data/Ware Development, Inc. EAS system places a control file on each CD that contains a unique customer number. The same customer number has to be assigned in the image workstation in order for the application to authorize a search of the index or transfer of the index records from the CD. This prevents one customer from using another customer's CD should they be distributed in error. The Data/Ware Development Inc. system also places a serialized number contained on each Kodak CD into a unique data file on the CD. The CD Module 10 reads the bar-coded number from the CD and places it in a reserved file on the Winchester disk. Once the CD is created, a quality control workstation running the image workstation application can read the data file and display the serial number. This serial number is also placed in the data file on the CD. This file is read from the CD and is used to print the identification label placed on the CD. By comparing the serial number on the label, the displayed serial number and the serial number manufactured and placed on the CD itself, one can be assured that the correct label was placed on the correct CD and that a workstation with the correct commercial customer number can only read the CD containing that commercial customer's number.

WACHOVIA CONNECTION IMAGE WORKSTATION (700)

The customer interface to the electronic digital data created by the high volume financial check image media creation system is a personal computer running an image display application. An implementation of the image display application could be the Wachovia Connection Image Workstation.

The following descriptions refer to drawings shown as FIGS. 2A–2C, 3A–3B, 4 and actual screen prints shown as FIGS. 14–31.

Figure 14:
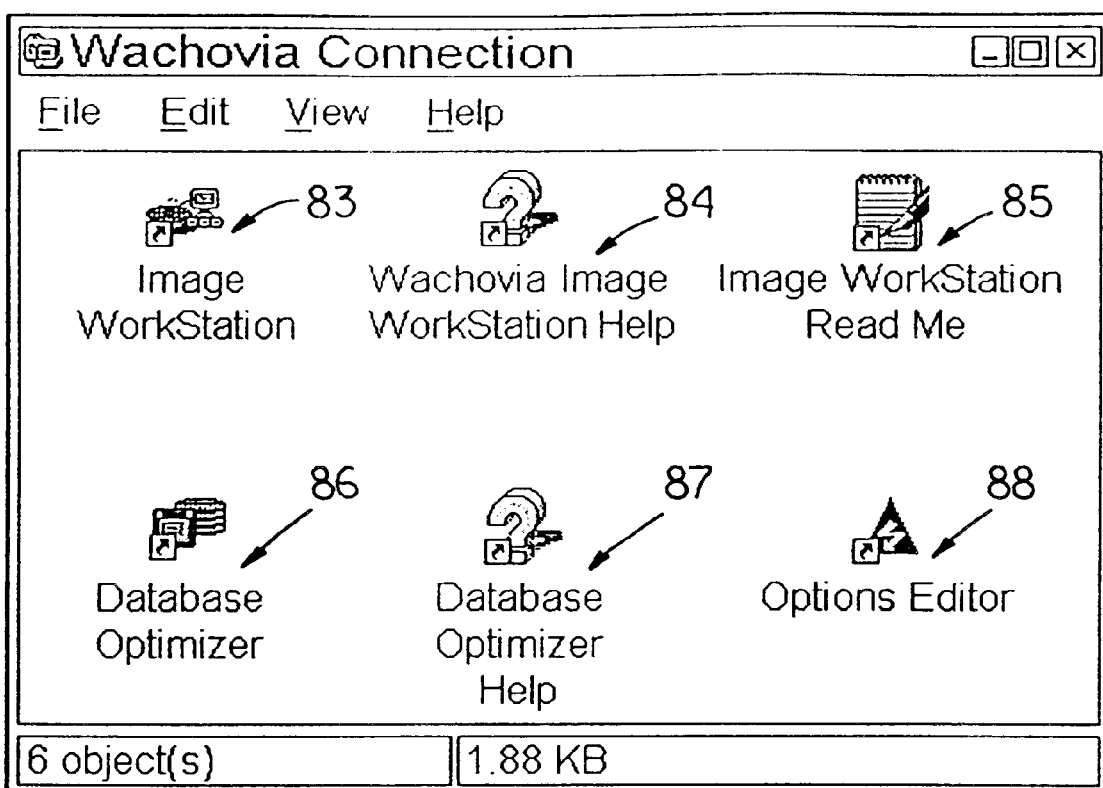
FIG. 14 shows the group window and icons created as part of the installation process.

Installation of Image Workstation creates a group window FIG. 14 containing a plurality of icons. The three main components of the Wachovia Connection Image Workstation product are listed below:

(1) Image Workstation 83
(2) Database Optimizer 86
(3) Options Editor 88

In addition to the three components above, the Wachovia Connection Image Workstation package includes a Read Me icon 85 and application-independent Help for both the Image Workstation 84 and the Database Optimizer 87.

These components (which will be described later in the order shown above) are installed to a fixed drive attached to a stand-alone microcomputer to provide search and retrieval functionality for transaction item indexed account reconciliation data and related images that have been archived to CD-ROM by a high volume financial check image media creation and display system shown in FIGS. 2A–2C, 3A–3B, and 4.

As those experienced in the practice of payment research are aware, the process of locating an item for confirmation purposes can be a time-consuming procedure that involves telephone calls and a physical search through microfilm or microfiche records. By providing an index that includes extensive search parameters, the Wachovia Connection Image Workstation facilitates the process of locating and verifying paid checks, electronic payments, and other transactions. The capabilities this invention offers to commercial customers creates efficiencies for their daily activities.

In an embodiment of the invention, the stand-alone microcomputer mentioned above comprises an IBM-compatible 486 CPU rated at a minimum of 25 MHz with 8 MB RAM, 120 MB fixed drive, internal CD-ROM drive rated at MPC-1 or MPC-2 (ISO 9660) or similar external CD-ROM drive attached to a SCSI or Parallel Port, VGA or SVGA Color Display Monitor, facsimile modem rated at 14.4 kilobytes per second, and compatible serial mouse. As those skilled in configuring environments are aware, this standard configuration may be modified or expanded for enhanced performance of the invention without departing from its spirit or scope.

The software interface for the workstation portion of the invention is accomplished using the Microsoft Windows version 3.1 operating system manufactured by the Microsoft Corporation. The system should also be running MS DOS 6.0 or 6.1 manufactured by the Microsoft Corporation as well as facsimile software (to run the facsimile modem) available from a variety of manufacturers.

Benefiting from the MS Windows 3.1 interface, the applications offer graphical and textual task facilitators. Among these facilitators are pull-down menus, graphical icons and buttons, hot keys and accelerator keys—all of which allow users to choose the method of file access, program initiation, and option selection that is most comfortable and useful to them. Auto-fill selection boxes and non-modal navigation make the invention easy to use. In addition, customizable Help Statements 48 at the bottom of Wachovia Connection Image Workstation windows offer hints and confirmations.

Figure 16A:
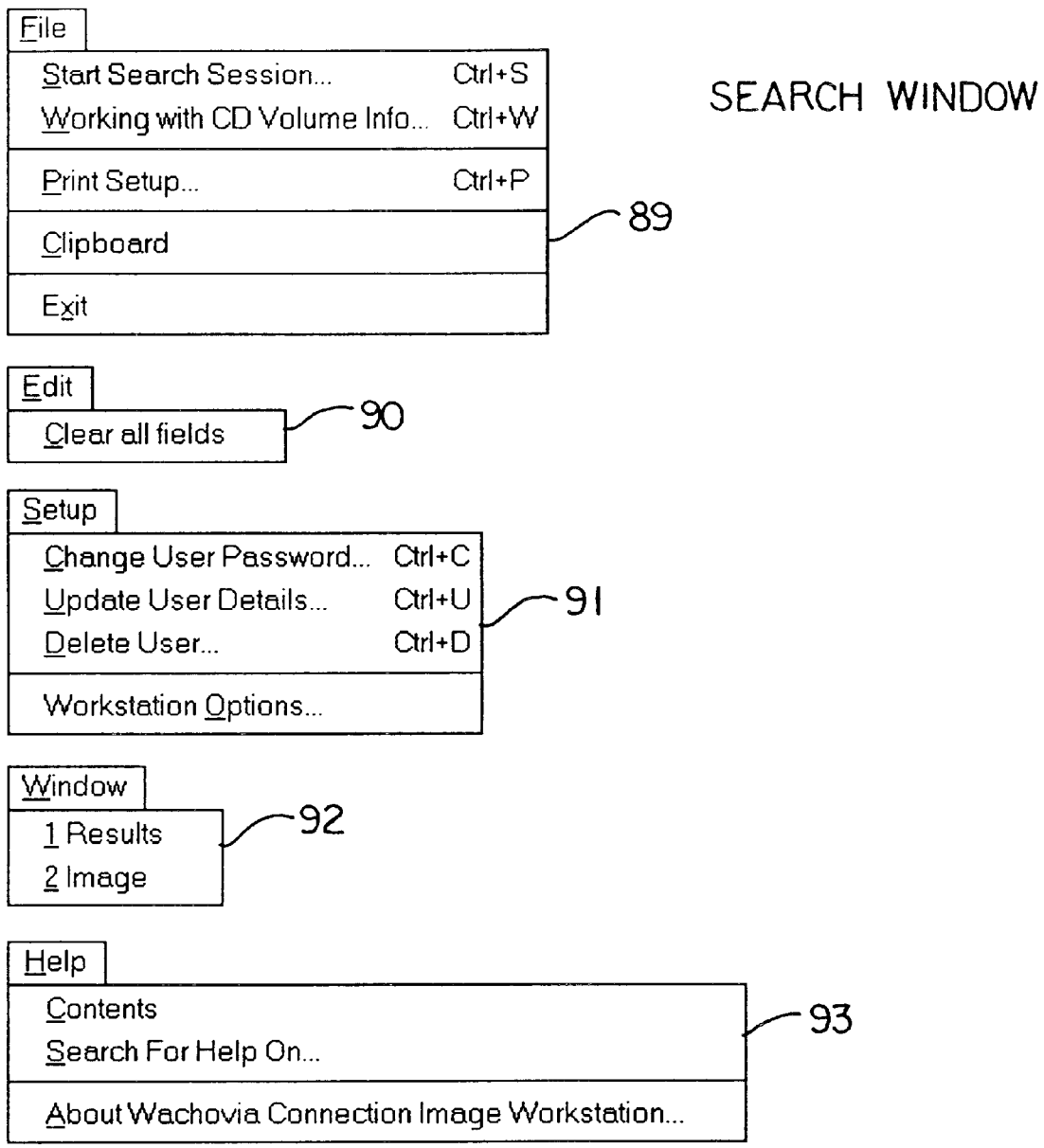

The Wachovia Connection Image Workstation applications also use the standard MS Windows Exit, Printer Setup and Clipboard accessories (89, 94, 97 as shown in FIGS. 16A–16C) to make this functionality more universally compatible with users' system configurations. Each of these aspects are handled in the conventional manner, well known to those skilled in the art. The activities of search and retrieval as well as system and database maintenance, are described in detail below.

Wachovia Connection Image Workstation Initialization

Figure 15:
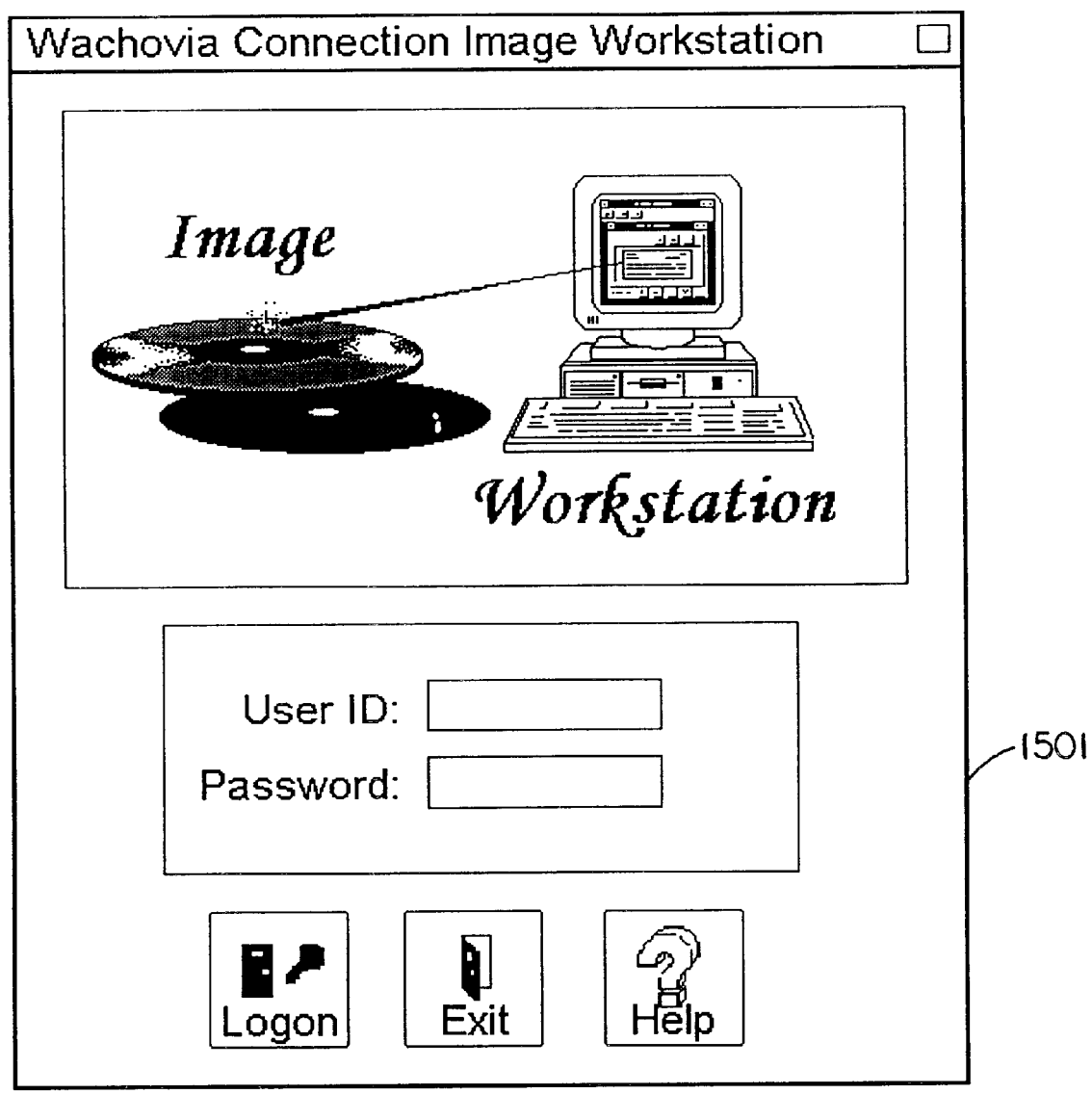
FIG. 15 shows the log on window where users enter their unique User ID and Password combination to access the Image Workstation.

Using a standard personal computer mouse, double-clicking the Image Workstation icon brings up a log on window 1501, FIG. 15, that requires the user to enter a valid User ID and associated Password before being allowed to access the system.

For security and flexibility, only one User ID and Password typically is preset at installation—the commercial customer assigned System Administrator will use this User ID and Password to log on to any of the applications (and will be prompted to change the password at first log on to Wachovia Connection Image Workstation). This User ID allows an Administrator the capability to set up all users and system defaults through the Setup menu selections 91 (See FIGS. 16A–16C) at the top of the Search window.

Figure 19:
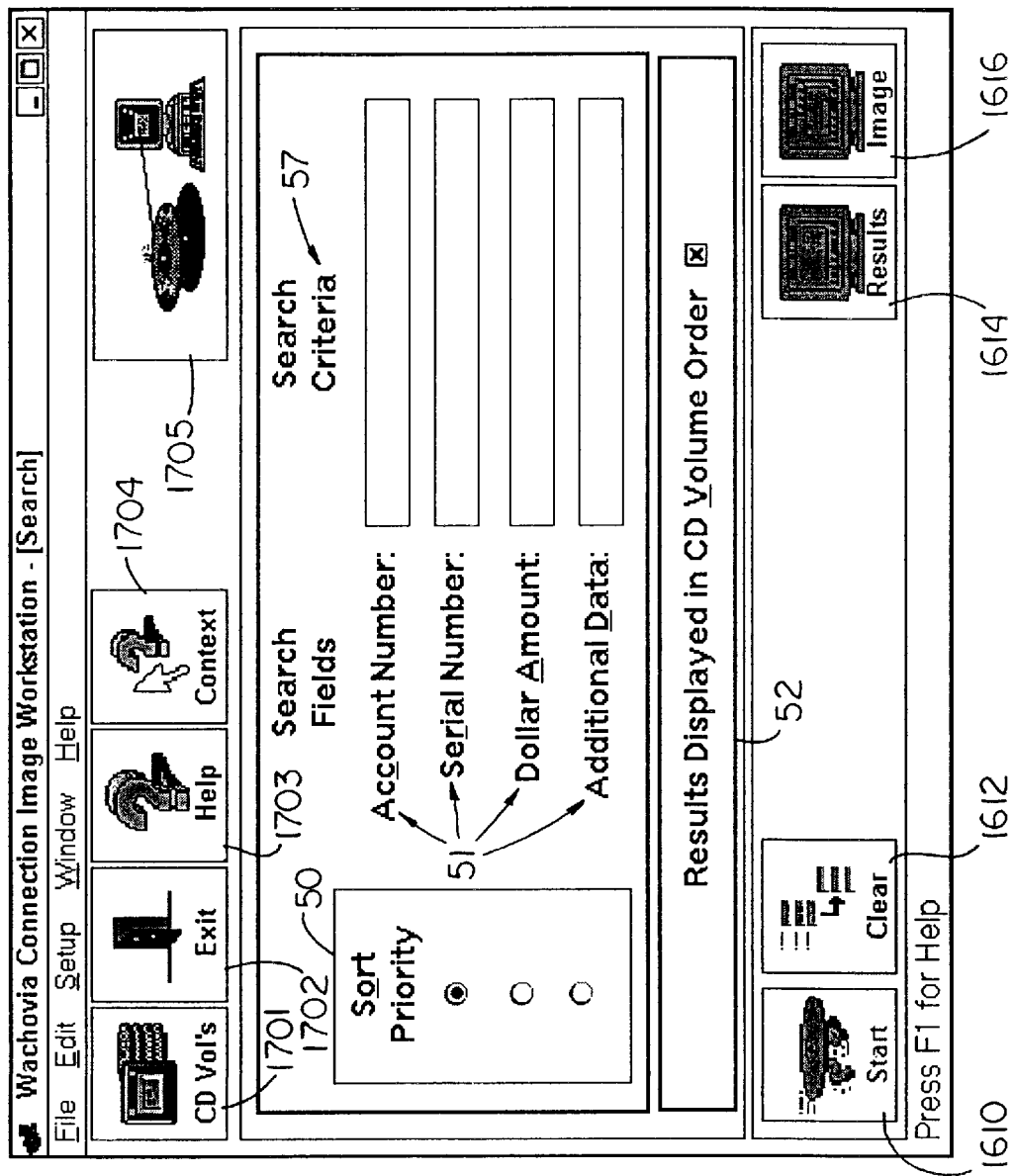
FIG. 19, the first trilogy screen, is the Search window, which allows users to enter parameters to limit the Search Results list to item records that meet these criteria.

When a commercial customer enters his unique User ID and Password combination, the system will flash registration and copyright information on the screen and then display the Search window FIG. 19 of the Wachovia Connection Image Workstation.

Figure 24:
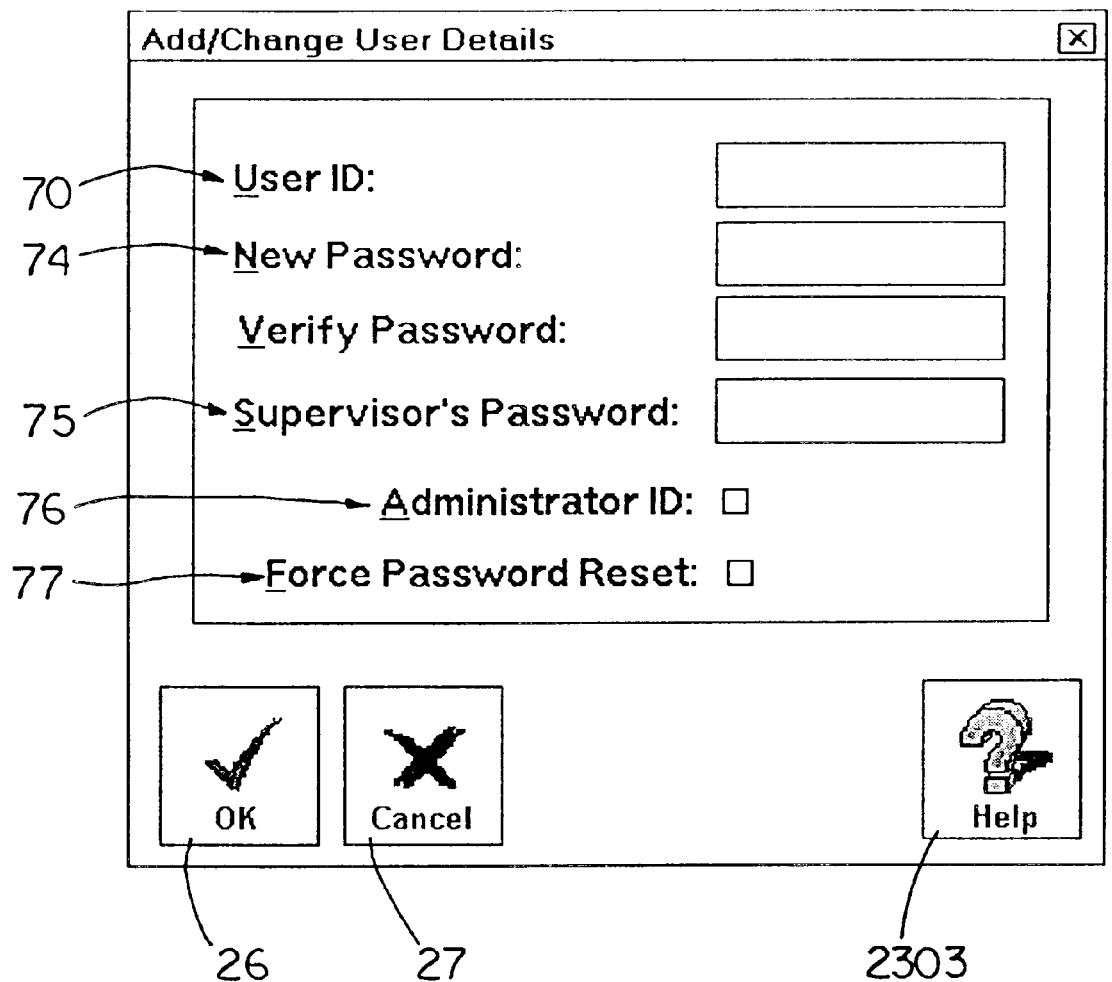
FIG. 24 shows the Update User Details window, which allows System Administrators to add and modify user profiles for access to the system.

When the System Administrator sets up additional users, he or she may elect to re-establish the force reset feature 77 of password for each additional user of the workstation FIG. 24. Because some of the data made available to the workstation may be sensitive in nature, it is important to be able to restrict access to some of the data by individual clerk. While this reset is in effect, the user will be prompted to select a new password at first entry to protect the integrity of his access. The user can elect to change his password at any point deemed necessary by the commercial customer—either at his discretion or at regular intervals set by company policy. This change is effected through the Change User Password option FIG. 23, which can be accessed through the Change User Password selection 91 on the Setup pull-down menu on the Search window.

Figure 17:
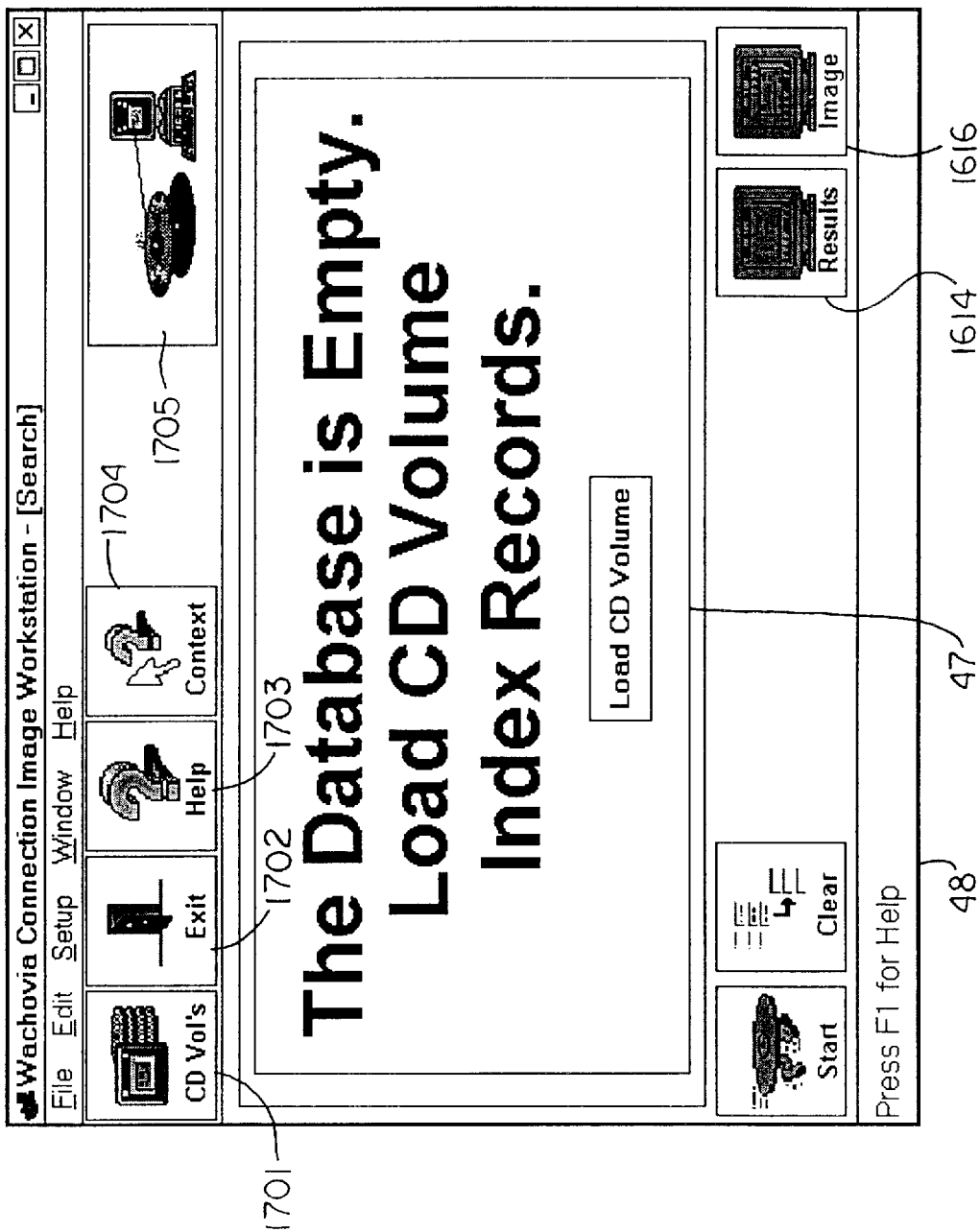
FIG. 17 is the initial window which appears on the desktop after the first user logs on to the software.
Figure 18:
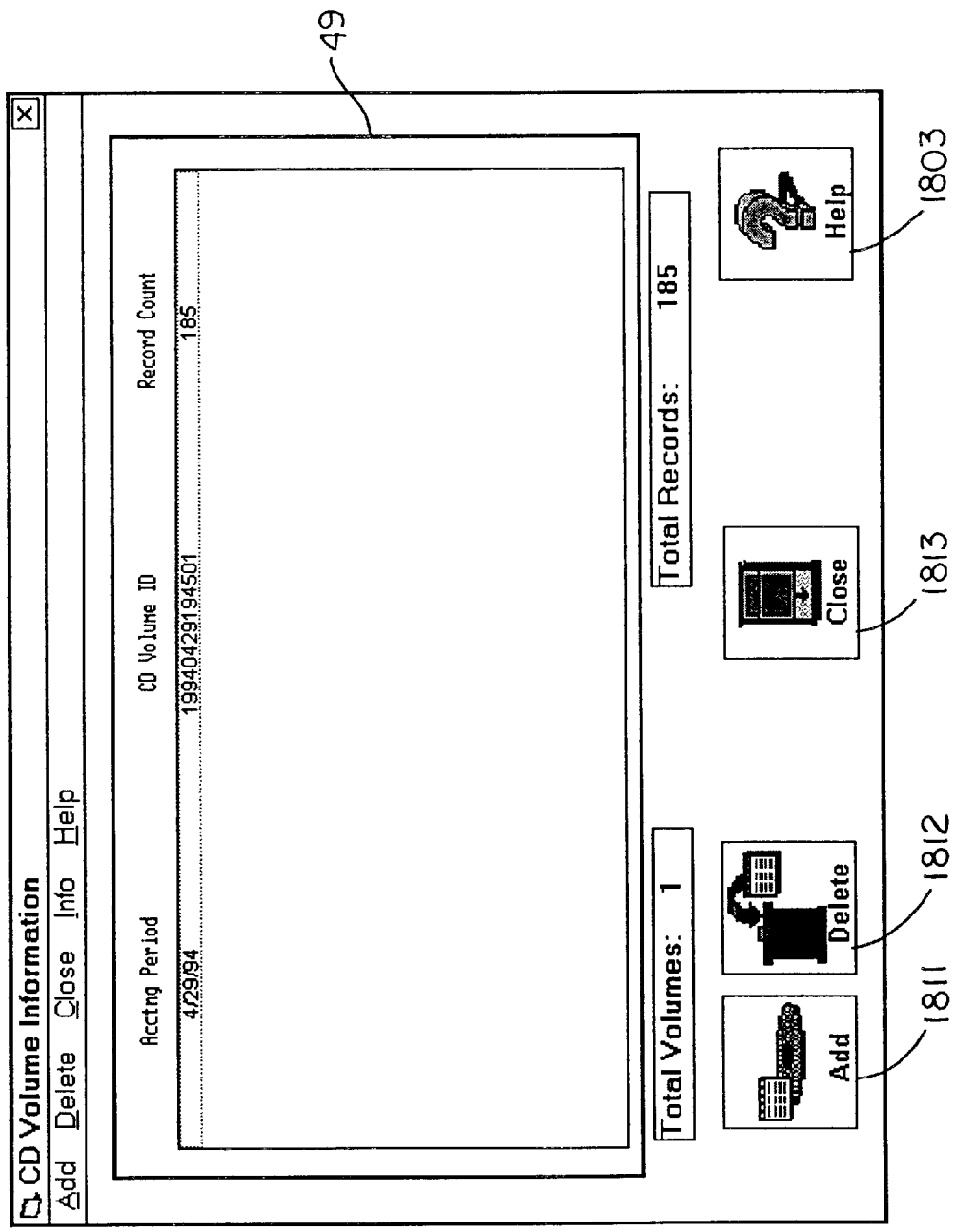
FIG. 18 shows the CD Volume Information window, which appears when the user elects to view, add, or delete CD Volumes from the item record database.

FIG. 17 shows the initial window which appears on the Wachovia Connection Image Workstation after the first user logs on to the software. Its purpose is to prompt the user to begin adding item transaction records to the item record archive database, which is empty at this point. If a user has already added items to the item record database, this prompt will not appear. This prompt will continue to appear until records have been added to the database.

If a user has already added items to the image database, this prompt will not appear unless all records are purposely deleted from the database at a later point.

To begin creating the database, the user clicks Load CD Volume 47 on this window. The CD Volume Information window FIG. 18 will appear. This window can also be accessed at any point by clicking the CD Vol.'s button 1701 at the top of the Search, Search Results, and Image Display windows (FIGS. 19, 20A–20B, 21) or by choosing the Working with CD Volume Info menu selection (89, 94, 97) from the File pull-down menu on each of these windows.

Figure 26:
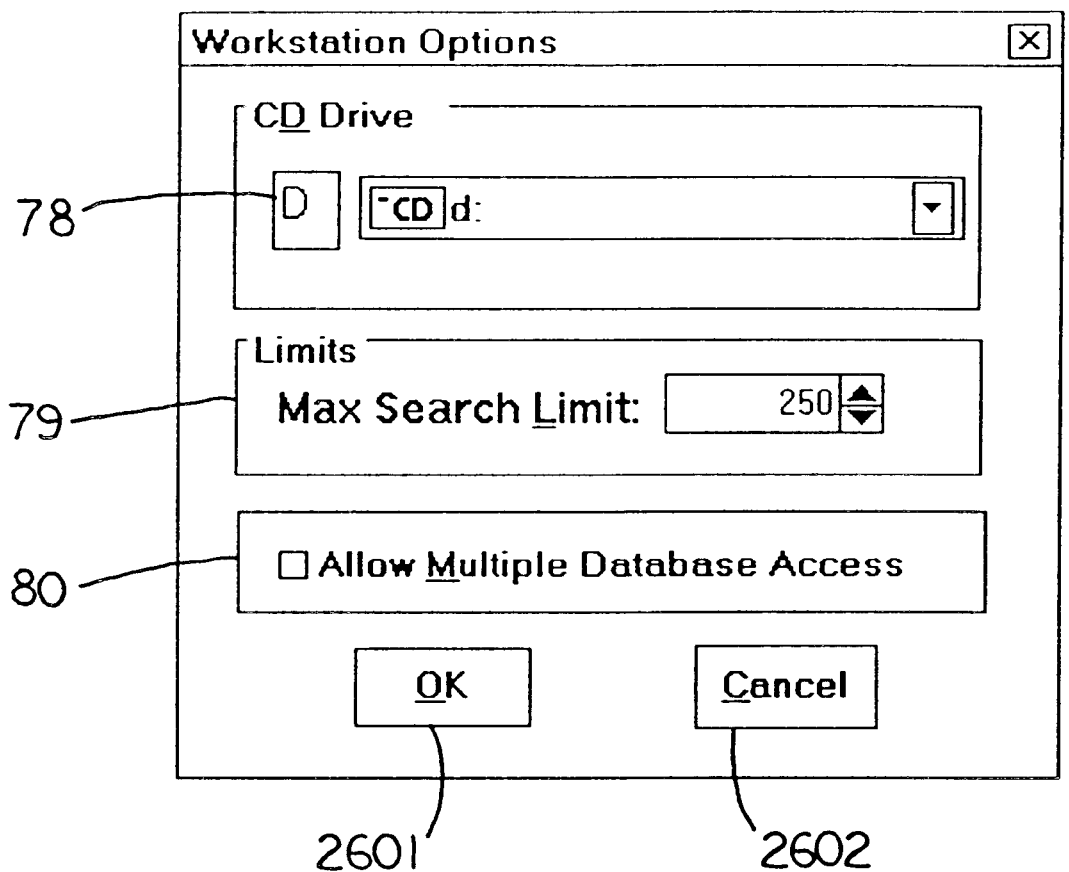
FIG. 26 shows the Workstation Options window, which allows users to change default information for the system: CD Drive, Limits for the maximum number of items that can be reported in the Search Results list, and Allow Multiple Database Access.

The user will place a CD-ROM that has been received from the bank with images and item index information into the drive designated during installation or maintenance FIG. 26 for CD Drive and then click Add 1811.

Figure 30:
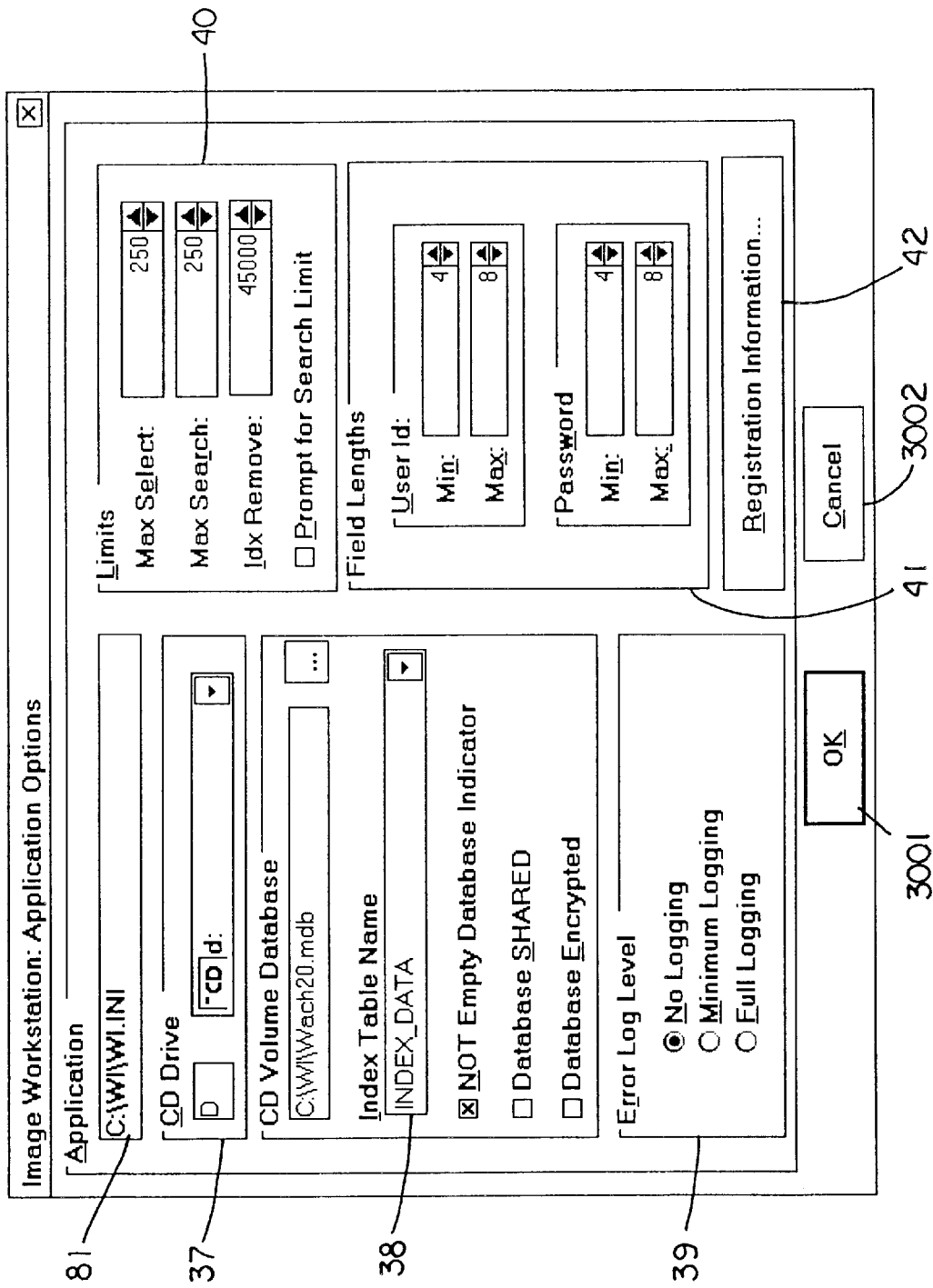
FIG. 30 shows the Application Options window associated with the Options Editor, which allows the user to make changes to device and database locations as well as to set limits for list items and field lengths.

The program will retrieve the transaction item index information from the CD-ROM and add it to a database maintained in the directory designated for the transaction item index FIG. 30. Identifying information for the archive CD-ROM transaction item index that has been loaded will appear on this window 49: Accounting Period, CD Volume ID, and Record Count. Fields at the bottom of the window will reflect a running tally of the number of volumes that have been loaded and the total number of records contained on those volumes.

The CD Volume ID is a unique code that is constituted by the accounting cutoff date, the time of day the CD-ROM was produced, and a volume number (used when multiple CD-ROMs are created in the same accounting period). Commercial customers can read item index information and images only from CD-ROMs that bear the Company ID for which the software has been registered FIG. 31.

At the end of each reconcilement period, typically month-end for most commercial customers, the bank will send the company one or more CD-ROMs containing the transaction item index data and images for that period. After adding transaction items from each CD Volumes to the item index database for several accounting periods, the company will have created a powerful, cumulative database resource indexed for quick information and image retrieval.

Once the item index information has been loaded, the CD load prompt will be cleared from the Search window FIG. 19.

Buttons at the bottom right of each window (1614, 1616, 1618) allow users to toggle back and forth among the trilogy screens, or Wachovia Connection Image Workstation's three main windows: Search, Search Results, and Image Display (FIGS. 19, 20A–20B, 21). The same toggling action can be effected by making the desired selections from the MS Windows pull-down menus on each of the trilogy screens (92, 96, 101).

Figure 27:
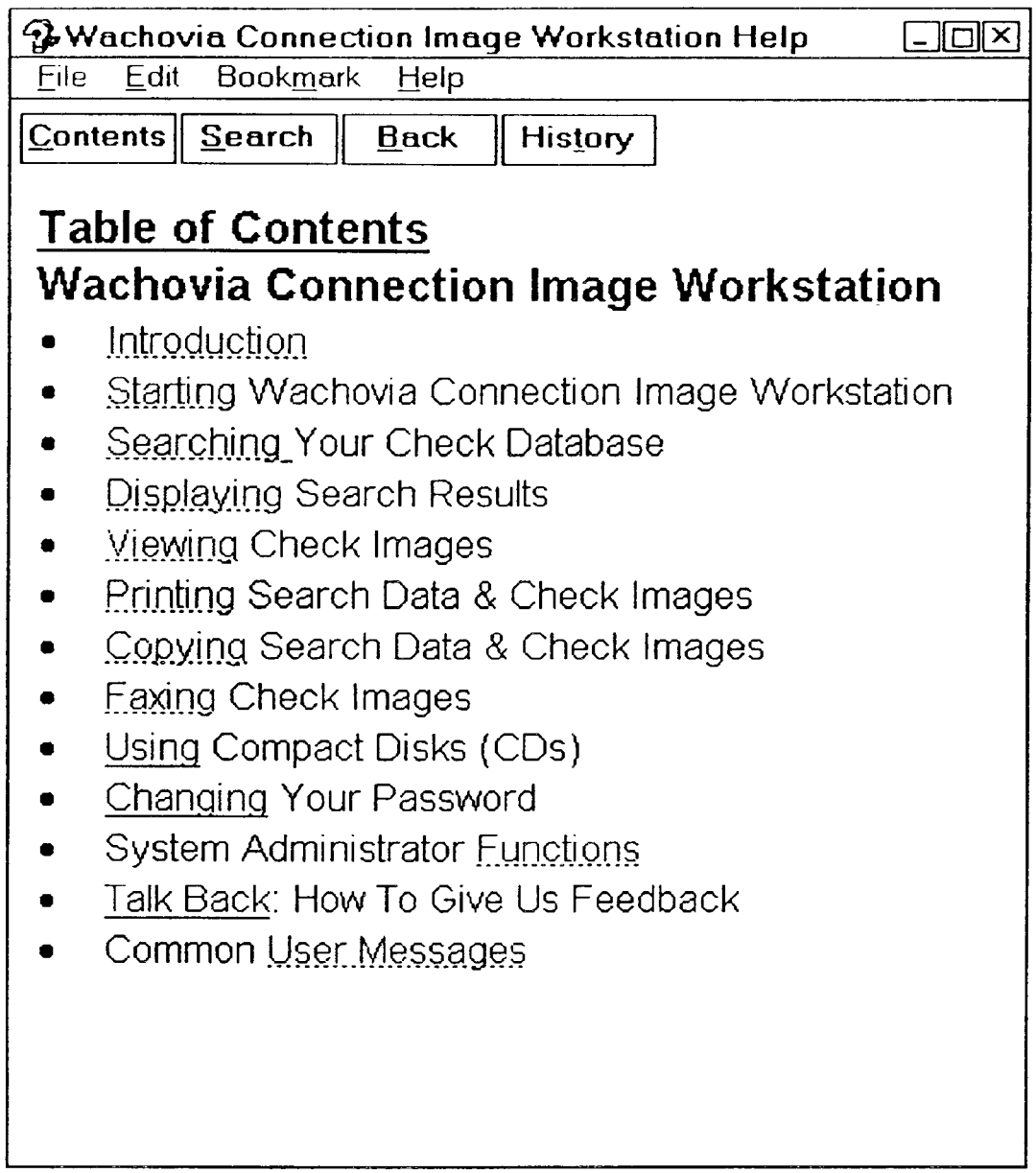
FIG. 27 is the Table of Contents for the Help system.
Figure 28:
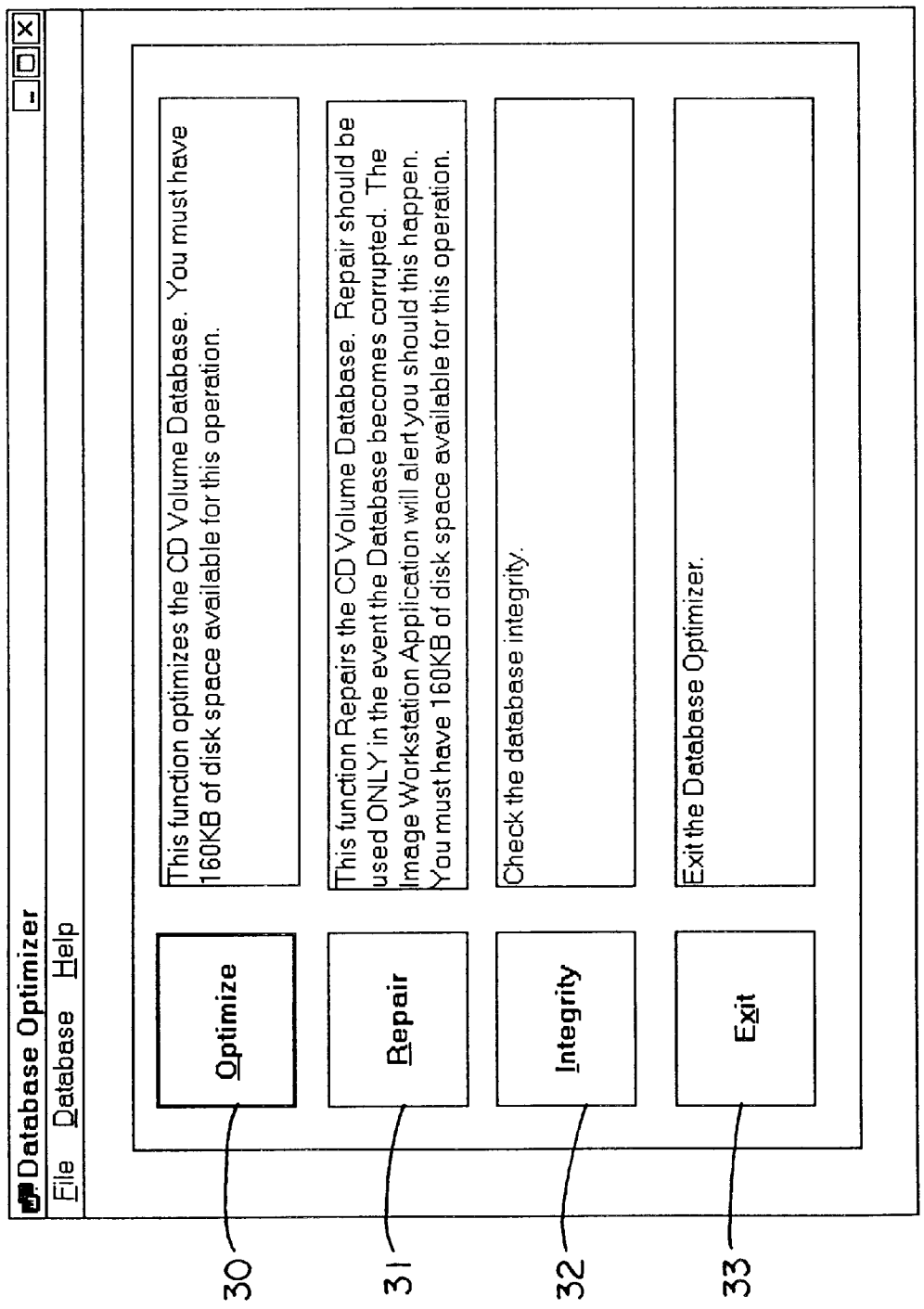
FIG. 28 is the main window for the Database Optimizer, a separate utility that allows users to optimize and repair the database as needed as well as to check the integrity of the connection to the database.
Figure 29:
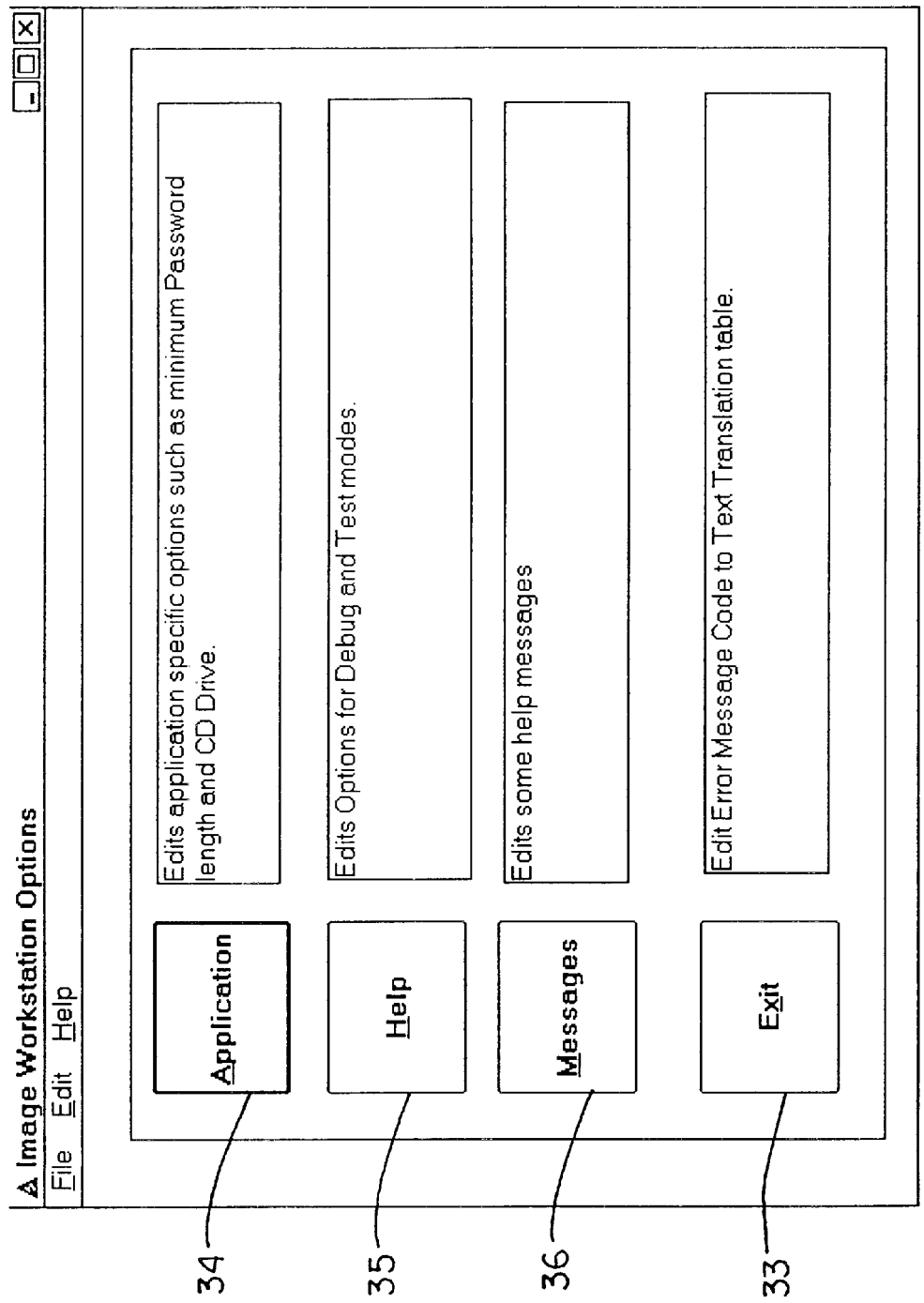
FIG. 29 is the main window for the Options Editor, which is a separate utility that allows users to edit application-specific options and to customize the help messages that appear in the system.

Among the buttons at the top of this window are Help 1703 and Context 1704, which offer context-sensitive help information for the windows and fields in Wachovia Connection Image Workstation, as shown in FIG. 27. Hypertext can also be accessed from any window by pressing F1 or by selecting any of the options from the Help pull-down menu 93 on each of the trilogy screens.

Wachovia Connection Image Workstation

In the Search window FIG. 19, which is the first of the trilogy screens, a plurality of Search Fields 57 allows the user to define selection criteria for listing the archived items from the transaction item index on the screen. The user can specify complete or partial matches using specific characters or database wildcards such as "*" in the Account Number, Serial Number, Dollar Amount, and Additional Data fields. The user can enter criteria in one or more fields as needed.

Entering Serial Number only is an efficient means of locating an item. If the Serial Number is unavailable, the Account Number and Amount fields can help to narrow the scope of the results list. The Additional Data field can help locate items using varied check issue data, such as Purchase Order Number, Invoice Number, Payee Name, or Payee Account Number (according to the information the company has chosen to record in this optional field). The use of wildcards and customer selection of special characters also allows this additional data field to contain multiple data elements such as Payee name using the special character # to begin this data and the special character $ to begin the invoice number. A wildcard search using # plus the specific name would only retrieve records with # and the specific name. The inclusion of the additional data, which can be in any order or form desired by the customer, provides the ability for a customer to tie together (or relate) key internal information known only in the customers data systems to the physical check that cleared through the bank. For example, this allows Payee names to be searched and all checks written to that Payee over a given period of time to be displayed quickly and easily. This previously would have required the customer to access their own separate computer database, such as an Accounts Payable database, to get a list of all serial numbers of all checks written to that Payee and then individually manually search rolls of microfilm to select and copy each check image. Also this additional data field provides advantages over other image retrieval systems in that each serial number would not have to be manually searched because they are returned by the automated search to the users workstation display.

This window also allows the user to select up to three levels 50 for sorting the results: (1) CD Volume order 52 (if selected, this will override the first level), (2) Account Number (this is a default for the second sort level—or for first level if CD Volume is not selected), and (3) Serial Number, Dollar Amount, or Additional Data 51.

Once the user has entered these criteria, he can click Start 1610, as shown in FIG. 19, or select Start Search Session 89 from the File pull-down menu on the Search window to create the Search Results list FIG. 19. Clicking Clear 1612 or selecting the Clear all fields option 90 from the Edit pull-down menu on the Search window will clear these fields for re-entry of searching criteria.

Figure 20A:
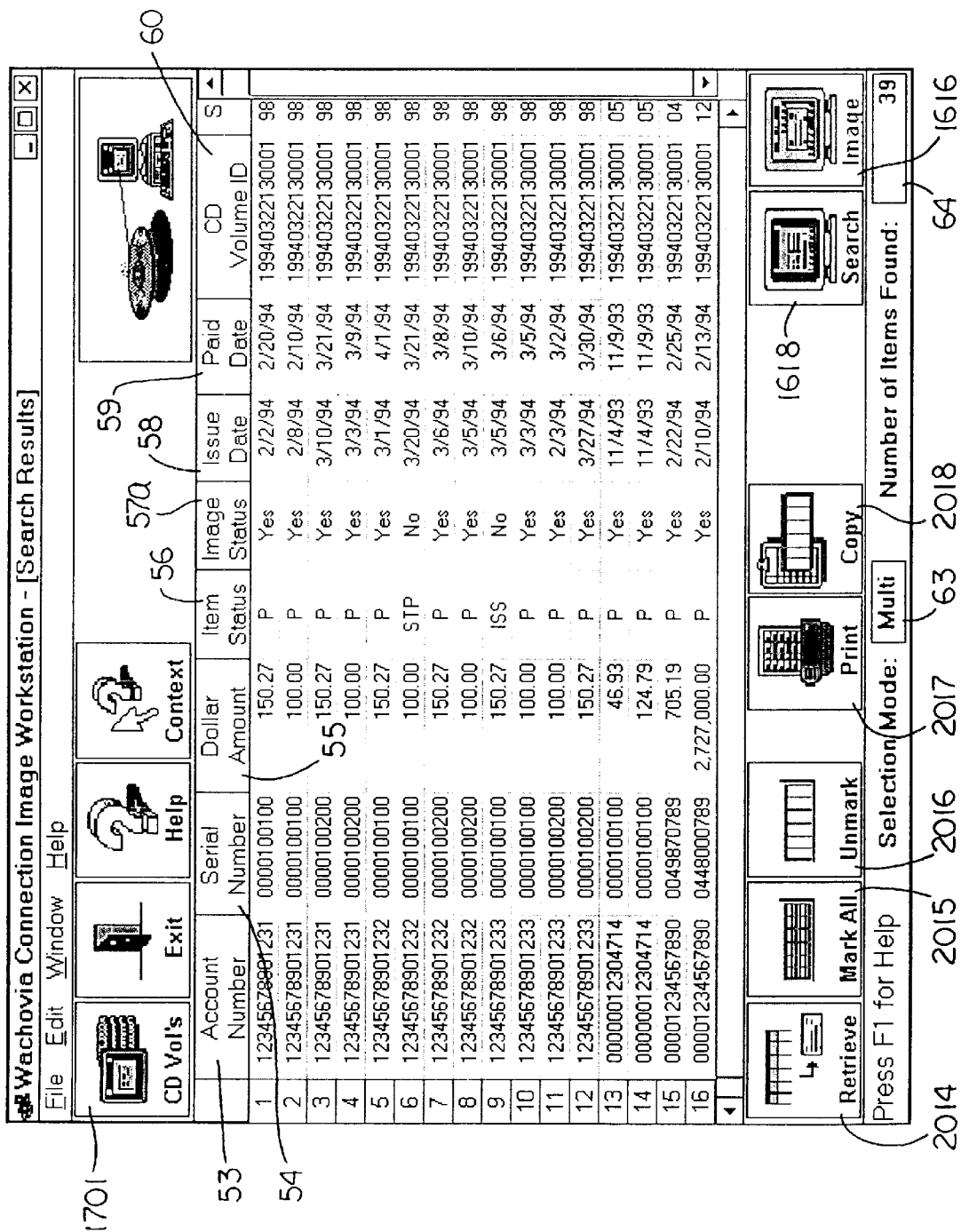
FIG. 20A, the second trilogy screen, is the left portion of the Search Results window.
Figure 20B:
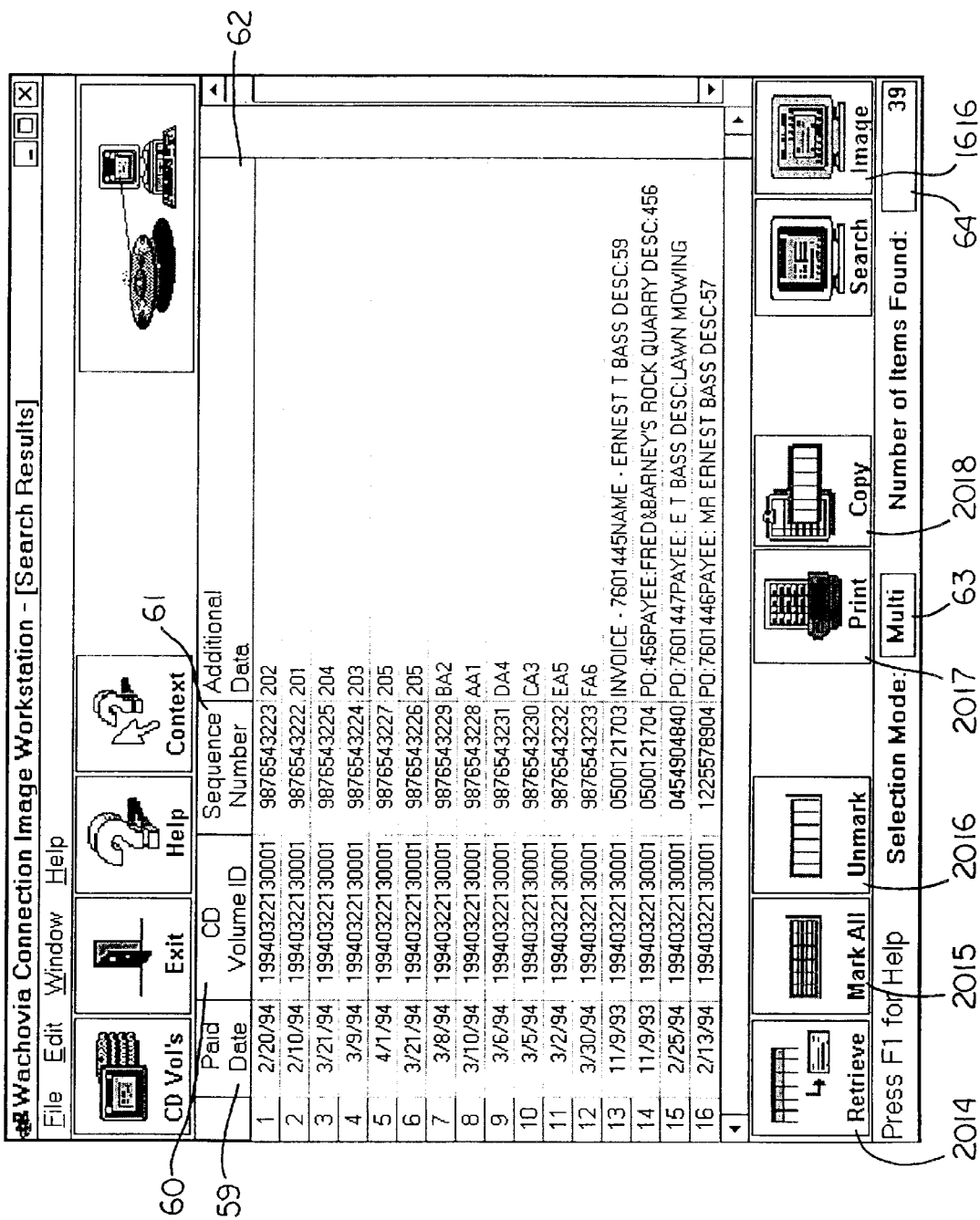
FIG. 20B is the right portion of the Search Results window.

Based on the criteria entered on the Search window FIG. 19, the Search Results window FIGS. 20A and 20B, which is the second of the trilogy screens, will list all indexed items that meet the selected criteria in an easy to understand spreadsheet format. In addition to the search parameters, this window shows the following information for the indexed items: Account Number 53, Serial Number 54, Dollar Amount 55, Item Status 56, Issue Date 58, Paid Date 59, CD Volume ID 60, and Sequence Number (assigned by the bank check processing system) 61. The Image Status field 57a shows whether an image for the item is available on the CD Volume. The number of transaction items that meet the criteria and are displayed in the list are shown at the bottom right of this window 64.

The user can select one or more items from this list using the method compatible with the Selection Mode 63 in effect: Extended Select allows selection of multiple adjacent items through "click and drag" functionality. Multi-Select allows selection of non-adjacent items by single clicks to each item. The user can toggle between these two selection modes by clicking on the selection mode indicator 63 at the bottom of the Search Results window or by choosing another of the Selection Options available through the Edit menu 95 on the Search Results window.

Buttons at the bottom of the window also allow the user to select all (Mark All 2015) or select none (Unmark 2016). The Edit menu 95 on the Search Results window also offers these options.

At this point, the user can click Print 2017 or choose Print 94 from the File pull-down menu on the Search Results window to print the results list to a printer or fax machine. The user also has the option to click copy 2018 or choose Copy to Clipboard 98 from the Edit pull-down menu on the Search Results window to copy the results list to the clipboard for export to another application. Only items that have been selected via these copy options can be printed or copied.

Once the items are selected, the user can click Retrieve 2014 or choose Retrieve Selected Items from the File menu 94 on the Search Results window to begin pulling up the images from the CD-ROM.

Figure 21:
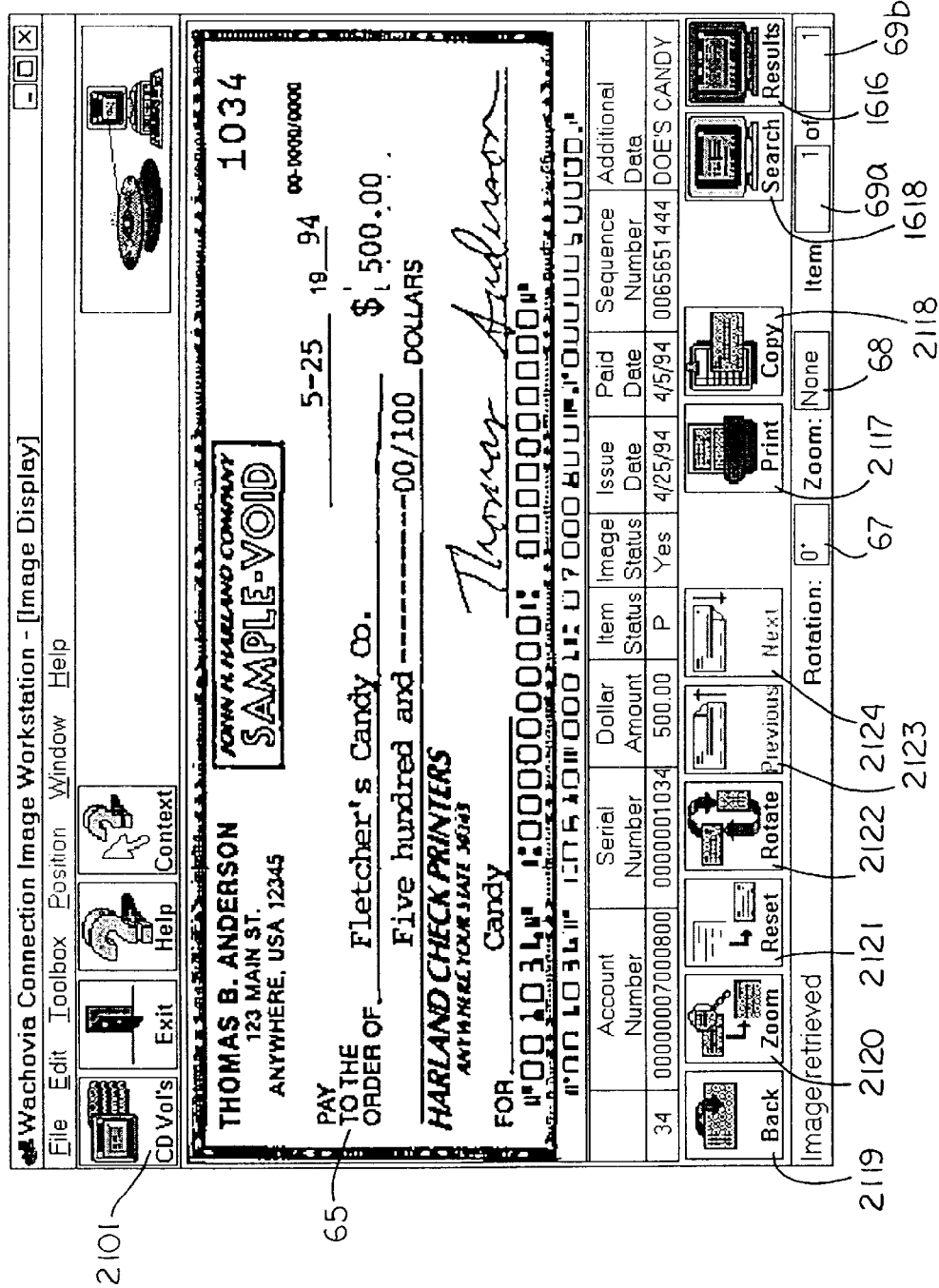
FIG. 21 is a sample Image Display window, the third trilogy screen, showing the front image of a check in standard orientation. The item record index information is shown scrolled to the left.
Figure 22:
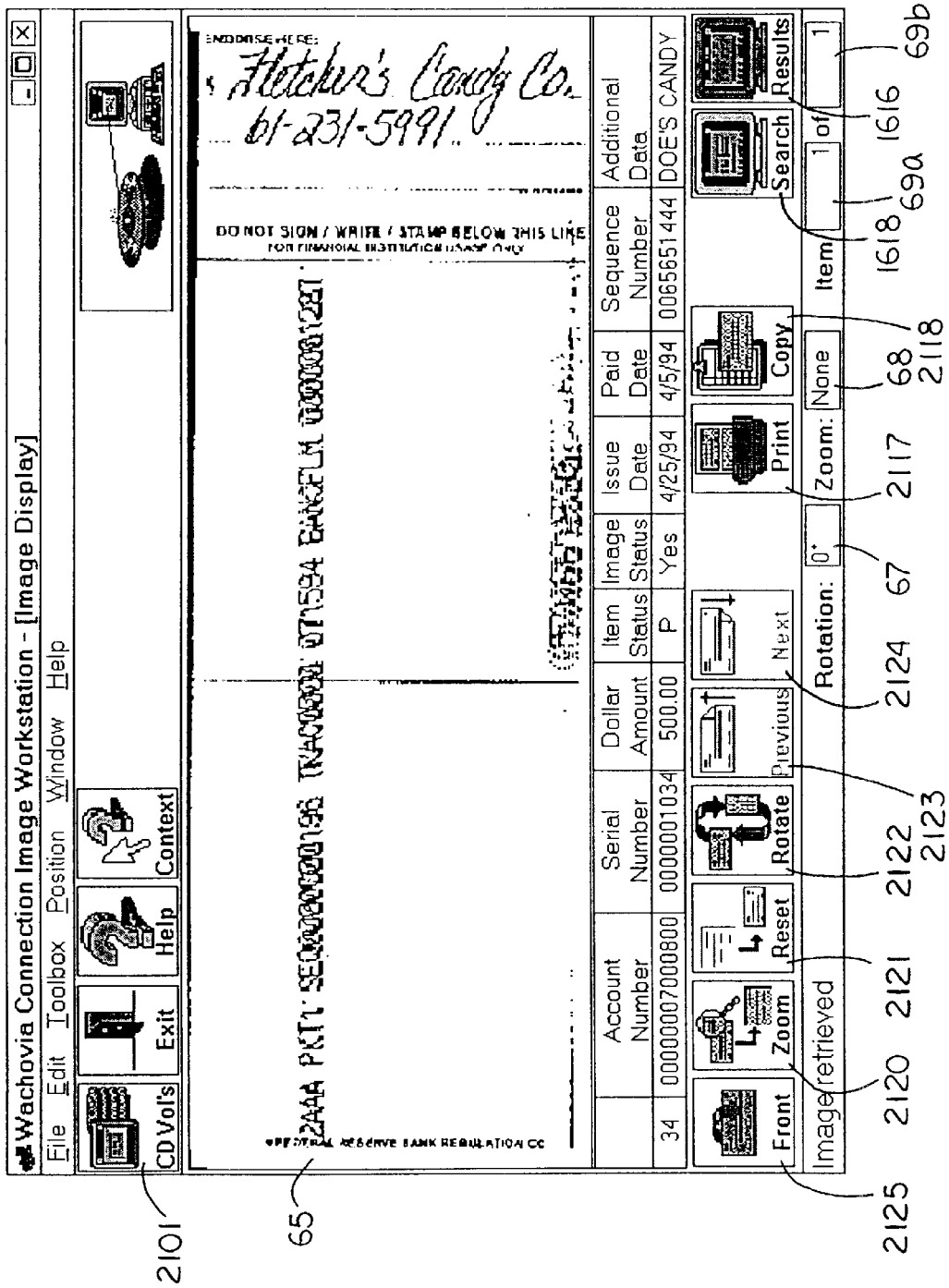
FIG. 22 is a sample Image Display window, showing the back image of a check in zoomed and rotated orientation. The item record index information is shown scrolled to the right.
Figure 23:
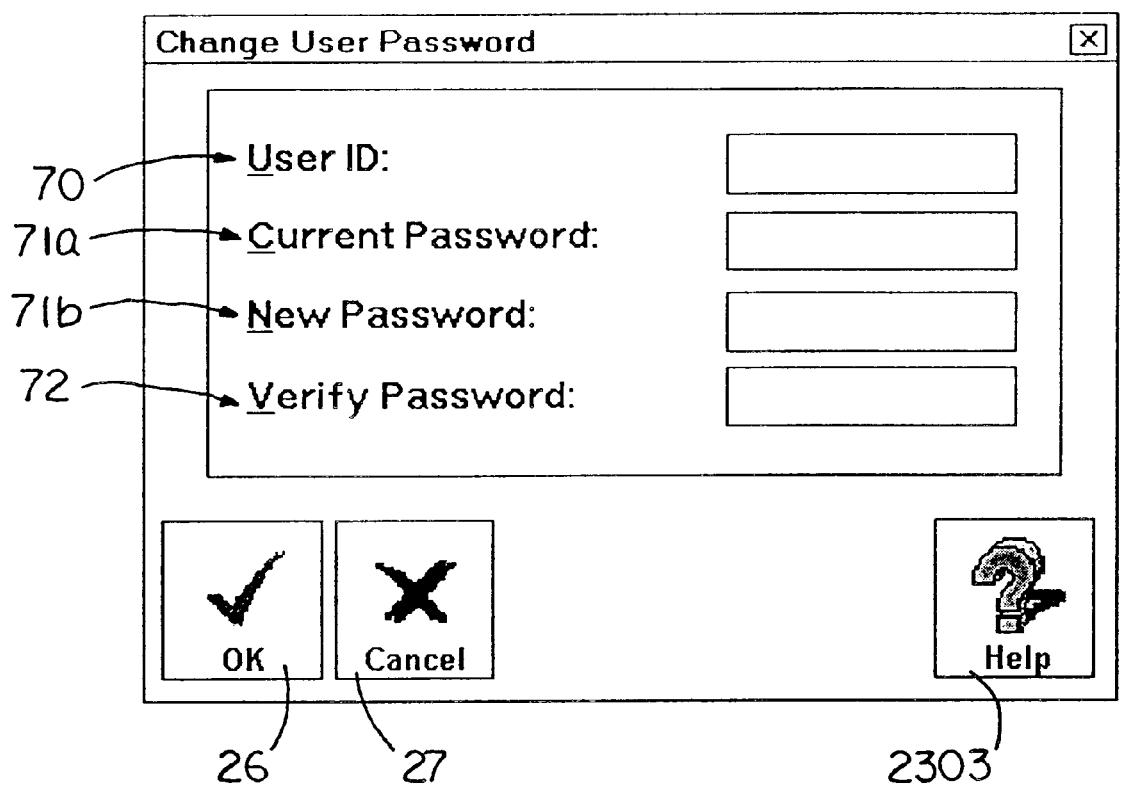
FIG. 23 shows the Change User Password window, which allows users to change their passwords to protect the integrity of their log on information.

The Image Display window FIG. 21, which is the third of the trilogy screens, shows the actual image of the first of one or more items to be retrieved. The indexed fields from the Search Results for the item are displayed under the image 65. The number of images retrieved 69a and this image's position 69b within the group of retrieved items are shown at the bottom right of this window. Internally the application can cache images and manages how many images are held in active memory verses re-pulling the image directly from the CD each time.

The user can elect to view the front 2125 or back 2119 of the image, zoom the image 2120 (up to 175%), rotate the image 2122 (particularly on the back to view the endorsement), and then to reset the image 2121 before printing or copying if desired. These options are also available through selections on the Toolbox pull-down menu 99 (FIG. 16C) on the Image Display window. The current orientation is reflected at the bottom of the window 67, 68.

If multiple items have been retrieved, the user can navigate among the images by clicking Previous 2123 or Next 2124 or by choosing these options from the Position pull-down menu 100 on the Image Display window. The Position menu also offers users the capability of scrolling through the retrieved images to the first or last in the list (Top of List, Bottom of List).

At this point, the user can click Print 2117 or choose Print 97 (FIG. 16C) from the File pull-down menu on the Image Display window (FIG. 16C) to print the image and its transaction item index information to a printer or fax machine. The image as displayed will be printed. If it has been zoomed or rotated that view will be maintained in the print. Also the front and back images are both printed at the same time with a print request. If the back is in view on the display it will print first. If portrait mode is selected via normal MS Windows Print Manager selection, the front and back image view along with the transaction item index record will be printed on the same page. If landscape mode is selected, the front image along with transaction item index record will print on one page and the back image along with the item index will print on the second page. The user also has the option to click copy 2118 or choose Copy to Clipboard 98 (FIG. 16C) from the Edit pull-down menu on the Image Display window to copy the image and its index information to the clipboard for export to another application. The copy function works differently from print in that the full bit mapped image will be sent to the clip board for the image view shown on the display (i.e. front or back only) along with the item index record. This provides the full quality image to the clip board and allows the application using the image to edit the size and orientation.

This tightly coupled trilogy provides significant ease of use and flexibility. After executing a search and reviewing of the results the search, the search criteria can be quickly reviewed and still allow easy return to the results or requested images without loss of the results or requested images that are being displayed. If a slightly revised search or revised image request is desired this can be done with only minor edits to the previous input selection. Also this allows different images to be selected for viewing without a loss of the search and results data.

Setting User and System Defaults

Choosing the Update User Details selection from the Setup pull-down menu 91 on the Search window displays the Add/Change User Details window FIG. 24, which requires entry of a System Administrator password for any modifications to take effect. Administrators can add new users or change existing user profiles (reset the password 74, upgrade the user to Administrator status 76, or force a new password to be reset at log on 77).

Figure 25:
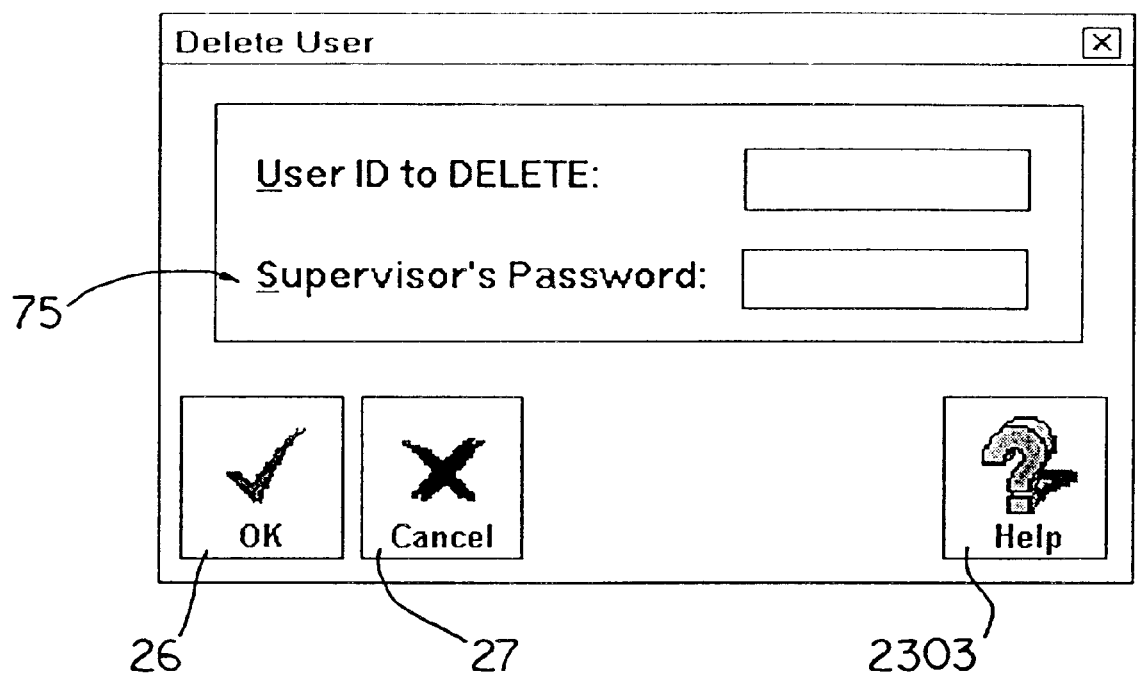
FIG. 25 shows the Delete User window, which allows System Administrators to delete User IDs from the system.

Choosing the Delete User selection from the Setup pull-down menu 91 on the Search window brings up a Delete User window FIG. 25 that allows the Administrator to remove a user from the system by entering the ID to be deleted and a verifying Administrator password 75 to approve the action.

Choosing the Workstation Options selection from the Setup pull-down menu 91 on the Search window displays the Workstation Options window FIG. 26, which allows users to change the drive letter for the location of the CD-ROM device 78, set a new limit for the maximum number of items that can be printed or copied from the Search Results list 79, or allow the system to access multiple databases 80.

Database Optimizer

Double-clicking the Database Optimizer icon 86 activates the second component of Image Workstation. The menu window for this utility FIG. 28 offers three options: Optimize 30, which removes unused space from the database to compact it and improve its search performance, Repair 31, which recovers a corrupted or otherwise unusable database, and Integrity 32, which checks the database to ensure that all links between the Wachovia Connection Image Workstation application and the database are set properly.

Options Editor

Double-clicking the Options Editor icon 87 (FIG. 14) activates the third component of Image Workstation. The menu window for this utility FIG. 29 offers three options: Application 34, which allows an Administrator to access an editing window for application-specific options, Help 35, which allows the Administrator to edit the text that appears at the bottom of the window, and Messages 36, which allows the Administrator to edit text displayed in pop-up boxes.

The Application Options window FIG. 30 allows the Administrator to view the location of the .INI file which contains the parameters and processing environment options that drives the Wachovia Connection Image Workstation 81. It will also allow the user to change the drive letter for the location of the CD-ROM device 37; to change the location of the database 38; to modify error log creation 39; to set new limits for selection, search, and total index records 40; to set field length requirements for User ID and Password 41; and to change Registration Information 42.

Figure 31:
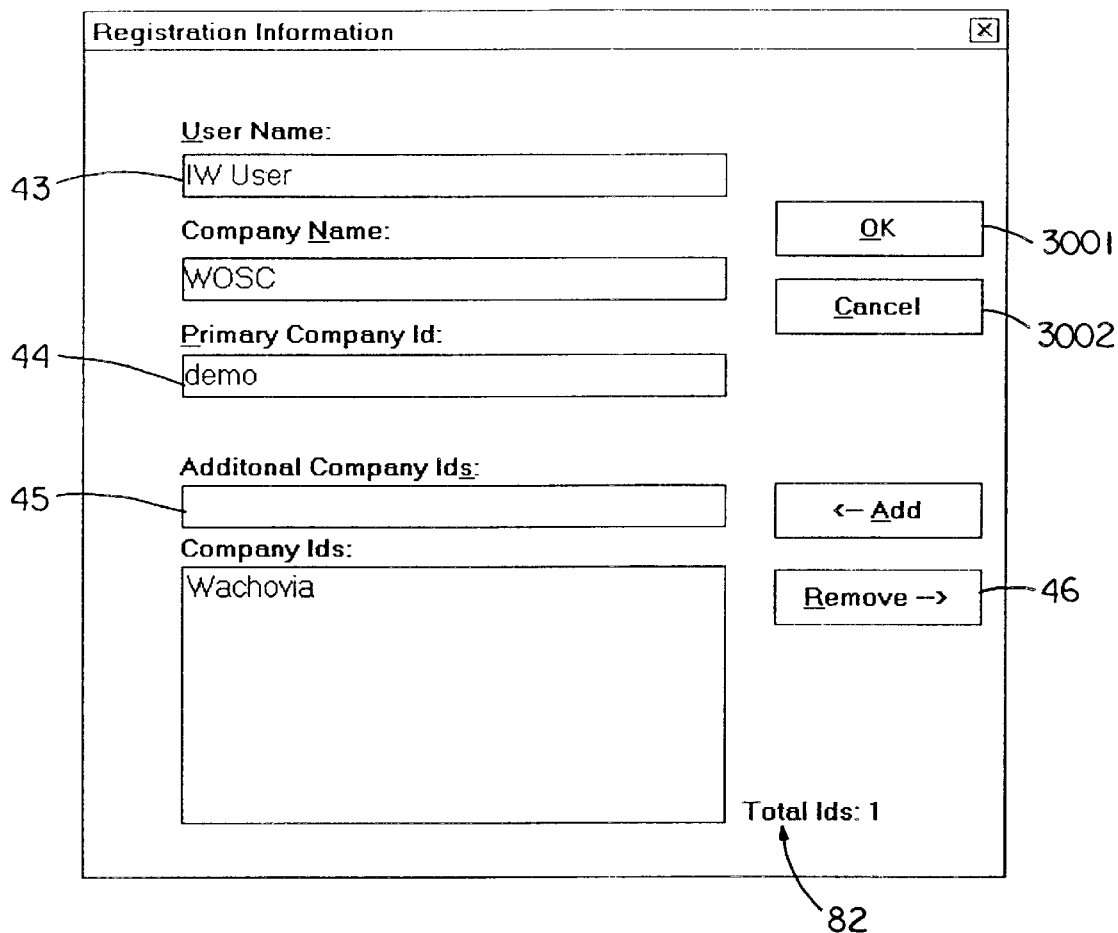
FIG. 31 is the Registration Information entry window associated with the Options Editor, which allows the user to make changes to registration information, including Company ID, which is assigned by Wachovia to allow each company to read only its CD-ROMs.
Figure 32B:
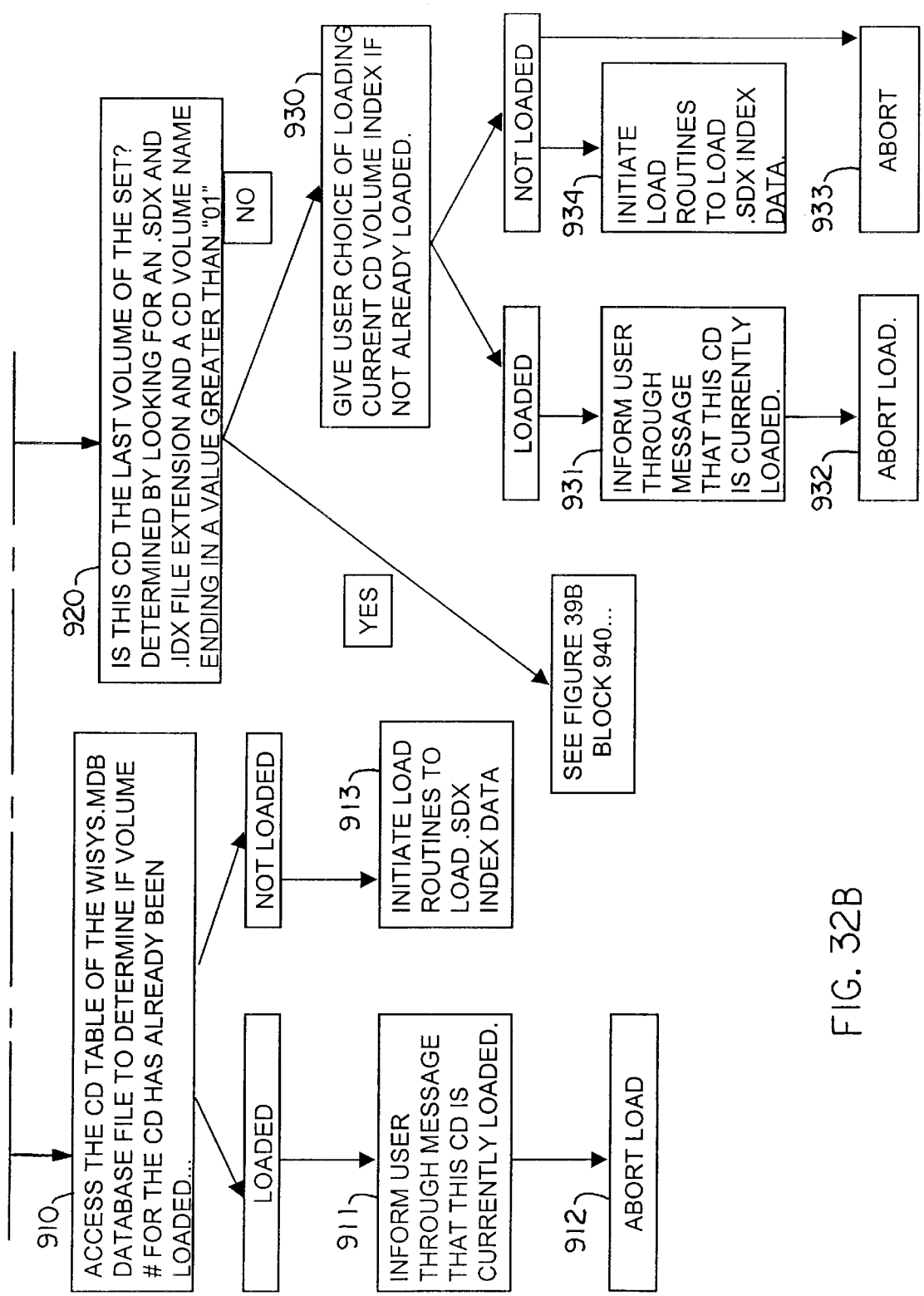

The Registration Information window FIG. 31 allows the Administrator to view or change the registration information associated with the installation, including the Primary 44 and Secondary Company IDs 45, which are used by Image Workstation to determine access to transaction item index and image information on the CD-ROM.

Image Workstation Read Me

Double-clicking the Image Workstation Read Me icon 85 (FIG. 14) activates MS Write (a standard accessory of MS Windows 3.1) and automatically opens a file created to detail specifics of the most current version of Wachovia Connection Image Workstation.

Image Workstation Help, Database Optimizer Help

Double-clicking either of the Help icons (84, 87) will display the hypertext file specific to its component so that information can be accessed, read, and printed by users without their accessing the actual application FIG. 27.

Further Enhanced Embodiments

The image display application can be improved in a number of areas to enhance usability and the ability of large volume or large enterprise commercial customers to realize the full benefits of image enabled account reconciliation and positive pay operations.

In another embodiment, the security features incorporate the set up of user groups and the ability to assign certain users to specific groups and only allow members of that group access to certain accounts. This allows all accounts for an enterprise to be distributed on a CD but only grant access and display of data and images associated with a few accounts to a specific user. A reporting function helps track and maintain all authorized users, the user groups and the accounts. A third level of security can also be provided in order to grant a user, a LAN administrator, or the overall application administrator different levels of access and control. The LAN administrator can access all install and setup functions but they cannot access data and images. The user can only access certain accounts and change user options. The application administrator can view all data and change application wide options.

Internal application data bases have limitations in performance and size as large numbers of records are added at one time (i.e. 5,000 to 50,000 record updates). Also separate data bases applications are costly and are harder to use. In order to utilize low cost data bases engines, such as the Access Jet Engine data base contained in Visual Basic supplied by Microsoft Corporation, a special segmentation scheme could be implemented. This segmentation scheme would allow the user to define how to divide or segment the database such as no segmentation, or group data records by year, quarter, month, CD Volume or fixed number of records. Record loading times (the merging of new records into existing records) increases in relation with the number of records being added and the overall size of the data base. If, for example, the data base contains 1.0 million items and 25,000 records are being added, the writing and re-indexing could take hours, even on the fastest PCs available. By limiting the overall size of a data base file to 100,000 or 200,000 records, the same load time can be reduced to under an hour. Also by linking all segments, a full search of all records is maintained. A multi-file database structure in conjunction with a master data base file can be implemented to provide segmentation of very large numbers of transaction item records while maintaining the ability to find records in any segment. For each data base file segment the master data base file contains the following:

- Pointer to segment data base location via the DOS path (drive letter, directory, filename)
- List of CD volume names (or any unique name) contained in the data base segment
- Highest and lowest paid date contained in the records stored in each segment.
- Highest and lowest issue date contained in the records stored in each segment.
- Status of the data base segment (active or inactive)

In the master data base file each CD volume name with record indexes loaded into the overall data base is listed. Each CD volume name has a pointer to the data base segment where the index records are loaded. This allows a very fast search by CD volume. A search limited to one CD volume is very useful in a payable review situation where all checks delivered on the CD need to be quickly reviewed.

Each individual data base segment contains all transaction item records from one or more CD volumes. The records from a single CD volume will always be contained in one data base segment. The item record has up to 9 fields indexed (account number, serial numbers, amount, paid date, issue date, sequence number, item status, CD volume name, additional data field). The application user can select to have indexing or no indexing for all fields except account number and CD volume name. These two fields are the foreign key pointers to the master data base file. By allowing the user to limit indexing to only fields the user would typically search, the load time for adding records to a segment can be kept at a minimum. However if searching on a field is important then fast search times can be maintained with slightly longer load times.

The different segment options (such as by month, quarter, year, etc.) can be selected by the user. Each option has a unique name for each segment type supported. The design can be implemented such that as index records are added as a result of a CD volumes load, the current segmentation definition parameters will be compared to the data contained in the index file on the CD. If the new index data exceeds the current defined limits for the segment then a new data base segment is named and dynamically created with updates to the master data base. This scheme allows a mixture of data base segment types. For example if a user starts with no segmentation and later decides the data base is too large and load times are too long, a new segment can be selected such as quarterly. Any future CD's index data will be loaded in the new segment and when a new quarter occurs as new segment will be added dynamically. Also a conversion utility is provided so that the master data base can be analyzed and any previously created segments could be re-defined and the data reassigned to new data base segments with new pointers into the master data base file. If a data base segment file is flagged as inactive by a user then it will not be considered in conversion or searches.

Another aspect of the segmenting implementation is the ability of the design to automatically switch from a simple SQL union across multiple data base segments to a series of SQL unions. MS Access SQL queries can only support the union of 5 data base segments given the number of fields and SQL criteria required for this implementation. To maintain fast search performance via the simple union when the number of segments to be searched exceeds 5, a switch can be made to a more complex union. Logic can detect a search of more than 5 segments and then invoke a series of simple unions. Five segments at a time would be searched and the results form each union would be saved and accumulated into a temporary data base. After all unions of 5 segments or less have been completed, a simple query of the temporary data base should yield the overall search results desired. Since most searches typically involve 3 segments or less, the search performance is maximized for most cases however the ability to perform a search spanning any number of segments is maintained. There is no upper limit other than what is a reasonable time to wait for the search to be completed.

Each SQL query is dynamically constructed from user input data and information in the master data base file as indicated below:

1. Based on the user data entered or selected via pull downs on the search screen, the segment or segments that need to be searched is determined by analyzing the user data parameters in conjunction with the master data base file.
2. A determination is then made of the number of segments that must be searched. If less that 5, a simple union is performed. If greater than 5, a series of simple unions is performed.
3. Based on the user data parameters from the search screens, the data base segment names, and the type of union, the actual SQL statements are constructed and executed.

The above scheme provides the ability to have the co-existence of multiple data base segments with different definitions and sizes while maintaining full search capability across any or all segments that are active. The scheme also allows for the segmentation definition to be changed and the ability to perform an easy analysis of all segments needing conversion so that conversion is automatic and the creation of new segments is automatic. The search is likewise independent of the segmentation definition or the data base segment naming. The data base segment naming and data base segments that need to be searched is transparent to the user.

MULTIPLE CD INDEX LOADING

The application can be further enhanced by allowing automatic detection and loading of a single CD volume index or cumulative CD volume indexes spanning a multiple volume set. The application utilizes an index naming convention specified in the CD creation process, defined earlier, to determine if an index being requested for loading is from a single volume CD, an individual index from a multi volume CD set or a cumulative index for a multi volume CD set.

A single volume CD has the index placed on the CD with a .SDX extension and the index is repeated with a .IDX extension. Single volumes of a multi volume set have only a .SDX index file while the last volume of the set has both an .SDX file and .IDX file.

From this naming convention, specific logic can be employed to detect a CD volume name with a suffix of 01 (the volume number) and the presence of an .SDX and .IDX file to be interpreted as a single volume CD. A CD volume name ending in 01 with only an .SDX is interpreted as a single index from a multi volume set. Likewise a CD volume name ending in a value greater than 01 with only an .SDX is interpreted as a single index from a multi volume set. A CD volume with a name ending in a value greater than 01 but containing an .SDX file and an .IDX file is interpreted as the last volume of a multi volume set. User messages can be posted, based on the above logic and interpretations, asking the user if they want to load the single volume or to insert the last volume of the set so all indexes can be loaded at once for all volumes. A message can also be posted telling the user which volumes of a multi volume set have been loaded. Using the last volume cumulative index (.IDX) allows a user to start the index record update process for large numbers of CD volumes and allows the process to run unattended without the need to physically swap CD volumes. However the user also has the flexibility to do each CD one at a time from the single index (.SDX) if they choose. Another aspect of the design makes information in the master data base file available for decision logic relative to the CD volumes that have been loaded and that are active in the overall index data base. If a CD volume is requested to be loaded which is already in the data base, a prompt to the user will be displayed.

If a cumulative index is requested to be loaded, then the .IDX file on the CD will be scanned for all CD volume names present in that file. If any of those CD volume names are present in the master index file, then records associated with those CD volume names will not be loaded. Only records with CD volume names not loaded would be added to the data base segment.

Given this structure, a user can load, for example, CD volume 02 index data from the single index and then later load CD volumes index data from 01 and 03 from the cumulative index on CD volume 03. This provides a user with full flexibility to load large numbers of records (25,000 per CD) in a manner that matches the PC system and user availability.

The functional flow of the multiple CD Index Loading Feature is shown in FIGS. 32A–32B and 33A–33C. The user selects a CD to load and inserts it into the CD ROM drive and selects "Add" CD from the CD Volume Information display screen shown in FIG. 34. This step is shown at 900 in FIGS. 32A–32B. The APPCNTL.DAT file on the CD Rom is located and read into program memory. 901–902 If the file is not detected, a message 903 is displayed saying the wrong CD is loaded. 903 Once the APPCNTL.DAT file is read, the date and company ID are validated. Next, the CD Type is determined. 904

The CD ROM is written with a single volume index file that ends in an extension of .SDX and with a cumulative data index file that ends in an extension of .IDX. The cumulative data index file contains the records from each .SDX single volume data index for each CD ROM in the multiple volume set. The multiple volumes are specified in the last two digits of the CD volume number such as 01, 02, 03, 04.

Figure 39:
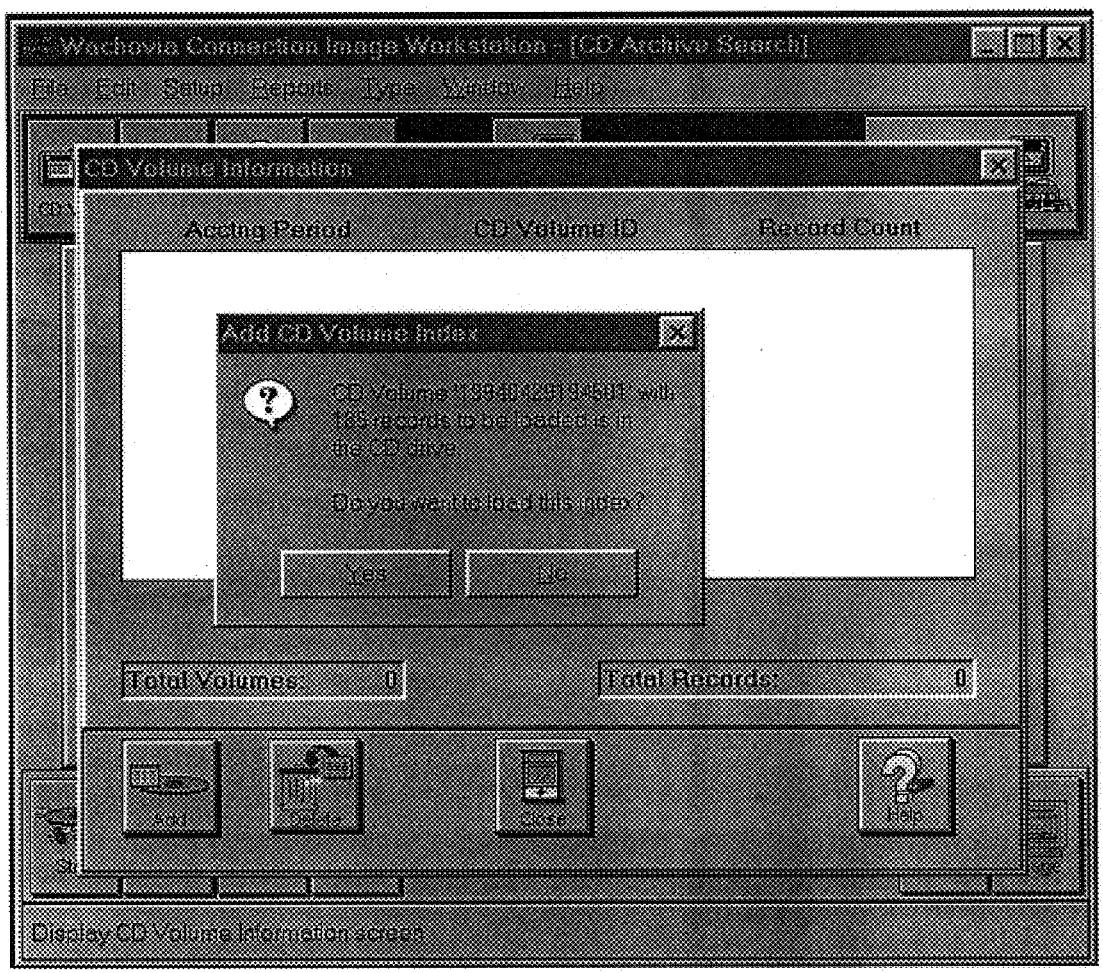
FIG. 39 illustrates the user message that is displayed if a user places a single volume CD ROM in the CD drive and the index data has not been loaded previously.
Figure 40:
FIG. 40 shows the confirmation screen that is displayed after the loading process has been initiated for a two-volume set when the index data has not been loaded previously.
Figure 41:
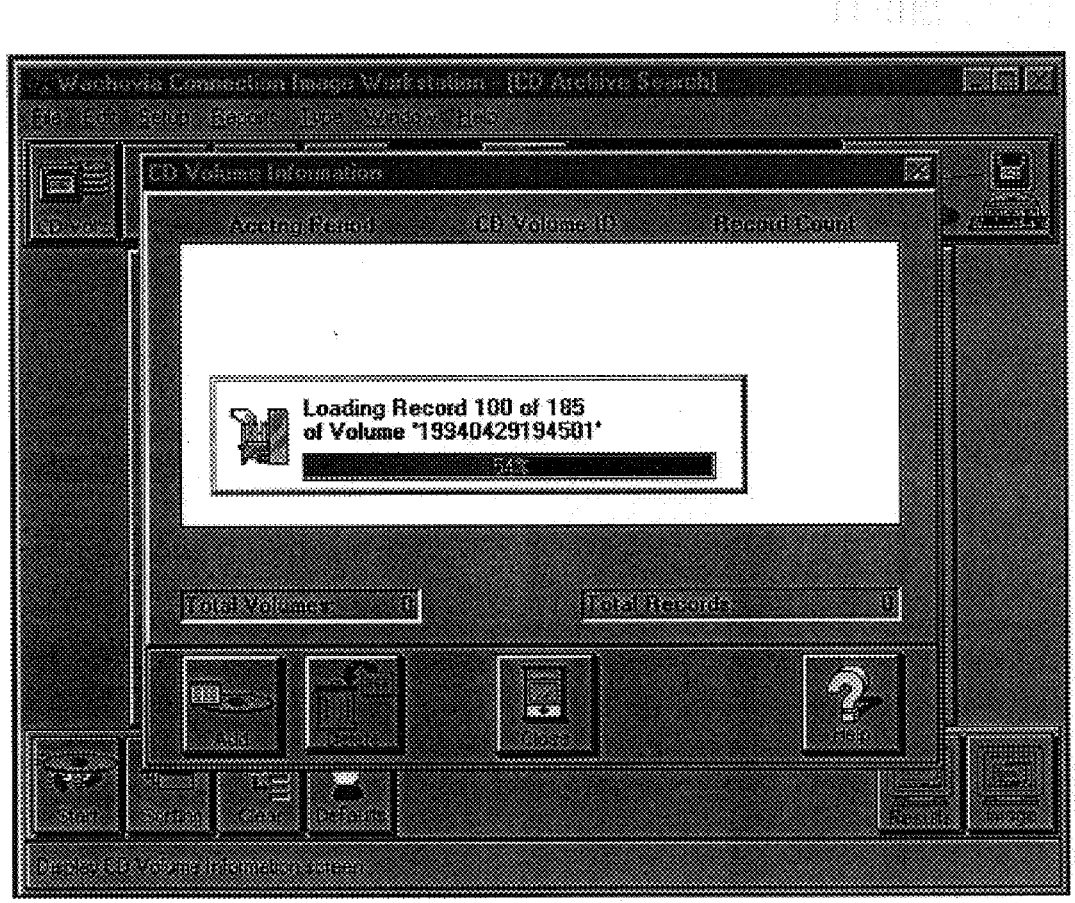
FIG. 41 shows the confirmation screen that is displayed after the loading process has been initiated for a single-volume CD ROM and the index volume has not been loaded previously.

The CD ROM type is first checked to see if it is a single volume CD ROM. This is done by looking for the presence of both an .SDX file extension and an .IDX file extension with a CD volume number each ending in "01." If this test is true, then the CD volume index table maintained by the application is checked to see if that volume has been previously loaded 910. If it has been loaded, a message 911 is displayed telling the user and the load process is ended. 912 If the test is not true, then the user is prompted (See FIG. 39) and the load process routines are initiated to transfer the .SDX index data to the application database. 913 See FIG. 41. Also, the application CD Table is updated showing that CD volume number as being loaded. If the test is false, the CD ROM loaded in the CD drive is one volume of a multiple volume set.

Next, a test is made to see if the CD is the last volume of the multiple volume set. 920 This is done by looking for the presence of an .SDX and .IDX file extension and a CD volume number ending in a value greater than "01." If this is not the last volume denoted by the absence of an .IDX file, the user is then prompted with a message box 930 that lets the user choose to load this individual CD volume index file. Alternatively, the user may abort the load and insert the CD ROM that is the last volume of the set. If the load of this CD ROM is aborted 933, the process would then start anew at 900 with the user loading the last volume of the multiple volume set.

If the user selects to load the CD ROM, then this single volume .SDX index file is loaded into the application index database. 934 A test is done to make sure this CD volume is not present in the CD Table volume index database. If it is present, a message 931 tells the user this CD Volume is already loaded and the load process is aborted. 932

Figure 33B:
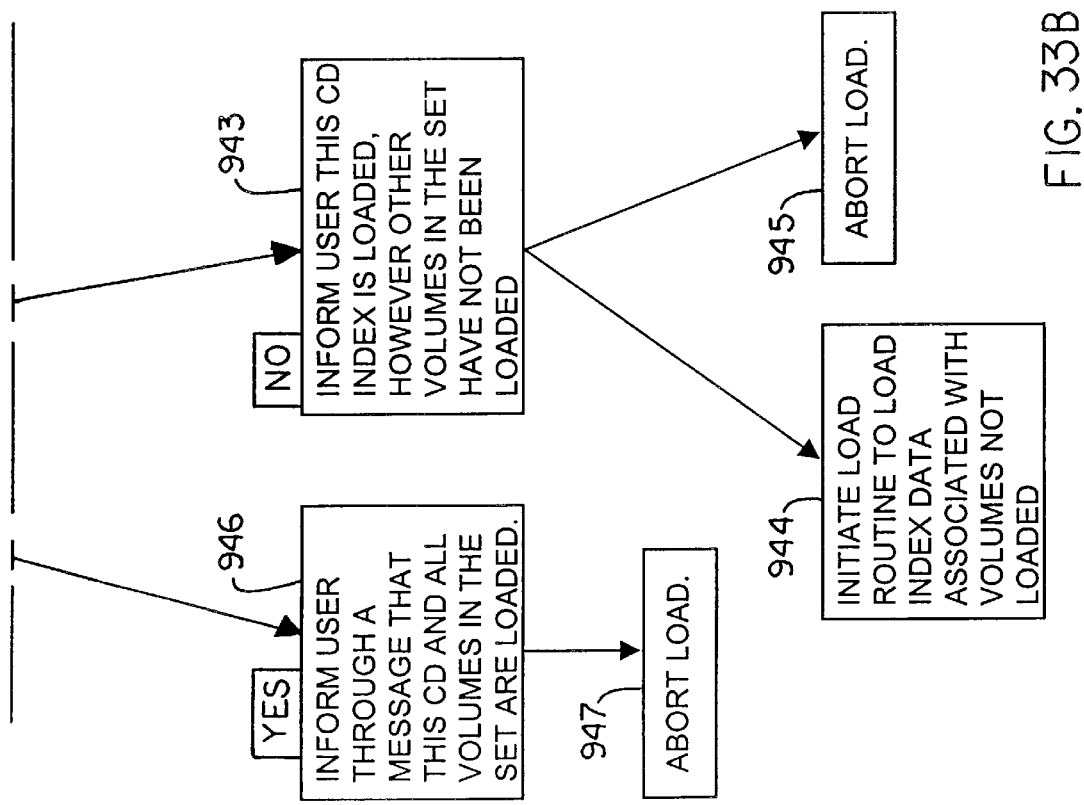
Figure 33C:
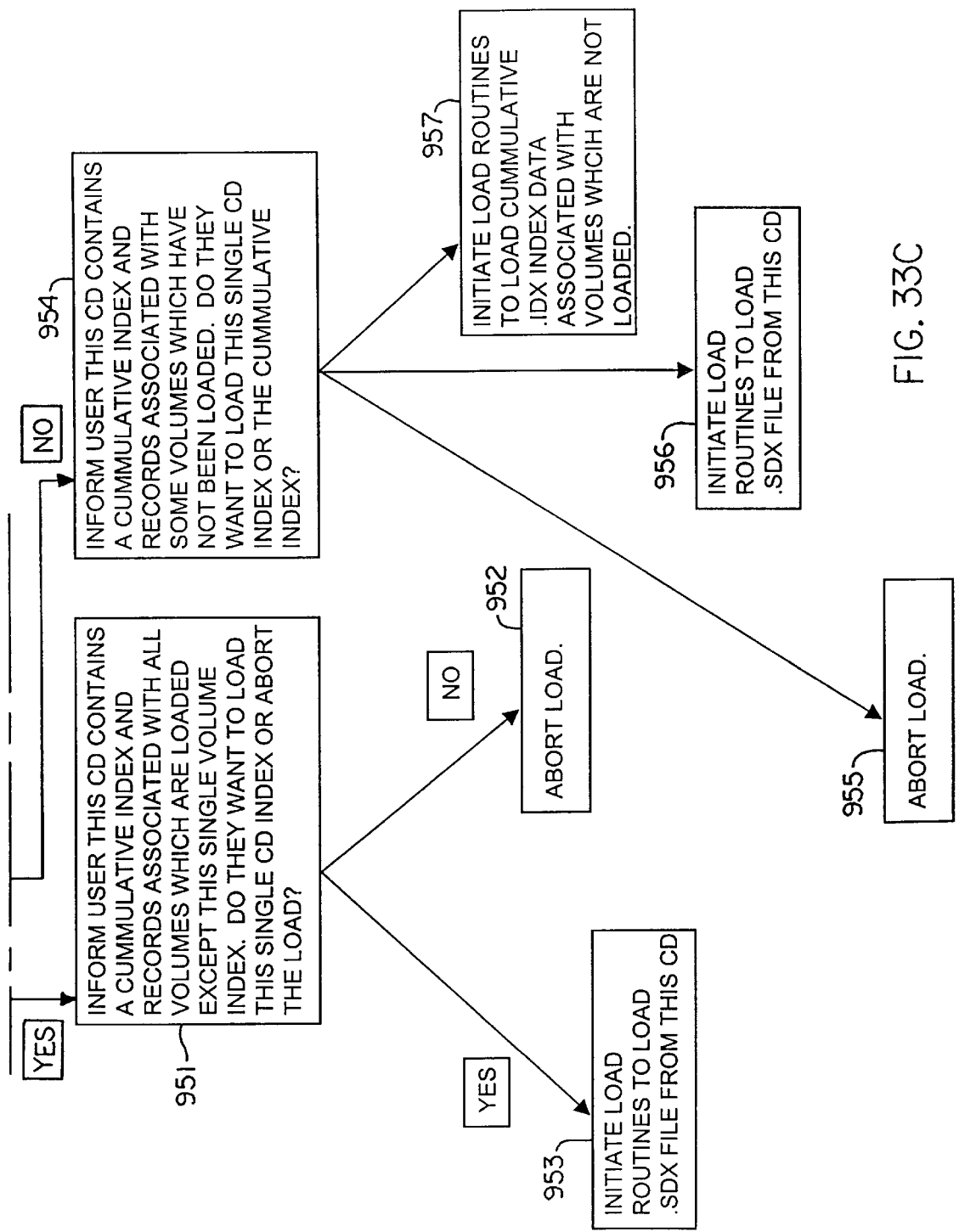
Figure 34:
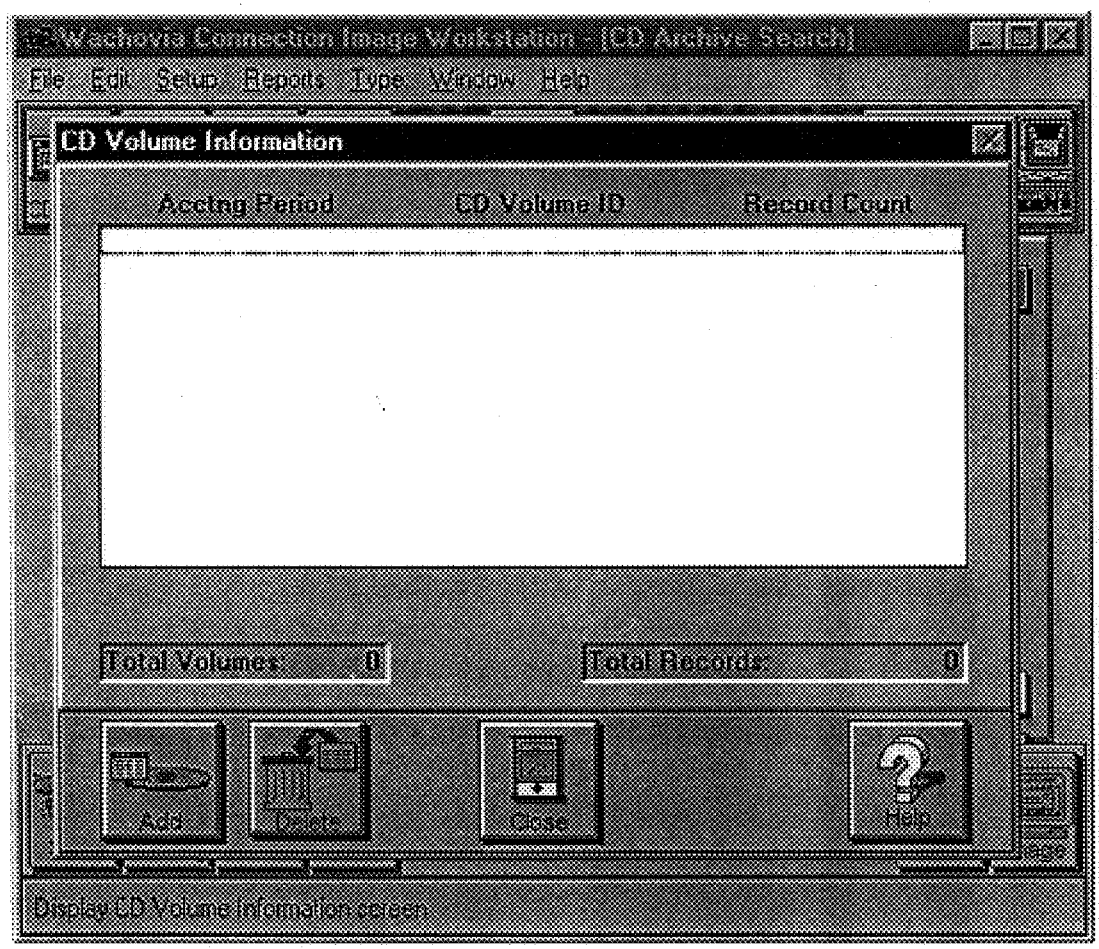
FIG. 34 illustrates the CD Volume Information Display Screen.

Referring now to FIGS. 33A–33C, if the test reveals the CD ROM is the last volume of a multiple volume set, then the cumulative .IDX index file on the CD ROM is scanned to determine what CD Volume numbers are present in the index file. 941, 942, 950 The CD Volume numbers are then compared to the CD volume number in the CD Table volume index database to determine if any CD volumes of the multiple volume set have been previously loaded.

Figure 35:
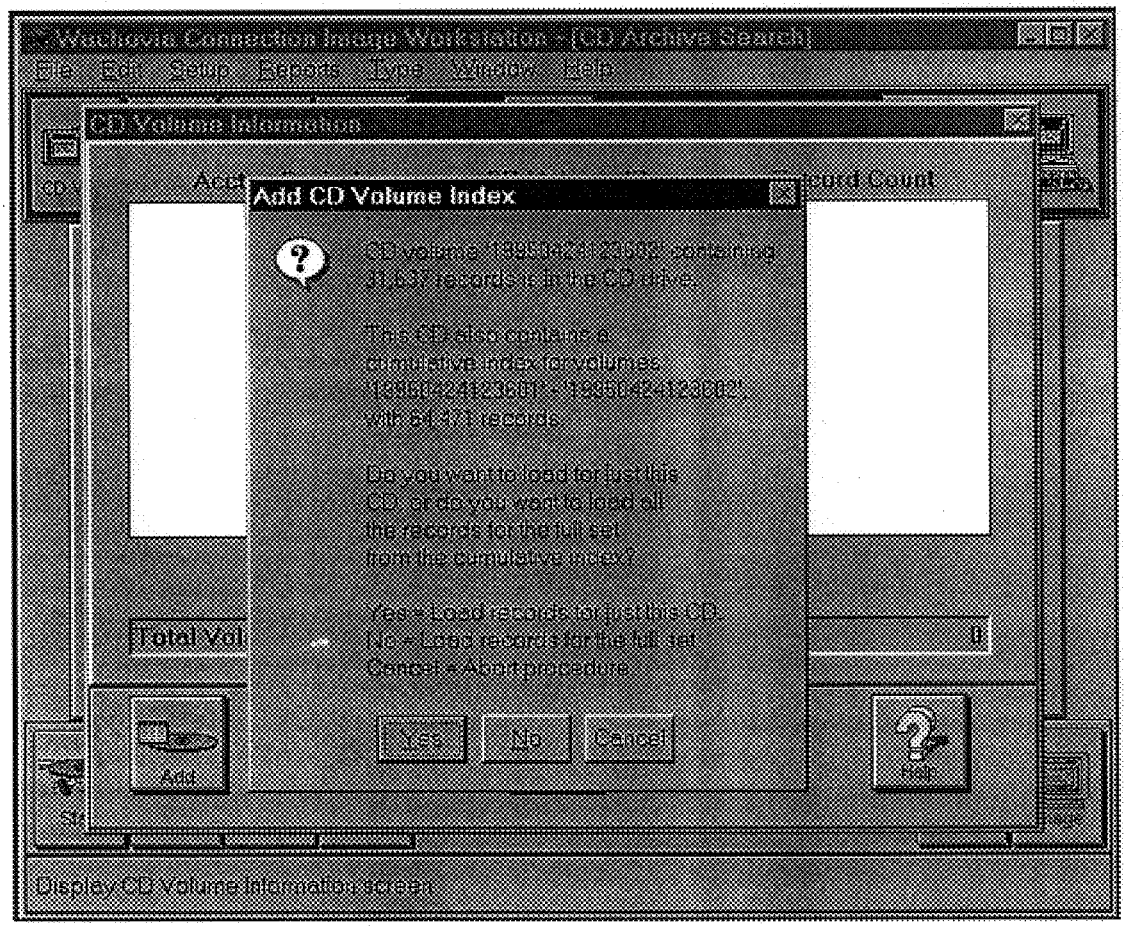
FIG. 35 illustrates the user message displayed when the last volume of a set of CD ROMs in the CD ROM drive and the index data from either volume has not been loaded.
Figure 38:
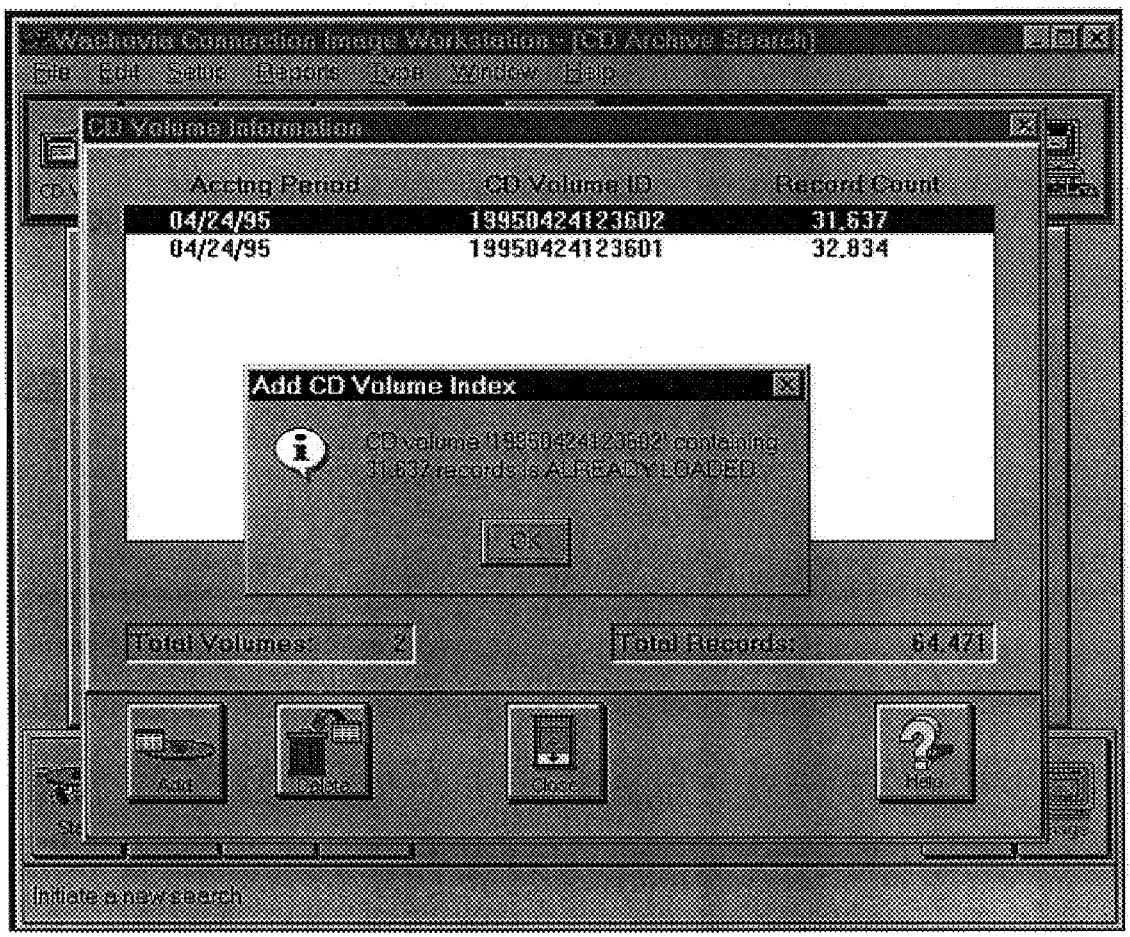
FIG. 38 illustrates the user message that is displayed if the index data associated with both volumes have previously been loaded and the last volume is in place in the CD drive.

If the CD volume name for the CD ROM loaded in the CD drive is loaded and the CD volume names in the cumulative .IDX file are also loaded, a message is displayed informing the user and the process is aborted. 947 See FIG. 38. The user is prompted with a choice of aborting the load 945 or initiating the load of the index records from the cumulative .IDX index file that have not been previously loaded. See FIG. 35.

Figure 36:
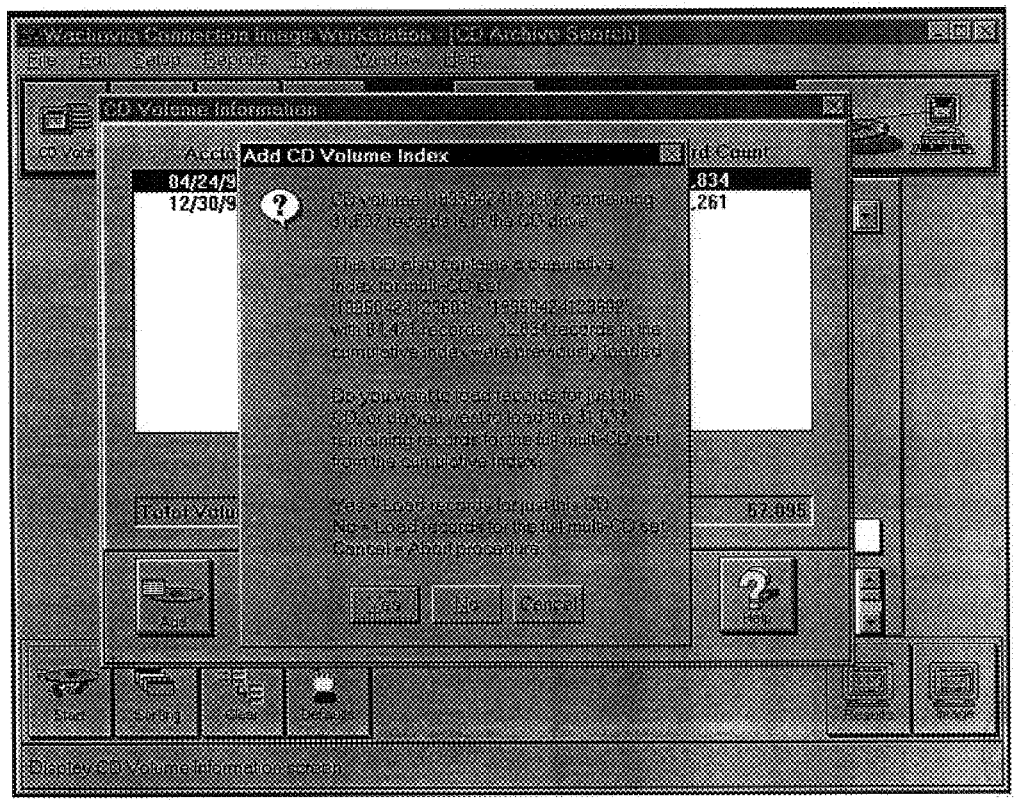
FIG. 36 illustrates the user message that is displayed if the user has previously loaded the index data associated with the first volume of a two-volume set.

If the CD volume number of the CD ROM loaded in the CD drive is not present in the CD table, but all other volumes in the cumulative .IDX file have been loaded, the user is given the choice 951 to abort the load 952 or initiate the load of the .SDX index data from the CD ROM loaded in the CD drive. See FIG. 36.

Figure 37:
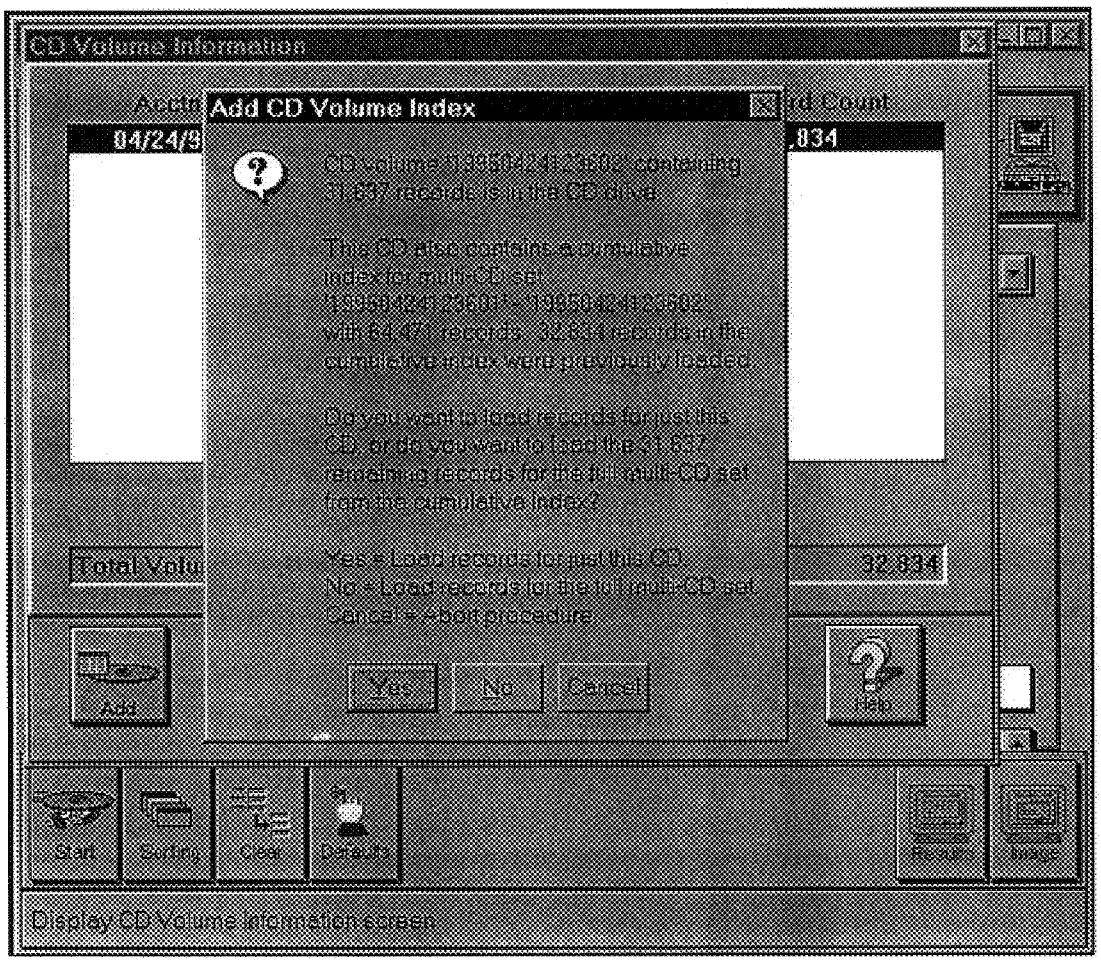
FIG. 37 illustrates the user message that is displayed if the user has previously loaded the index data associated with the last volume, but had not loaded the data associated with the first volume.

If the CD volume number of the CD ROM loaded in the drive is not presented in the CD and some of the CD volume numbers contained in the cumulative .IDX file also have not been loaded, the user is given the choice 954 of aborting the load 955, or initiating the load of the .SDX file from this CD ROM only. 956, 957 See FIG. 37.

FIGS. 35–41 show screens that would be displayed to a user during the index data loading process.

Another embodiment of the search definition interface lets the individual user customize their search screen by specifying any combination of fields or all fields in the index. If three of the seven available fields are selected, only those would show on that user's workstation screen. The search fields could have operands such as greater than, less than, no data in field, between, contains, etc., in a drop down menu that is selectable. Once an operand such as "between" is selected, then a "from" and "to" field appears on the screen. The ability to search item status such as paid, cancel and stop greatly assists reconcilement. Also, the ability to perform advanced searches of the 50 bytes additional data field using "begins with," "ends with," and "contains" operands allows this field to actually contain multiple data elements, but still limit the search only to that portion of the field desired. Another enhancement is to pre-load all account members in the index that the specific user is authorized to see and display them on a selection list instead of the user keying the data.

In yet another embodiment, sort order preference can provide up to four levels of sort and each level allows the choice of any indexed field that remains after selection of a level. The fields to be indexed can be limited at the application setup and only those specified will be displayed.

In the image display area, the orientation, zoom selection and video display preferences can be saved from check to check or even every day, providing great productivity gains where repetitive endorsement reviews are required. Every check requested (which could be thousands per day), would have the endorsement rotated and zoomed to clearly show the signature from the back of the check the first time the image is displayed without further manipulation of scroll location or settings.

This feature is very useful in a repetitive check viewing situation. For instance, suppose that for twenty checks, a user must view an area on the back of the check, that area being rotated 90 degrees and zoomed to 75 percent. If each image was displayed initially in the default view, four separate steps would be required to manipulate the image to obtain the desired view for a total of eighty time-consuming operations. Using the above-described process, the desired image settings are entered one time, saved so that subsequent checks may be displayed initially with the desired settings.

In large enterprises, the ability to place the item record data base and the CD ROMs on a server PC is cost effective and efficient. A scheme can be implemented to register all CD's loaded in the cumulative item records data base index as they relate to their location in a specific device on a PC, the network or even a specific slot in a CD jukebox or CD Tower. This CD management facility would provide for automatic device configuration and registration of all CD ROMS mounted in drive or slots. This facility could also employ a "locking" scheme where by a specific CD loaded into a specific slot in a jukebox could be selected and held active on the jukebox drive. This lock could be permanently set by the user or temporarily set by parameters in the application. This feature prevents CD Disc thrashing due to the nature of image viewing. Once a user selects a CD volume, they may request multiple images from that CD. By providing each user a reasonable mount duration typical to their review requirements, mount swaps can be minimized.

Another feature is the "Hot Slot". This allows a device or slot within a device to not contain (or be assigned) a permanently registered CD. The CD physically inserted in the slot will be read and detected when needed verses using a registration data base. This allows the fastest load of a CD from an external physical archive without having to go thru a lengthy registration process to permanently record the CD volume name in the data base.

The scheme for managing CD volumes builds on the unique CD volume name generated in the CD volume creation process that utilizes the IBM HDCI application. This application assigns a unique CD volume name based on date and time as well as a volume suffix. No two CD's will be created with the same name for a specific customer. This volume name is placed in a file on the CD such as the application control file. The CD also contains directories and image files containing images of individual items (front and back segments). The item name assigned by the HDCI application indicates the directory and file name along with the offset in the file where the specific image is located. Therefore by selecting a specific index record in the cumulative item record database, the specific CD volume containing the image and the item name defining the image location on a CD, can be used by the application to request a specific CD volume to be loaded physically by user or automatically with the CD Management facility. All CD's are created in an ISO 9660 convention that allows standard DOS file access.

A scheme can be developed which allows the automatic switching between CD volumes on a computer system or network that employees multiple CD reading devices or devices that control multiple CD's (for example CD tower drives, CD jukeboxes, multiple single CD drives).

The systems can be designed such that a user can define each device/slot along with the DOS file path address (drive letter, sub directories, filename) for the devices (i.e. 1, 6, 18 etc.). With this information the application can automatically determine the DOS path and the CD volume name (from a read of the application control file) for each CD present in the device. This automatic registration can be performed with standard DOS file input operations and the resulting information can be saved in a data base such as MS Access.

This registration data base would contain a combination of user defined parameters such as device description, device type, CD status ("locked" or "hot") along with the registration data such as DOS path (constructed from user input) for each device or slot and the CD volume name assigned to that device or slot. The data base would contain all registered devices/slots and CD volume names. As new CD's are received they can be placed in a device/slot and registered via a selection of the device/slot and a DOS file input request.

During the request for display of an image, the above registration data base provides means for automatically switching between CD volume names in order to display the currently requested image in a single user or multi-user LAN network. The image display application is designed such that CD volume name and item name are contained in the requested index record. The application will detect if a single device is to be used. If only one device is specified, the application will see if the CD volume name is present in the application control file. If multi-device support is specified the registration data base is accessed to determine the DOS path address assigned to the CD volume requested. The application will then perform DOS file input operations to verify the CD Volume name, retrieve the image file (based on item name) and read the image data for the specific images to be displayed. If the CD volume is not registered, appropriate messages would instruct the user to load the CD volume in a hot slot or register the CD.

The application can have logic such that when a CD volume being requested is not present, all DOS paths in the data base that have a status of "Hot Slot" could be checked for the presence of the requested CD volume name. This would be done each time a CD volume cannot be located. Any CD volume present would be temporarily registered just by placing the CD into the designated slot or device defined as a Hot Slot.

The application can also be implemented to prevent the automatic switching of a requested CD volume within a jukebox device. A jukebox typically has one or more devices with 6 or more CD slot locations. Driver software supplied with the jukebox defines the slot as a drive letter or a particular DOS path. If a CD is mounted on a drive the next request can cause that CD to be unloaded and a new CD to be mounted. A user can programmatically "lock" a specific CD volumes such that once that CD is mounted in the drive no other CD volume in the jukebox devices can be loaded in that drive. The application can also use this feature to temporarily prevent CD disc swaps to allow adequate viewing time by a user via an internal program parameter. Other users requesting a CD volume from that device will get a message saying the device is "locked" or they will experience a slight delay until the temporary "lock" expires.

The scheme for managing CD volumes can be further enhanced to include the management of image files stored in any valid DOS path. By placing the image sub directories and image files into a uniquely named directory with a control file such as the application control file using a unique volume name, this volume name can be registered along with its DOS Path and automatically accessed by the image display application. This extends the image file management to multiple image directories transmitted to the PC device and stored in multiple directories on any number of hard drives. It also allows directories of images to be placed on any media that support DOS file names.

If a image is placed on a diskette or a CD ROM or the hard drive it will be automatically located provided the volume name and device directory path have been registered in the management facility data base. This provides great flexibility by allowing low volumes of images to be distributed daily via electronic transmission and large volumes of images to be distributed on CD ROM. This arrangement allows images to be distributed and automatically retrieved from any storage medium including CD ROM.

The application can be further enhanced to aid in full reconcilement by allowing the results list to be used like a numeric spread sheet application such that selected ranges of items can have the amounts totaled and displayed to aid in resolution of out of balance conditions. Also the ability to add personal notations to the record data base will aid research spanning long time periods.

By combining the archive features of cumulative index records and CD ROM libraries with dial-up requests from the bank data bases and systems, enhanced capability can be realized by providing access of an image immediately after it is captured in the bank. This allows positive pay, payable thru, and complete check copy functions to be performed on the same workstation. Providing the flexibility where the search requested can be quickly switched from an archive search of the commercial customer's data base to a check image request of a specific check requested from the bank's image data base would greatly enhance the workstation's capability. Likewise, the search data will be automatically transferred during the search screen switch from archive to on-line.

Transmitting a list of positive pay review items and then allowing these items to be reviewed with the same familiar results and image display screens enhances productivity. Likewise, the ability to flag the item record as to a stop or return and then transmitting the resulting list of returns back to the bank enhances productivity. Being able to have the transmitted results list and images placed into special files areas separate from the archive allows easy access of all available images while maintaining the integrity of a reconciled and archived index record data base.

In another embodiment of this invention, the re-capture item passes are eliminated. While the item re-capture processing allows a bank to implement the system very quickly, it increases the cost somewhat to the check processing department. Eliminating the re-capture pass implies that the checks to be imaged will be both MICR captured in a conventional check processing environment and image captured in the same primary pass through the reader/sorter. By providing the MICR capture and the IMAGE capture at the earliest point, subsequent rehandle passes are eliminated, along with their accompanying work flow issues.

Additionally, by combining image capture into the MICR capture pass, every prime pass item can be easily available for image capture. By capturing the images of all items passing through the reader/sorter on prime pass, several additional advantages arise. For example, with the check image technology that is being employed, retention of the check images is planned to be seven to ten years. With an entire day's worth of work available along with the corresponding images of the items, back office work flow areas can be re-engineered, streamlining the image retrieval functions which are now limited to microfilm or microfiche retrieval in manual modes.

In addition, if all of the items for an entire month or year are retained in a near on-line tape robotics silo, retail or corporate customers could have access to check images via a personal computer on-line connection to the bank. This will have the effect of reducing operational costs to the bank by allowing additional incentives for customers to allow the bank to safekeep the items and not return them in the monthly bank statement, which is the state of the art today. This could also have the effect of allowing new banking products to be developed which are directed to these new markets.

In Summary

The Wachovia Connection Image Workstation offers commercial customers a simple and permanent way to archive paid checks, electronic payments, and other transactions while simplifying and speeding access to the stored images and data. The Wachovia Connection Image workstation, in combination with the High Volume Financial Image Media Creation System allows customers to relate their specific issue data to the paid check data captured by the bank in a cumulative transaction item index which ties together data from multiple accounting periods. The Wachovia Connection Image Workstation software lets the company enter search criteria, such as dollar amount or check serial number, to locate and display one or more check images in seconds. Once displayed, the image and its transaction item index information can be printed, faxed, or exported into other MS Windows-compatible applications such as MS Word or MS Excel.

The above system and method can be implemented through various types of computer programming languages. In a preferred embodiment, all host programs referenced from Check Solutions are written in IBM Cobol 370. All host programs referenced from IBM are written in IBM Cobol 370 and IBM Assembler language, except the HDCI program. The HDCI program is written in IBM Cobol 370, IBM Assembler language, and IBM Host C language. All Wachovia host programs are written in IBM Cobol II. The workstation programs are written in MS Visual Basic and MS Visual C++.

The above description of the preferred embodiments thus detail many ways in which the present invention can provide its intended purposes. Programmers skilled in the art are able to produce workable computer programs to practice the teachings set forth above. While several preferred embodiments are described in detail hereinabove, it is apparent that various changes might be made without departing from the scope of the invention, which is set forth in the accompanying claims.

Customer Tape Output File

DSN=CKPPN.AA.IMAGE.xxxxxxxxxxxxxxxx' (mvs hlq)

LRECL=32756

RECFM=VB 1.0 General Layout

This file is created by Wachovia and is used to generate tape output of check images. The file can be used for one customer or multiple customers. The file is a sequential data set with variable block format. There is one output data record for each ARP data record. ARP electronic (non-image) records and customer supplied issue data can generate an output data record even when physical checks are not present. The output consists of the following general layout:

| | | |
|---|---|---|
| First Customer # | Customer Initialization Data | |
| | Type-FF Customer Identifier | Always first-once per customer number |
| | Type-10 Tape Creation Control | Always second-once per customer number |
| | Type-30 Label Information | Optional-can be used to created labels, one or more records |
| First Data Record | Customer Item Data | |
| | Type-60 Carry-along | Optional-customer issue or ARP electronic data. Item Header information will always accompany this record even when no images (Segment 1/3) are present. |
| | Item Header Information | One per ARP data record |
| |    Routing Number | |
| |    Account Number | |
| |    Serial Number | |
| |    Amount | |
| |    Statement Sequence Number | |
| |    Process Control | |
| |    CIMS Key | |
| |    Item Status | |
| |    Item Length | |
| First check-front image | Segment 1-Front-Black/White | One per physical item |
| |    TIFF Tag | |
| |    Segment 1 Data | |
| First check-back image | Segment 3-Back-Black/White | One per physical item |
| |    TIFF Tag | |
| |    Segment 3 Data | |
| Second Data Record | Customer Item Data | |
| | Type-60 Carry-along | Optional-customer issue or ARP electronic data. Item Header information will always accompany this record even when no images (Segment 1/3) are present. |
| | Item Header Information | One per ARP data record |
| |    Routing Number | |
| |    Account Number | |
| |    Serial Number | |
| |    Amount | |
| |    Statement Sequence Number | |
| |    Process Control | |
| |    CIMS Key | |
| |    Item Status | |
| |    Item Length | |
| Second check-front image | Segment 1-Front-Black/White | One per physical item |
| |    TIFF Tag | |
| |    Segment 1 Data | |
| Second check-back image | Segment 3-Back-Black/White | One per physical item |
| |    TIFF Tag | |
| |    Segment 3 Data | |
| | . . . Additional First Customer Item Data | |
| | . . . Additional First Customer Item Data | |
| | . . . Additional First Customer Item Data | |
| | Customer Data | |
| First Customer # | Type-70 Account Identifier | Optional-one record for each acct. #. Can occur anywhere on tape within this customer number grouping. |
| Second Customer # | Customer Initialization Data | |
| | Type-FF Customer Identifier | Always first-once per customer number |
| | Type-10 Tape Creation Control | Always second-once per customer number |
| | Type-30 Label Information | Optional-can be used to create labels, one or more records |
| First Data Record | Customer Item Data | |
| | Type-60 Carry-along | Optional-customer issue or ARP electronic data. Item Header information will always accompany this record even when no images (Segment 1/3) are present. |
| | Item Header Information | One per ARP data record |
| |    Routing Number | |
| |    Account Number | |
| |    Serial Number | |
| |    Amount | |
| |    Statement Sequence Number | |
| |    Process Control | |
| |    CIMS Key | |
| |    Item Status | |
| |    Item Length | |
| First check-front image | Segment 1-Front-Black/White | One per physical item |
| |    TIFF Tag | |
| |    Segment 1 Data | |
| First check-back image | Segment 3-Back-Black/White | One per physical item |
| |    TIFF Tag | |
| |    Segment 3 Data | |
| | . . . Additional Second Customer Item Data | |
| | . . . Additional Second Customer Item Data | |
| | . . . Additional Second Customer Item Data | |

-continued

| | Customer Data | | |
|---|---|---|---|
| Second Customer # | Type-70 Account Identifier<br>... Additional Customers' Data<br>... Additional Customers' Data<br>... Additional Customers' Data | | Optional-one record for each acct. #. Can occur anywhere on tape within this customer number grouping. |

2.0 Detailed Record Layout

The following sections define the detailed record layouts.

2.1 Customer Initialization Data

Customer Identifier Record (Type FF)

This record identifies the customer being processed. The records following this record are only for the customer identified in this record. The format for this record is detailed in Table 2.1 as shown below.

Tape Media Creation Control Record (Type 10)

Information required to accurately create tape media for a customer is shown in Table 2.2 below.

| Field | Name | Length | Type | Description |
|---|---|---|---|---|
| 1 | Record ID | 09 | | Record Identifier. Value is x'5A00C7D3EEEE00FFFF'. |
| 2 | Site ID | 03 | | Optional data received via a JCL execution parameter. This could possibly denote the processing site. Default = Spaces |
| 3 | Customer Number | 18 | | Customer Number, 9 digit DUN Number + Three Digit Code, The 3 digit code will be unique for the type of media requested. The DUN Number is preceeded by six zeros. |
| 4 | Statement Date | 06 | | The ARP System Statement Drop date. Format is YYMMDD. |
| 5 | Routing Transit | 10 | | DDA Bank Number. This is a display numeric defined field (pic 9(10)). The rightmost 3 digits will contain the DDA Bank Number. FYI-The actual values used will be<br>◆001-Raleigh<br>◆002-Atlanta<br>◆201-Columbia |
| 6 | Tie Break | 03 | | Value = Zeros |
| 7 | Customer ID | 12 | | Customer Identification. Default = Spaces. |
| 8 | Customer Name | 40 | | Customer Name. Default = Spaces |
| 9 | Statement Statement Number | 07 | | Statement Number. Currently not used, Value = Zeros. |
| 10 | Statement Type | 01 | | Statement Type Indicator. Currently not used, Value = Spaces. |
| 11 | Filler | 05 | | Spaces |

2.2 Customer Initialization Data

| Field | Name | Length | Type | Description |
|---|---|---|---|---|
| 1 | Record ID | 09 | | Record Identifier. Value is x'5A0071D3EEEE001040'. |
| 2 | Site ID | 03 | | Optional Data received via a JCL execution parameter. This could possibly denote the processing site. Default = Spaces |
| 3 | Customer Number | 18 | | Customer Number, 9 digit DUN Number + Three Digit Code, The 3 digit code will be unique for the type of media requested. The DUN Number is preceeded by six zeros. |
| 4 | Statement Date | 06 | | The ARP System Statement Drop date. Format is YYMMDD. |
| 5 | Media Type | 2 | | Media requested. Value is:<br>◆02-Tape Media |
| 6 | Media Index Type for Third Party Processor | 02 | | ◆0-SIF Order<br>◆1-Serial Sort Ascending |

| Field | Name | Length | Type | Description |
|---|---|---|---|---|
| | | | | ♦2-Serial Sort Descending |
| | | | | ♦3-Amount Sort Descending |
| | | | | ♦4-Amount Sort Descending |
| | | | | ♦5-Paid Date/Serial Number Ascending |
| | | | | ♦6-Paid Date/Serial Number Descending |
| | | | | Note: This field is only used for fiche customers. (Default = Zeros) |
| 7 | Media Index Text | 30 | | Text description of the index type. (Default = Spaces) |
| 8 | Media Destinations | 02 | | Number of destinations for the media being created. (Default =    ) |
| 9 | MVS DSN HLQ | 10 | | Prefix to be used when allocating MVS files. Must conform to MVS dataset naming standards. The last (rightmost) character must be a period (.). Default = HLQ1.HDCI |
| 10 | MFI to Item Record Count | 2 | | Maximum number of consecutive MFI records that could possibly represent one complete detail item, SDF record and all possible carry-along record(s). (Default = 2) |
| 11 | Filler | 30 | | Spaces |

2.3 Customer Initialization Data
Label Information Records (Type 30) (Optional)

These records define how the media should be labeled once it has been created. There can be up to 99 label records provided for each Customer ID. All copies and all volumes will be labeled with the same set of Type-30 records. The various output media supported may not support having all 99 records. If these records do not exist, a file with no labeling information will be created. Table 2.3 below describes the detailed structure of these records.

Carry-along Records (Type 60) (Optional)

This record defines any data that pertains to a detail item that is not included in the data from the check code line. This is an optional record but if this record exists, there must be a corresponding Item Header Information immediately following this carry-along record. The structure of these records is detailed in Table 2.4 below.

| Field | Name | Length | Type | Description |
|---|---|---|---|---|
| 1 | Record ID | 09 | | Record Identifier. Value is x'5A0071D3EEEE003040'. |
| 2 | Site ID | 03 | | Optional Data received via a JCL execution parameter. This could possibly denote the processing site. Default = Spaces |
| 3 | Customer Number | 18 | | Customer Number, 9 digit DUN Number + Three Digit Code, The 3 digit code will be unique for the type of media requested. The DUN Number is preceeded by six zeros. |
| 4 | Statement Date | 06 | | The ARP System Statement Drop date. Format is YYMMDD. |
| 5 | Filler | 02 | | Value = Spaces |
| 6 | Label Line Number | 02 | | Which Label record is this. Default = 01 |
| 7 | Label Information | 60 | | Label information to be printed. Default = Label Information Line 1. Note: The usable length of this field may be less depending on the media being labeled. Note: In support of the Data/Ware EAS CD System the usable length of this field has been defined to 27 bytes. Note: If any of the Type-30 records Label Information fields that are used for input start with the literal "CUTOFF DATE-" then the Statement Date from the Type-FF record will be inserted in the eight characters following the literal in the format MM/DD/YY. Note: If any of the Type-30 records Label Information fields that are used for input start with the literal "VOL ID:" then the Volume ID that has been used in every index record will be inserted in the fourteen characters following the literal in the the format. CCYYMMDDHHNNVV. |
| 8 | Filler | 14 | | Spaces |

2.4 Customer Item Data

| Field | Name | Length | Type | Description |
|---|---|---|---|---|
| 1 | Record ID | 09 | | Record Identifier. Value is x'5A0071D3EEEE003040'. |
| 2 | Site ID | 03 | | Optional Data received via a JCL execution parameter. This could possibly denote the processing site. Default = Spaces |
| 3 | Customer Number | 18 | | Customer Number, 9 digit DUN Number + Three Digit Code, The 3 digit code will be unique for the type of media requested. The DUN Number is preceeded by six zeros. |
| 4 | Statement Date | 06 | | The ARP System Statement Drop date. Format is YYMMDD. |
| 5 | Sequence Number | 10 | | Posting item sequence number<br>◆Georgia format: 00ss######<br>◆NC format: 0ss######0<br>Note: ss is the sorter number and ###### is the sequence number |
| 6 | Issue Date | 08 | | Date the item was issued. Format: YYYYMMDD, can be zeros. Supplied to Wachovia from Customer Issue File. |
| 7 | Paid Date | 08 | | Date the item was paid. Format: YYYYMMDD, can be zeros |
| 8 | Customer Data | 50 | | Additional Data related to this item. Supplied to Wachovia from Customer Issue File. |
| 9 | Image Indicator | 01 | | This indicates if there is to be an image associated with this record. Values = Y or N. |
| 10 | Filler | 15 | | Reserved for future expansion. Value = Spaces. |

2.5 Customer Item Data
Item Header Information

30

| Name | Length | Type | Description |
|---|---|---|---|
| Routing Number | 10 | | Routing and Transit (RT) field |
| Account Number | 18 | | Account # field |
| Serial Number | 10 | | Check Number field |
| Amount | 8 | | Amount field |
| Statement Sequence Number | 3 | | Value = Zeros |
| Process Control | 6 | | Process Control (PC) field |
| CIMS Key | 44 | | Check Image Management System (CIMS) indexing key |
| Item Status | 4 | | One byte for each of the 4 possible segments (FBW,FGS,BBW,BGS; FGS & BGS not supported)<br>◆X'00'-Image data absent<br>◆X'01'-Image data present<br>◆X'11'-Replacement data present |
| Item Length | 24 | | Six bytes for each of the 4 possible segments (FBW,FGS,BBW,BGS; FGS & BGS not supported)<br>(5-byte length followed by 1-byte filler) |
| Segment 1 Image Data (FBW) | Var. | | Data will be compressed in CCITT G4 MMR (Modified Modified Read) per the CCITT G4 specifications. |
| TIFF Tag | | | See Section 2.6 TIFF Tag |
| Segment 3 Image Data (BBW) | Var. | | Data will be compressed in CCITT G4 MMR (Modified Modified Read) per the CCITT G4 specifications. |
| TIFF Tag | | | See Section 2.6 TIFF tag |

Note:
FBW = Front Black/White
FGS = Front Gray Scle
BBW = Back Black/White
BGS = Back Gray Scale

2.6 Customer Item Data

TIFF TAG

Table 2.6 below describes a sample storage representation of the TIFF 5.0 header tag.

| ADDR | DESCRIPTION | STORAGE REPRESENTATION |
|---|---|---|
| 0000 | BYTE ORDER | 4D4D |
| 0002 | VERSION | 002A |
| 0004 | 1ST IFD POINTER | 0000 0008 |
| 0008 | ENTRY COUNT | 000C |
| 000A | IMAGE WIDTH | 0100 0004 0000 0001 0000 07D0 |
| 0016 | IMAGE LENGTH | 0101 0004 0000 0001 0000 0BB8 |
| 0022 | BITS PER SAMPLE | 0102 0003 0000 0001 0001 0000 |
| 002E | COMPRESSION | 0103 0003 0000 0001 0004 0000 |
| 003A | PHOTOMETRIC INTERPRET | 0106 0003 0000 0001 0000 0000 |
| 0046 | STRIP OFFSET | 0111 0004 0000 0001 0000 00AE |
| 0052 | ORIENTATION | 0112 0003 0000 0001 0001 0000 |
| 005E | ROWS PER STRIP | 0116 0004 0000 0001 0000 0BB8 |
| 006A | STRIP BYTE COUNT | 0117 0004 0000 0001 0000 01A8 |
| 0076 | X RESOLUTION | 011A 0005 0000 0001 0000 009E |
| 0082 | Y RESOLUTION | 011B 0005 0000 0001 0000 00A6 |
| 0083 | RESOLUTION UNIT | 0128 0003 0000 0001 0002 0000 |
| 009A | NEXT IFD POINTER | 0000 0000 |
| 009E | X RESOLUTION | 0000 00E0 0000 0001 |
| 00A6 | Y RESOLUTION | 0000 00E0 0000 0001 |
| 00AE | IMAGE DATA | |

Note:
♦Aditional TIFF 5.0 Subset Restrictions
-Byte Order will always be X'4D4D' (high-order bit = most significant)
-Only Compression = 4(G4) is supported
-Only Photometric Interpretation = 0 (white = 0, black = 1) is supported
-Only Orientation = 0 is supported (top left is beginning of image)
-Rows Per Strip = Image Length (1 strip per image)

2.7 Customer Item Data
Segment Data

The image segment (front/back) data is compressed in the CCITT G4 MMR (Modified, Modified, Read) as defined CCITT specification.

2.8 Customer Data
Account Identifier Record (Type 70) (Optional)

This record defines the various MICR Account numbers represented on this media for a specific customer number. This record may occur multiple times, once for every different MICR Account number for a specific number. If this record does not exist, no Account Identifier information will be created. The structure for this record is as detailed in Table 2.8 below.

| Field | Name | Length | Type | Description |
|---|---|---|---|---|
| 1 | Record ID | 09 | | Record Identifier. Value is X'5A0071D3EEEE007040'. |
| 2 | Site ID | 03 | | Optional data received via a JCL execution parameter. this could possibly denote the processing site. Default = Spaces. |
| 3 | Customer Number | 18 | | Customer Number, 9 digit DUN Number + Three Digit Code, The 3 digit code will be unique for the type of media requested. The DUN Number is preceeded by six zeros. |
| 4 | Statement Date | 06 | | The ARP System Statement Drop date. Format is YYMMDD. |
| 5 | Customer Account Number | 14 | | DDA Posting Account Number |
| 6 | Filler | 64 | | Spaces |

I claim:

1. A method for detecting and loading CD volume indexes from a plurality of single-volume CD or a multiple-CD sets to a cumulative volume table maintained in a computer memory, each set including at least one intermediate CD and a last CD comprising:

a) creating a first index file on each CD of each set for the volume contained thereon;

b) creating a second index file on the last CD of each set which is cumulative of all the volumes of each set;

c) searching each CD from each set for the presence of both a first index file and a second index file;

d) comparing the CD volumes contained in each second index file detected in step c) to a listing of previously loaded CD volume names and displaying a list of missing volumes; and e) loading the missing volumes to the cumulative volume table.

* * * * *